(12) United States Patent
Sudo

(10) Patent No.: US 11,557,313 B2
(45) Date of Patent: Jan. 17, 2023

(54) MAGNETIC DISK DEVICE AND METHOD OF STOPPING WRITE OPERATION

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Daisuke Sudo, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/586,498

(22) Filed: Jan. 27, 2022

(65) Prior Publication Data
US 2022/0406330 A1 Dec. 22, 2022

(30) Foreign Application Priority Data
Jun. 22, 2021 (JP) .............................. JP2021-103295

(51) Int. Cl.
*G11B 5/54* (2006.01)
*G11B 5/012* (2006.01)

(52) U.S. Cl.
CPC .................. *G11B 5/012* (2013.01)

(58) Field of Classification Search
CPC ... G11B 5/5543; G11B 5/5547; G11B 5/5575; G11B 19/044; G11B 5/012; G11B 5/5539; G11B 20/10; G11B 27/36; G11B 2020/10898; G11B 2220/90; G11B 20/10009; G11B 20/18; G06F 3/0619; G06F 3/0653; G06F 3/06; G06F 12/00; G06F 3/0676
USPC ......................................................... 360/75
See application file for complete search history.

(56) References Cited

U.S. PATENT DOCUMENTS

| | | | |
|---|---|---|---|
| 6,952,322 B1 | 10/2005 | Codilian et al. | |
| 9,236,087 B1 * | 1/2016 | Dahlberg | G11B 5/012 |
| 9,269,393 B1 | 2/2016 | Webb et al. | |
| 9,412,403 B1 | 8/2016 | Dhanda et al. | |
| 10,529,365 B2 | 1/2020 | Tagami et al. | |
| 2014/0168806 A1 | 6/2014 | Dhanda et al. | |

FOREIGN PATENT DOCUMENTS

| | | |
|---|---|---|
| JP | H05-101520 A | 4/1993 |
| JP | 2010-146626 A | 7/2010 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a first disk including a first data sector, a second disk including a second data sector, a first head including a first read head, a second head including a second read head, a first controller that stops write operations of both the first head and the second head based on first data sector position error information obtained by reading and demodulating the first data sector by using the first read head, and a second controller that stops the write operations of both the first head and the second head based on second data sector position error information obtained by reading and demodulating the second data sector by using the second read head.

28 Claims, 25 Drawing Sheets

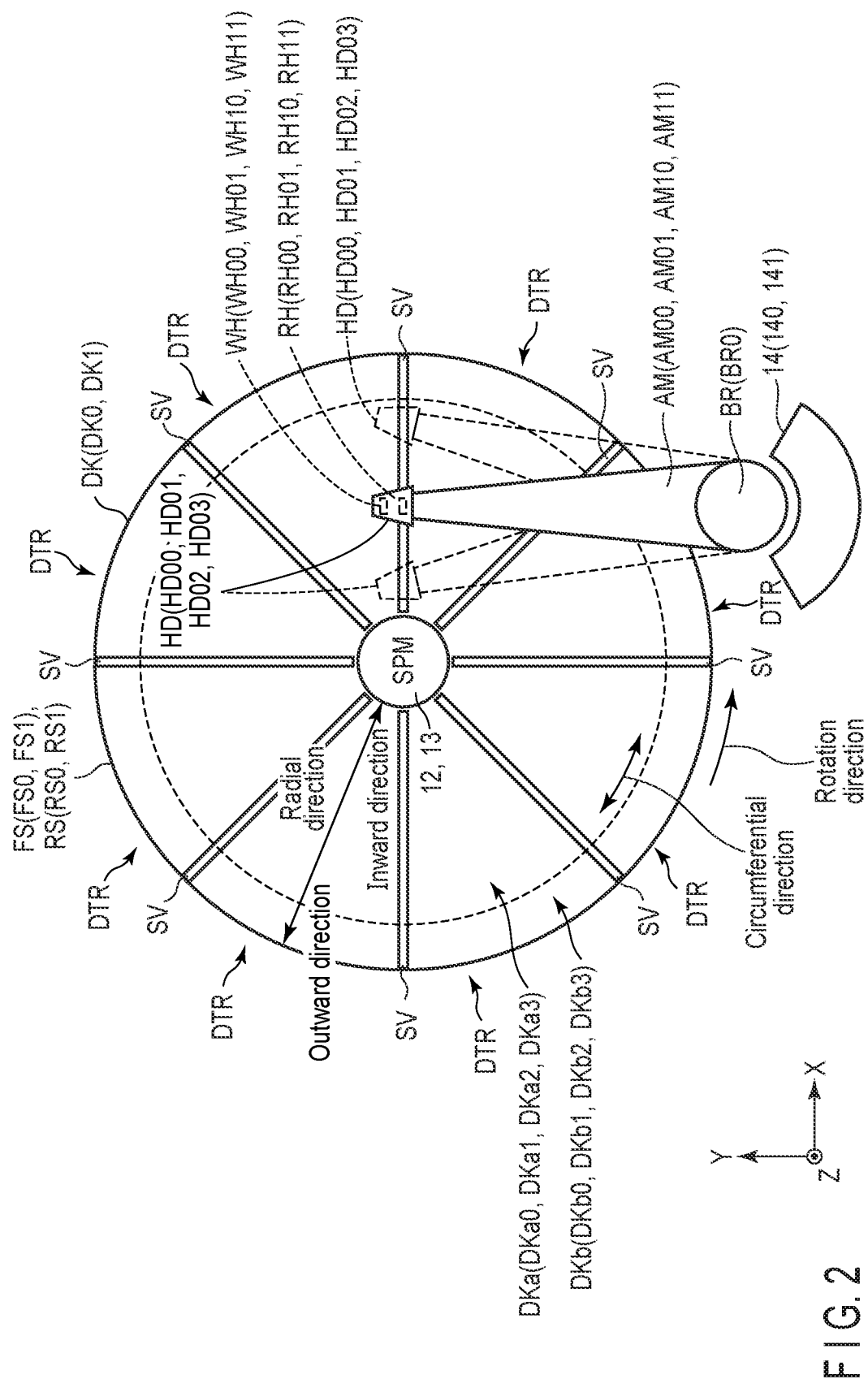
F I G. 2

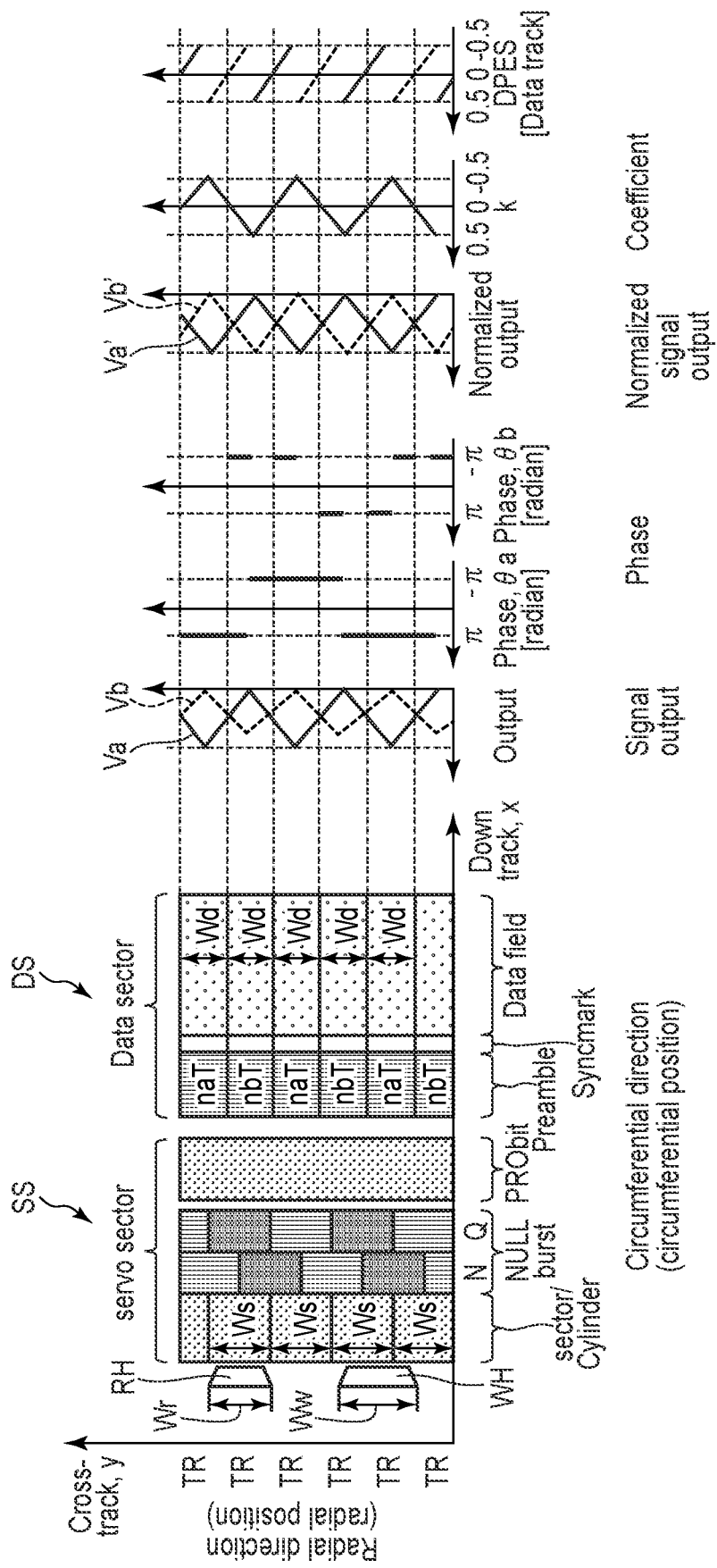
F I G. 6

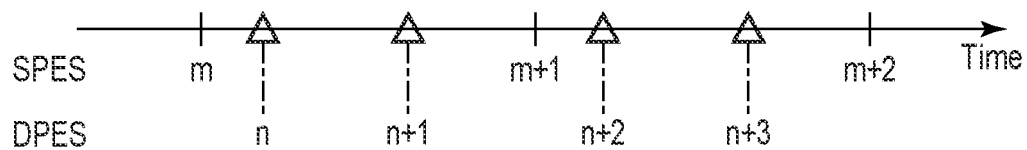
F I G. 9
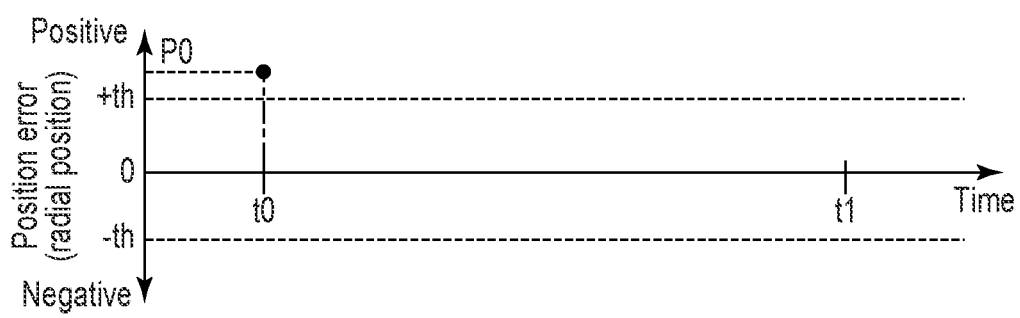
F I G. 10
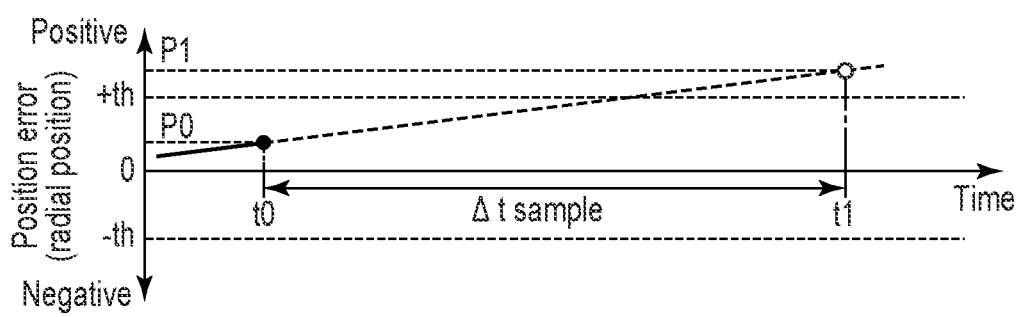
F I G. 11

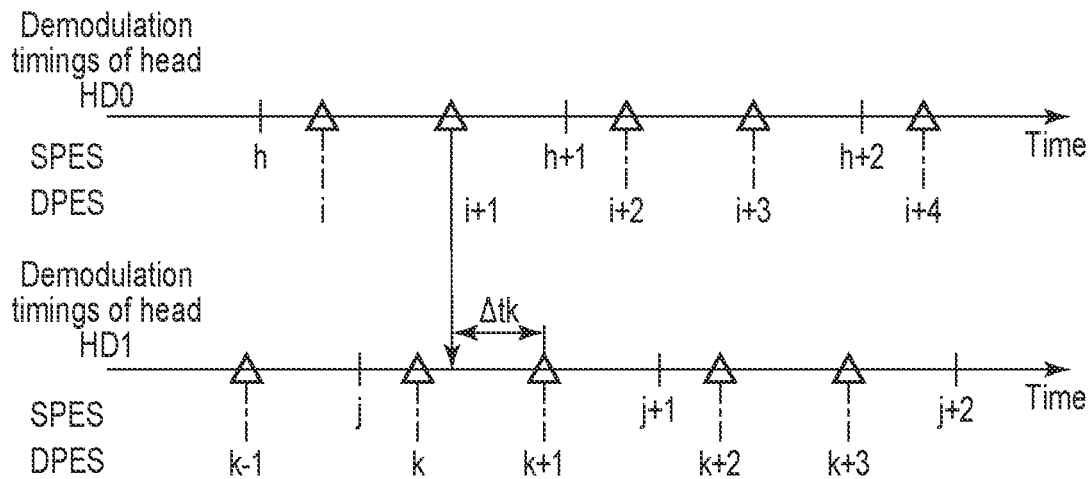
F I G. 12
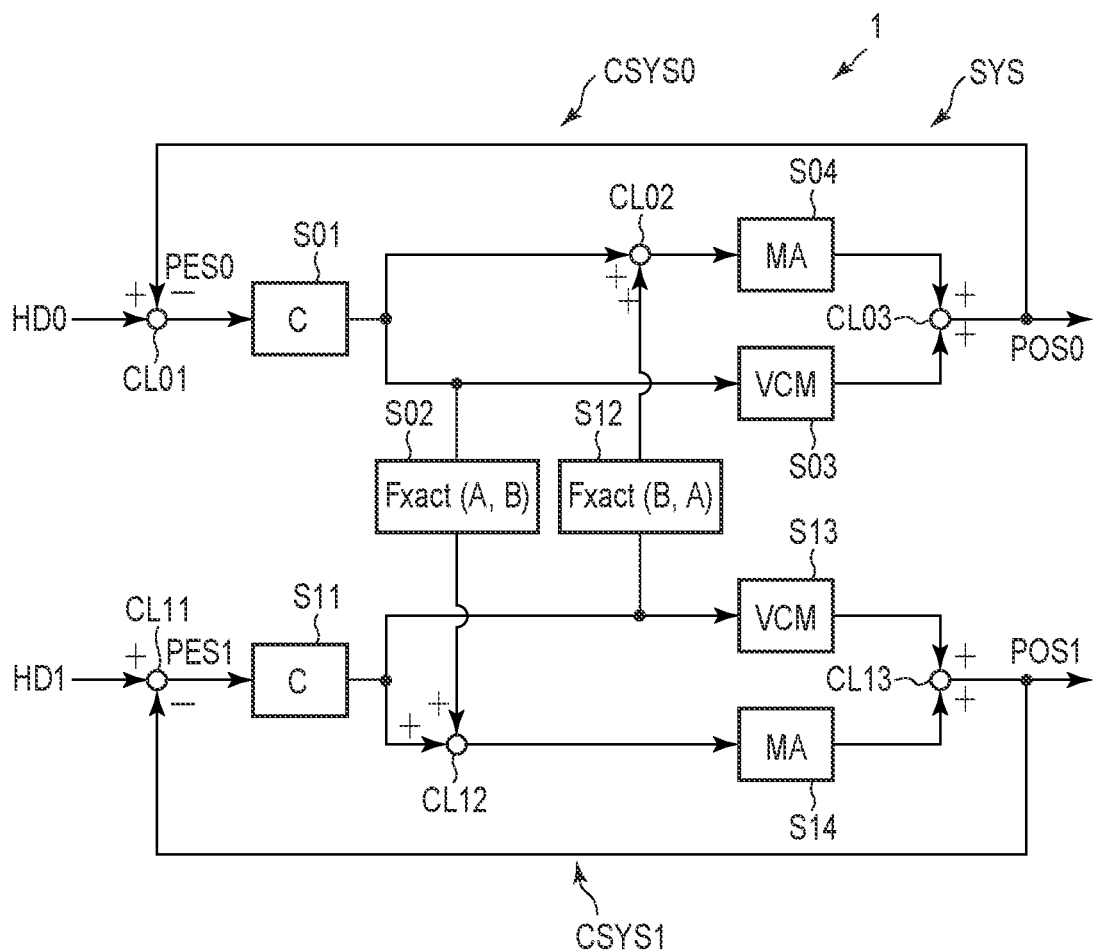
F I G. 13

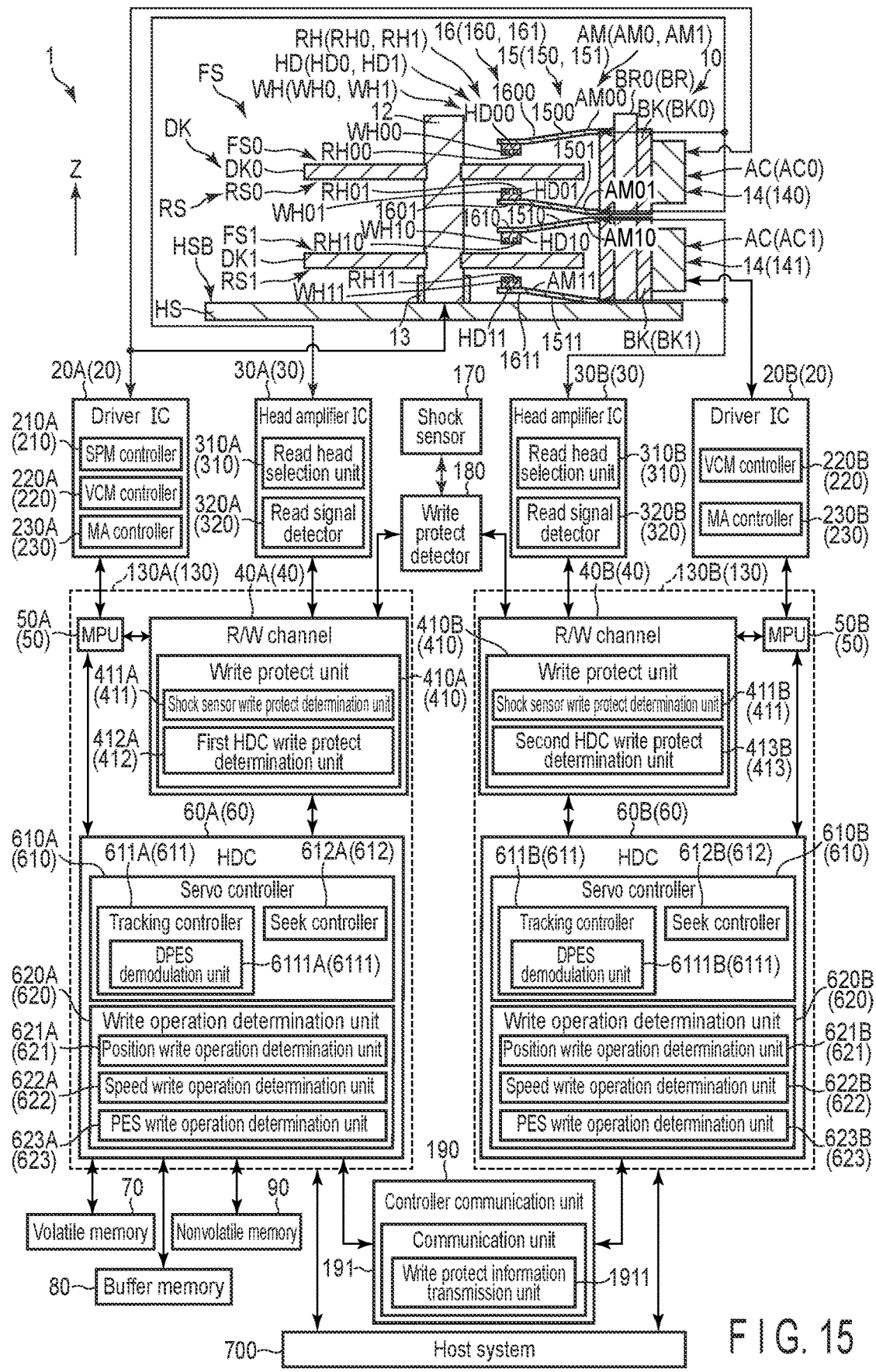
F I G. 15

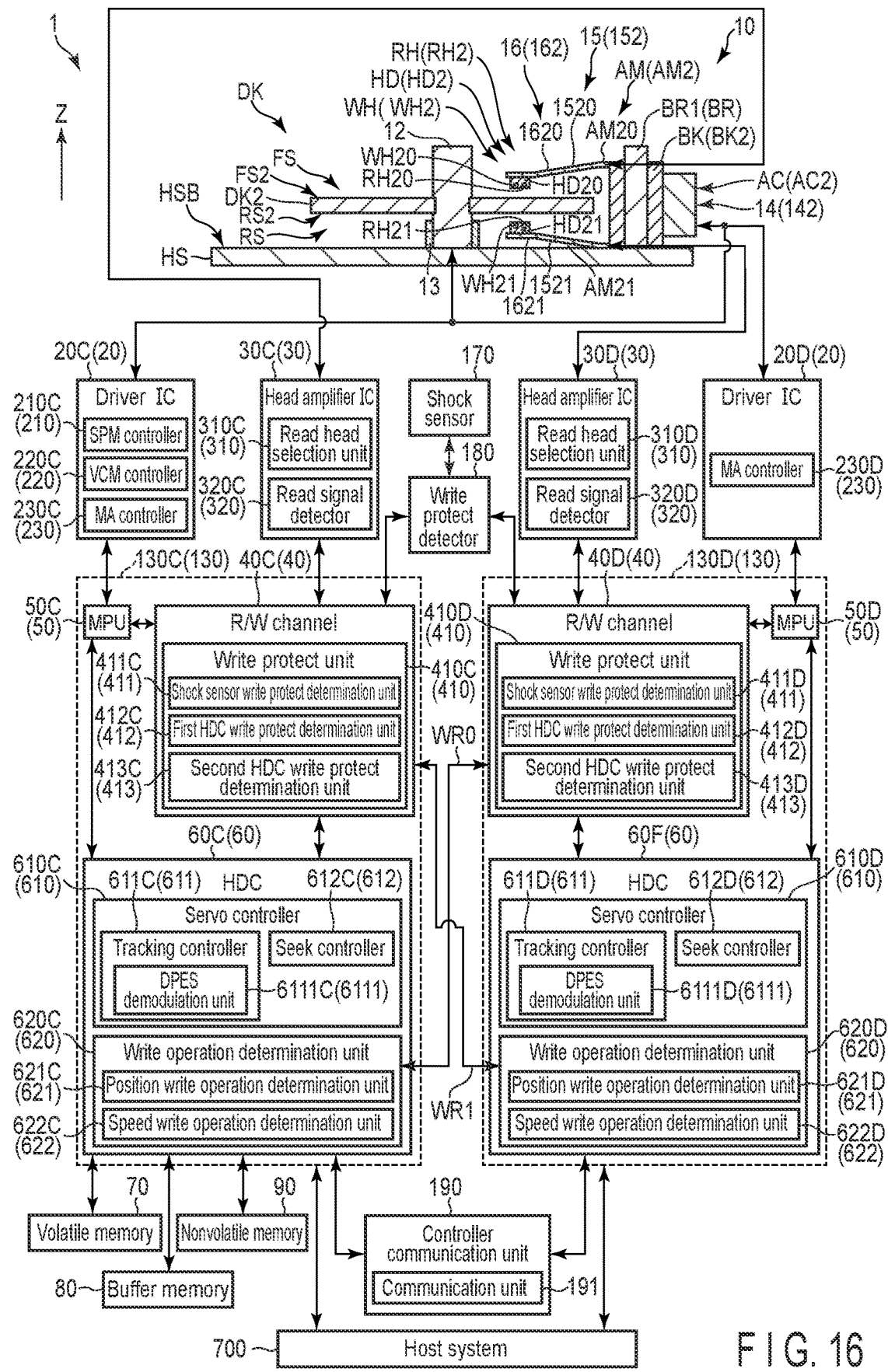
F I G. 16

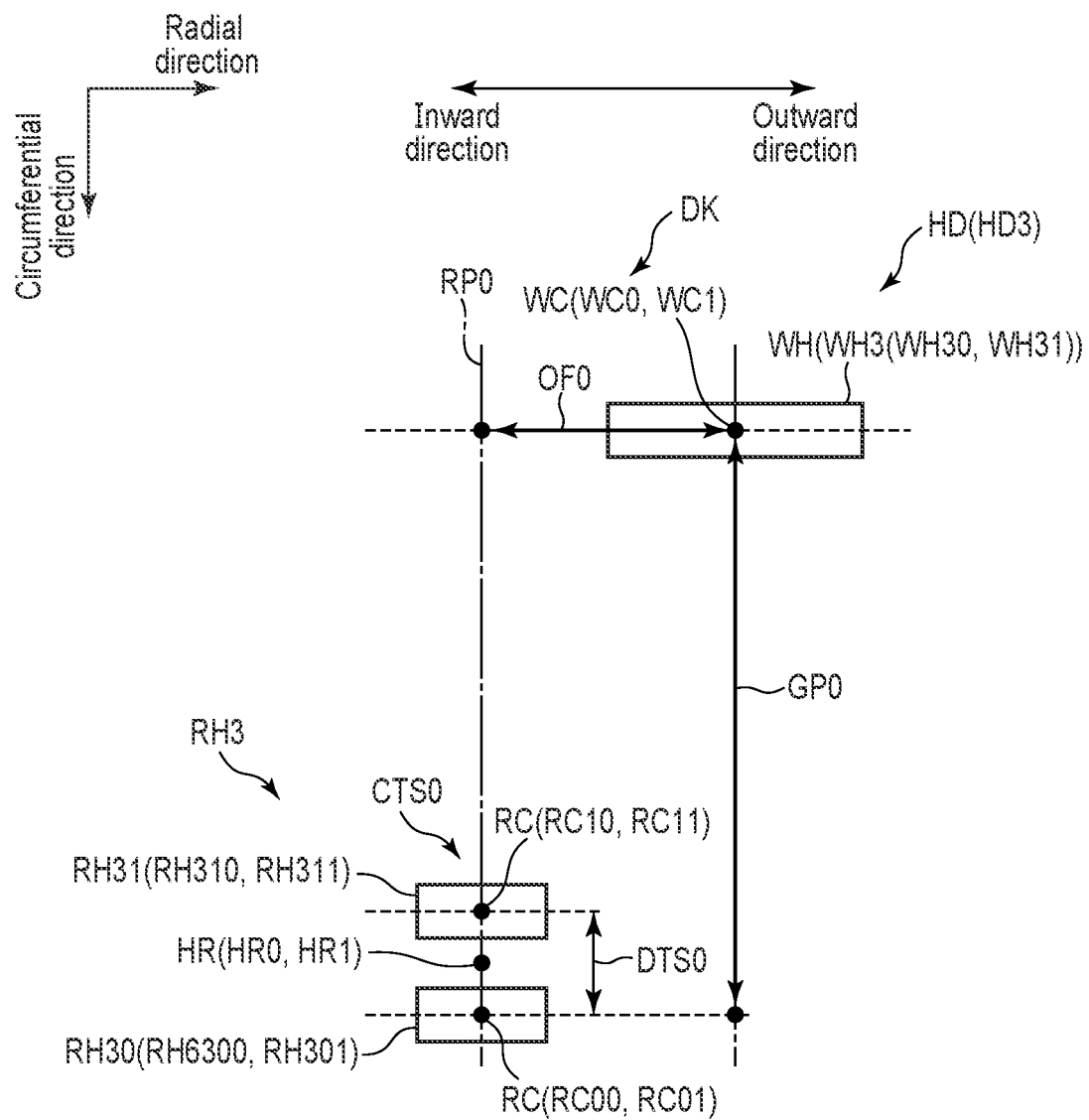
F I G. 21

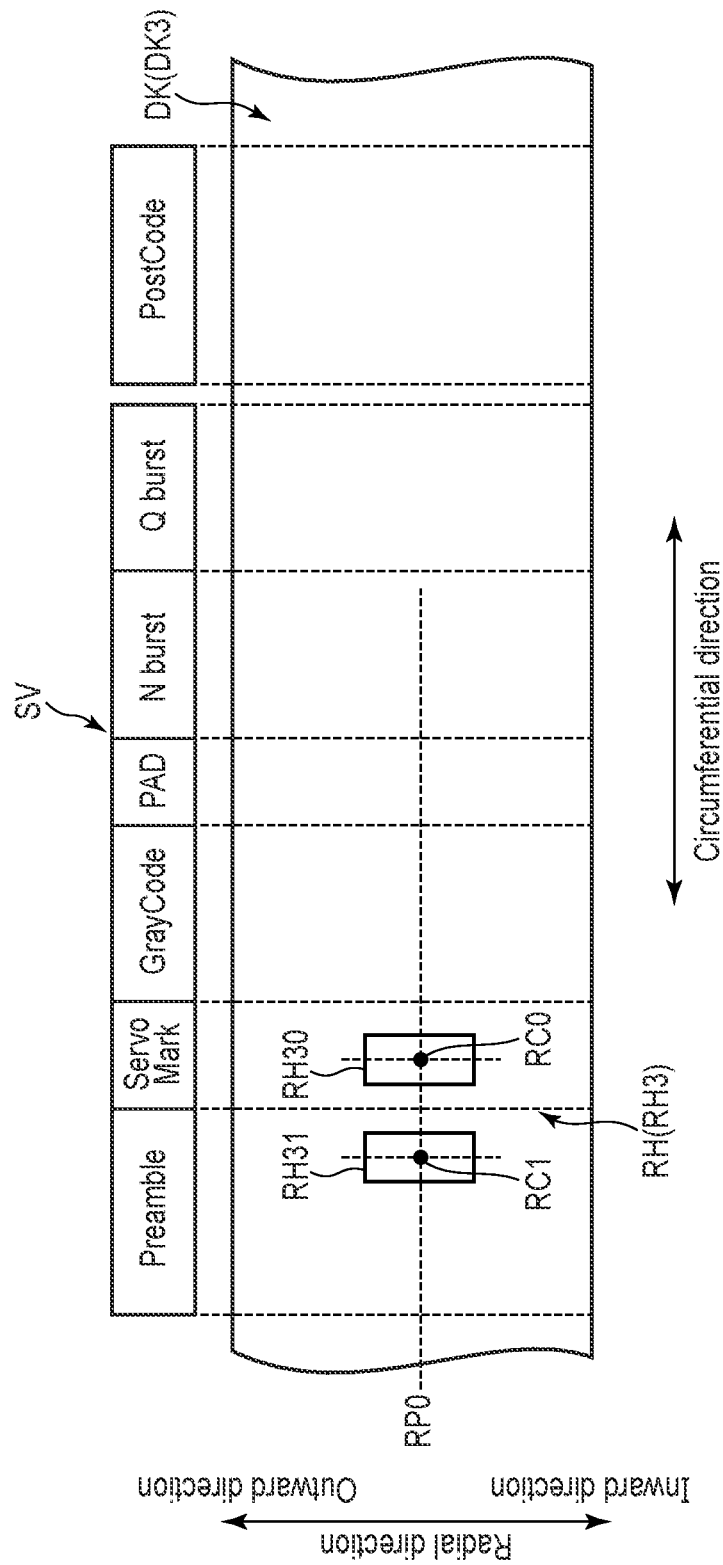
F I G. 23

US 11,557,313 B2

MAGNETIC DISK DEVICE AND METHOD OF STOPPING WRITE OPERATION

CROSS-REFERENCE TO RELATED APPLICATIONS

This application is based upon and claims the benefit of priority from Japanese Patent Application No. 2021-103295, filed Jun. 22, 2021, the entire contents of which are incorporated herein by reference.

FIELD

Embodiments described herein relate generally to a magnetic disk device and a method of stopping a write operation.

BACKGROUND

A magnetic disk device includes a magnetic disk (hereinafter, also referred to as "disk") and a magnetic head (hereinafter, also referred to as "head"). In a case where a vibration or shock is applied, a position of the head of the magnetic disk device changes. In a case where the position of the head and a speed of the head demodulated in a servo sector exceed particular thresholds, the magnetic disk device stops a data write operation.

In recent years, a magnetic disk device including a plurality of actuators (hereinafter, also referred to as "split actuator magnetic disk device" or "multi-actuator magnetic disk device") has been proposed. The split actuator magnetic disk device independently controls a plurality of actuators. In the split actuator magnetic disk device, each actuator detects a position of a head. Thus, a particular time is required until a write operation is stopped. Therefore, the split actuator magnetic disk device needs to have a large value as a threshold of the position of the head.

BRIEF DESCRIPTION OF THE DRAWINGS

FIG. 2 is a plan view illustrating an exemplary arrangement of a head with respect to a disk.

FIG. 6 is a schematic diagram illustrating an exemplary method of demodulating a DPES based on data preambles having different frequencies of adjacent tracks.

FIG. 9 illustrates exemplary timings at which an SPES and a DPES are demodulated.

FIG. 10 is a schematic diagram illustrating an exemplary method of determining prohibition of a write operation according to the first embodiment.

FIG. 11 is a schematic diagram illustrating an exemplary method of determining prohibition of a write operation according to the first embodiment.

FIG. 12 is a schematic diagram illustrating an exemplary method of determining prohibition of write operations of a plurality of heads of a respective plurality of actuators.

FIG. 13 is a block diagram illustrating an exemplary head positioning control system according to the first embodiment.

FIG. 15 is a schematic diagram illustrating an exemplary configuration of a magnetic disk device according to a first modification example.

FIG. 16 is a schematic diagram illustrating an exemplary configuration of a magnetic disk device according to a second embodiment.

FIG. 21 illustrates an exemplary geometric arrangement of a write head and two read heads in which one read head is located at a radial position.

FIG. 23 is a schematic diagram illustrating an exemplary method of demodulating an SPES and a DPES according to the third embodiment.

DETAILED DESCRIPTION

In general, according to one embodiment, a magnetic disk device comprising: a first disk including a first servo sector and a first data sector different from the first servo sector; a second disk including a second servo sector and a second data sector different from the second servo sector; a first head including a first write head that writes data to the first disk and a first read head that reads data from the first disk; a second head including a second write head that writes data to the second disk and a second read head that reads data from the second disk; a first actuator including the first head; a second actuator including the second head; a first controller that stops write operations of both the first head and the second head based on first data sector position error information obtained by reading and demodulating the first data sector by using the first read head; and a second controller that stops the write operations of both the first head and the second head based on second data sector position error information obtained by reading and demodulating the second data sector by using the second read head.

Hereinafter, embodiments will be described with reference to the drawings. The drawings are merely examples and do not limit the scope of the invention.

First Embodiment

Figure 1:
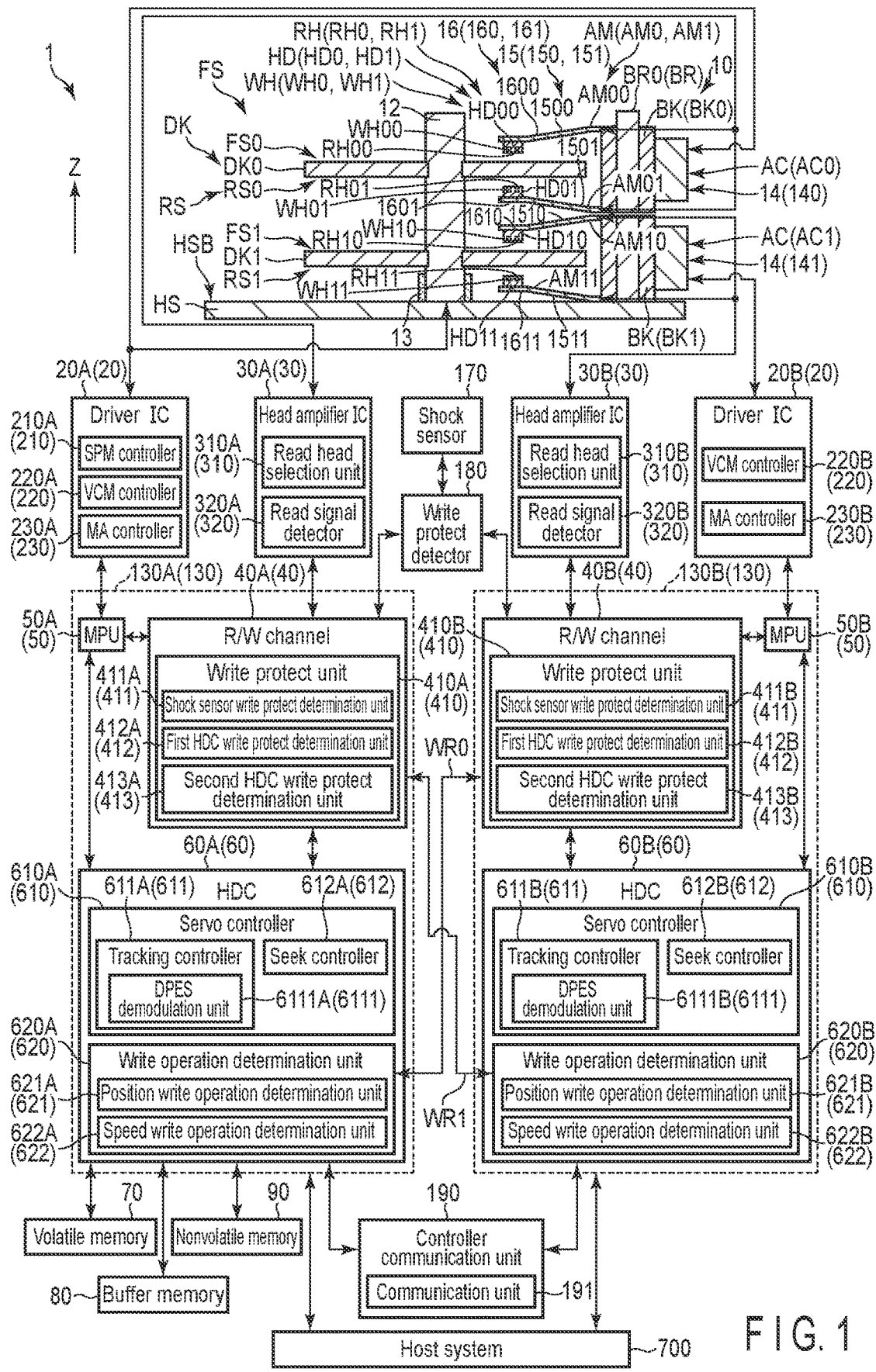
FIG. 1 is a schematic diagram illustrating an exemplary configuration of a magnetic disk device according to a first embodiment.

FIG. 1 is a schematic diagram illustrating an exemplary configuration of a magnetic disk device 1 according to a first embodiment. A first direction Z corresponds to a height (or thickness) direction of the magnetic disk device 1.

The magnetic disk device 1 includes a housing HS, a head disk assembly (HDA) 10, a driver IC 20, a head amplifier integrated circuit (hereinafter, head amplifier IC or preamplifier) 30, a volatile memory 70, a buffer memory (buffer) 80, a nonvolatile memory 90, a shock sensor 170, a write protect detector 180, a controller communication unit 190, and a system controller 130 that is a one-chip integrated circuit. The magnetic disk device 1 is connected to a host system (hereinafter, simply referred to as "host") 700. The magnetic disk device 1 includes a plurality of, for example, two actuators AC (actuators AC1, AC2, and the like described later). The magnetic disk device 1 may include three or more actuators AC. The magnetic disk device 1 can independently drive the plurality of actuators AC. The magnetic disk device 1 is, for example, a split actuator magnetic disk device (or multi-actuator magnetic disk device) capable of independently driving the plurality of actuators AC.

The housing HS has a bottom wall HSB. Although FIG. 1 illustrates the housing HS only having the bottom wall HSB, the housing HS has, for example, the bottom wall HSB, a side wall erected in the first direction Z along a circumferential edge of the bottom wall HSB, and a cover that closes an opening of a base formed by the bottom wall HSB and the side wall.

The HDA 10 includes a magnetic disk (hereinafter, referred to as "disk") DK, a head HD, a spindle motor (hereinafter, also referred to as "SPM") 13 that rotates a spindle 12, an arm AM, an actuator block BK, a voice coil motor (hereinafter, referred to as "VCM") 14, a suspension 15, and a microactuator (hereinafter, also referred to as "MA") 16. Note that the HDA 10 may not include the MA 16. In a case where the MA 16 is not provided in the HDA 10, the head HD may be mounted on the arm AM. FIG. 1 illustrates a cross section of the HDA 10.

The SPM 13 is attached to the bottom wall HSB. The spindle 12 is attached at a central portion of the SPM 13.

The disk DK includes a plurality of disks DK. The disk DK is attached to the spindle 12 and is driven by the SPM 13 to rotate. The disk DK has a front surface (or also referred to as "upper surface") FS and a rear surface (or also referred to as "lower surface") RS opposite to the front surface (or upper surface). Hereinafter, the front surface (or upper surface) and/or the rear surface (or lower surface) will also simply be referred to as "disk DK". In the example illustrated in FIG. 1, the disk DK includes disks DK0 and DK1. The disk DK may include three or more disks. The disks DK0 and DK1 are attached to the spindle 12. The disk DK1 is arranged between, for example, the disk DK0 and the bottom wall HSB. The disk DK0 has an upper surface FS0 and a lower surface RS0 opposite to the upper surface FS0. The disk DK0 may include two or more disks. The disk DK1 has an upper surface FS1 and a lower surface RS1 opposite to the upper surface FS1. The disk DK1 may include two or more disks. Hereinafter, a direction along a circumference of (the upper surface and the lower surface of) the disk DK will be referred to as "circumferential direction", and a direction orthogonal to the circumferential direction of (the upper surface and the lower surface of) the disk DK will be referred to as "radial direction". The radial direction corresponds to a direction toward an inner circumferential side and an outer circumferential side on (the upper surface and the lower surface of) the disk DK.

The head HD includes a plurality of heads HD. The head HD faces the disk DK. The head HD includes a write head WH that writes data to the disk DK and a read head RH that reads data written to the disk DK. Hereinafter, "processing of writing data to the disk DK" will also be referred to as "write processing", and "processing of reading data from the disk DK" will also be referred to as "read processing". Further, "to record data in a particular recording region", "to read data from a particular recording region", "to arrange the head HD at a particular position of the disk DK", "to write data to a particular region of the disk DK", "to read data from a particular region of the disk DK", and the like will also be referred to as "to access".

In the example illustrated in FIG. 1, the head HD includes heads HD0 and HD1. The head HD0 includes a head HD00 facing the upper surface FS0 of the disk DK0 and a head HD01 facing the lower surface RS0 of the disk DK0. The head HD0 may include only one head or three or more heads. The head HD0 includes a write head WH0 that writes data to the disk DK0 and a read head RH0 that reads data written to the disk DK0. The write head WH0 includes a write head WH00 and a write head WH01. The read head RH0 includes a read head RH00 and a read head RH01.

The head HD00 includes the write head WH00 that writes data to the upper surface FS0 and the read head RH00 that reads data written to the upper surface FS0. The head HD01 includes the write head WH01 that writes data to the lower surface RS0 and the read head RH01 that reads data written to the lower surface RS0.

The head HD1 includes a head HD10 facing the upper surface FS1 of the disk DK1 and a head HD11 facing the lower surface RS1 of the disk DK1. The head HD1 may include only one head or three or more heads. The head HD1 includes a write head WH1 that writes data to the disk DK1 and a read head RH1 that reads data written to the disk DK1. The write head WH1 includes a write head WH10 and a write head WH11. The read head RH1 includes a read head RH10 and a read head RH11.

The head HD10 includes the write head WH10 that writes data to the upper surface FS1 and the read head RH10 that reads data written to the upper surface FS1. The head HD11 includes the write head WH11 that writes data to the lower surface RS1 and the read head RH11 that reads data written to the lower surface RS1.

The actuator block BK includes a plurality of actuator blocks BK. The actuator block BK is rotatably attached to a bearing BR erected on the bottom wall HSB. In the example illustrated in FIG. 1, the actuator block BK includes actuator blocks BK0 and BK1. The actuator block BK may include only one actuator block or three or more actuator blocks. The actuator blocks BK0 and BK1 are rotatably attached to a bearing BR0 erected on the bottom wall HSB. The actuator block BK0 is arranged on the actuator block BK1. The actuator block BK1 is located between the bottom wall HSB and the actuator block BK0.

The arm AM includes a plurality of arms AM. The arm AM is connected to the actuator block BK. In the example illustrated in FIG. 1, the arm AM includes arms AM0 and AM1. The arm AM0 is arranged above the arm AM1. In other words, the arm AM1 is arranged between the arm AM0 and the bottom wall HSB of the housing HS. The arm AM may include only one arm or three or more arms depending on the number of heads HD.

The arm AM0 includes an arm AM00 located on the upper surface FS0 side of the disk DK0 and an arm AM01 located on the lower surface RS0 side of the disk DK. The arm AM0 may include only one arm or three or more arms depending on the number of heads HD0. The arm AM0 is connected to the actuator block BK0.

The arm AM1 includes an arm AM10 located on the upper surface FS1 side of the disk DK1 and an arm AM11 located on the lower surface RS1 side of the disk DK1. The arm AM1 may include only one arm or three or more arms depending on the number of heads HD1. The arm AM1 is connected to the actuator block BK1.

The VCM 14 includes a plurality of VCMs 14. The VCM 14 is connected to the actuator block BK on a side opposite to the arm AM. In the example illustrated in FIG. 1, the VCM 14 includes VCMs 140 and 141. The VCM 14 may include only one VCM or three or more VCMs depending on the number of actuator blocks BK. The VCM 140 is connected to the actuator block BK0 on a side opposite to the arm AM0. The VCM 140 is located above the VCM 141. The VCM 141 is connected to the actuator block BK1 on a side opposite to the arm AM1. The VCM 141 is located between the bottom wall HSB and the VCM 140.

The suspension 15 includes a plurality of suspensions 15. The suspension 15 is attached to the arm AM. The suspension 15 has a distal end portion on which the head HD is mounted, the distal end portion being opposite to one end portion connected to the arm AM. In the example illustrated in FIG. 1, the suspension 15 includes suspensions 150 and 151. The suspension 150 is arranged above the suspension 151. The suspension 151 is arranged between the suspension 150 and the bottom wall HSB of the housing HS. The suspension 15 may include only one suspension or three or more suspensions depending on the number of arms AM.

The suspension 150 is attached to the arm AM0. The suspension 150 has a distal end portion on which the head HD0 is mounted, the distal end portion being opposite to one end portion connected to the arm AM0. The suspension 150 includes a suspension 1500 attached to the arm AM00 and a suspension 1501 attached to the arm AM01. The suspension 150 may include only one suspension or three or more suspensions depending on the number of arms AM0. The suspension 1500 has a distal end portion on which the head HD00 is mounted, the distal end portion being opposite to one end portion connected to the arm AM00. The suspension 1501 has a distal end portion on which the head HD01 is mounted, the distal end portion being opposite to one end portion connected to the arm AM01.

The suspension 151 is attached to the arm AM1. The suspension 151 has a distal end portion on which the head HD1 is mounted, the distal end portion being opposite to one end portion connected to the arm AM1. The suspension 151 includes a suspension 1510 attached to the arm AM10 and a suspension 1511 attached to the arm AM11. The suspension 151 may include only one suspension or three or more suspensions depending on the number of arms AM1. The suspension 1510 has a distal end portion on which the head HD10 is mounted, the distal end portion being opposite to one end portion connected to the arm AM10. The suspension 1511 has a distal end portion on which the head HD11 is mounted, the distal end portion being opposite to one end portion connected to the arm AM11.

The MA 16 includes a plurality of MAs 16. The MA 16 is attached to the arm AM, the suspension 15, or the head HD. The MA 16 finely controls operation of the head HD in the radial direction. For example, the MA 16 controls the operation of the head HD in the radial direction more finely than the VCM 14 does.

In the example illustrated in FIG. 1, the MA 16 includes an MA 160 and an MA 161.

The MA 160 is attached to the suspension 150. The MA 160 finely controls operation of the head HD0 in the radial direction. For example, the MA 160 controls the operation of the head HD0 in the radial direction more finely than the VCM 140 does. The MA 160 includes, for example, an MA 1600 attached to the suspension 1500 and an MA 1601 attached to the suspension 1501. The MA 160 may include only one MA or three or more MAs depending on the number of suspensions 150.

The MA 1600 finely controls operation of the head HD00 in the radial direction. For example, the MA 1600 controls the operation of the head HD00 in the radial direction more finely than the VCM 140 does. The MA 1601 finely controls operation of the head HD01 in the radial direction. For example, the MA 1601 controls the operation of the head HD01 in the radial direction more finely than the VCM 140 does.

The MA 161 is attached to the suspension 151. The MA 161 finely controls operation of the head HD1 in the radial direction. For example, the MA 161 controls the operation of the head HD1 in the radial direction more finely than the VCM 141 does. The MA 161 includes, for example, an MA 1610 attached to the suspension 1510 and an MA 1611 attached to the suspension 1511. The MA 161 may include only one MA or three or more MAs depending on the number of suspensions 151. The MA 1610 finely controls operation of the head HD10 in the radial direction. For example, the MA 1610 controls the operation of the head HD10 in the radial direction more finely than the VCM 141 does. The MA 1611 finely controls operation of the head HD11 in the radial direction. For example, the MA 1611 controls the operation of the head HD11 in the radial direction more finely than the VCM 141 does.

The actuator AC includes a plurality of actuators AC. Each of the plurality of actuators AC is rotationally (or rotatably) attached to the bearing BR. In other words, each of the plurality of actuators AC independently rotates around the bearing BR. The plurality of actuators AC may rotate in parallel around the bearing BR. Each of the plurality of actuators AC includes the VCM 14, the suspension 15, the MA 16, the arm AM, and the actuator block BK. Each of the plurality of actuators AC drives the VCM 14 and finely drives the MA 16 around the bearing BR, thereby positioning the head HD mounted on the suspension 15 at a particular position of the disk DK. In a case where the MA 16 is not provided, each of the plurality of actuators AC drives the VCM 14 around the bearing BR, thereby positioning the head HD mounted on the suspension 15 at a particular position of the disk DK.

In the example illustrated in FIG. 1, the actuator AC includes actuators AC0 and AC1. The actuator AC0 is arranged above the actuator AC1. In other words, the actuator AC1 is arranged between the bottom wall HSB and the actuator AC0. Three or more actuators AC may be provided.

The actuator AC0 is rotatably attached to the bearing BR0. The actuator AC0 includes the suspension 150, the MA 160, the arm AM0, the actuator block BK0, and the VCM 140. The actuator AC0 drives the VCM 140 and finely drives the MA 160 around a rotation axis of the bearing BR, thereby positioning the head HD0 mounted on the suspension 150 at a particular position of the disk DK0. In a case where the MA 160 is not provided, the actuator AC0 drives the VCM 140 around the bearing BR0, thereby positioning the head HD0 mounted on the suspension 150 at a particular position of the disk DK0.

The actuator AC1 is rotatably attached to the bearing BR0. The actuator AC1 includes the suspension 151, the MA 161, the arm AM1, the actuator block BK1, and the VCM 141. The actuator AC1 drives the VCM 141 and finely drives the MA 161 around a rotation axis of the bearing BR0, thereby positioning the head HD1 mounted on the suspension 151 at a particular position of the disk DK1. In a case where the MA 161 is not provided, the actuator AC1 drives the VCM 141 around the bearing BR0, thereby positioning the head HD1 mounted on the suspension 151 at a particular position of the disk DK1.

FIG. 2 is a plan view illustrating an exemplary arrangement of the head HD with respect to the disk DK. As illustrated in FIG. 2, a direction toward an outer circumference of the disk DK in the radial direction will be referred to as "outward direction (outer side)", and a direction opposite to the outward direction will be referred to as "inward direction (inner side)". In the circumferential direction, a direction in which the disk DK rotates will be referred to as "rotation direction". In the example illustrated in FIG. 2, the rotation direction is a counterclockwise direction but may be an opposite (clockwise) direction. A second direction X and a third direction Y correspond to directions parallel to the upper surface or lower surface of the disk DK. Viewing an X-Y plane defined by the second direction X and the third direction Y will also be referred to as "plan view".

A user data region DKa (DKa0, DKa1, DKa2, DKa3) usable by a user and a system area DKb (DKb0, DKb1, DKb2, DKb3) where information necessary for system management (hereinafter, also referred to as "system information") is written are allocated in a data writable region of the upper surface FS (FS0, FS1) and the lower surface RS (RS0, RS1) of the disk DK (DK0, DK1). Hereinafter, a particular position in the radial direction of the disk DK will also be referred to as "radial position", and a particular position in the circumferential direction of the disk DK will also be referred to as "circumferential position". The radial position and the circumferential position will also be collectively simply referred to as "position". For example, the radial position corresponds to a position in the radial direction of a track or a sector, and the circumferential position corresponds to a position in the circumferential direction of a sector in a particular track. For example, the position corresponds to a position of the sector on the disk DK. The position of the sector can be indicated by at least one of a cylinder (track) number including a particular sector, a head number of the head HD accessing the particular sector, a sector number of the particular sector, a radial position of the particular sector on the disk DK, and a disk angle of the particular sector. For example, the position of the sector is indicated by a combination of two of the cylinder (track) number including the particular sector, the head number of the head HD accessing the particular sector, the sector number of the particular sector, the radial position of the particular sector on the disk DK, and the disk angle of the particular sector. At least one track can be arranged on the disk DK. Hereinafter, the "track" will be used as "a region among a plurality of regions into which the disk DK is divided in the radial direction", "data for a round written in the circumferential direction of the disk DK", "a path for a round in the circumferential direction of the disk DK", or various other meanings. "Tracks adjacent in the radial direction on the disk DK" will also be referred to as "adjacent tracks". The track includes a plurality of sectors. The "sector" will be used as "a region among a plurality of regions into which a track is divided in the circumferential direction", "data written to a region among a plurality of regions into which a track is divided in the circumferential direction", or various other meanings.

In the example illustrated in FIG. 2, the user data region DKa0 and the system area DKb0 are allocated on the upper surface FS0 of the disk DK0. The user data region DKa1 and the system area DKb1 are allocated on the lower surface RS0 of the disk DK0. The user data region Dka2 and the system area DKb2 are allocated on the upper surface FS1 of the disk DK1. The user data region DKa3 and the system area DKb3 are allocated on the lower surface RS1 of the disk DK1. The disks DK0 and DK1 overlap each other in plan view.

The disk DK includes a plurality of servo regions (hereinafter, also referred to as "servo patterns") SV (not illustrated) and a plurality of data regions DTR (not illustrated). For example, the plurality of servo patterns extends in the radial direction of the disk DK and are discretely arranged at particular intervals in the circumferential direction. The plurality of data regions is arranged between, for example, servo patterns adjacent in the circumferential direction on the disk DK. "Adjacent" includes pieces of data, objects, regions, spaces, and the like not only being arranged in contact with each other but also being arranged at particular intervals. Hereinafter, a servo region SV in a particular track will also be referred to as "servo sector". The servo region SV will also be referred to as "servo sector SV". The servo sector has servo data. The "servo data written to the servo sector" will also be referred to as "servo sector". A single sector in the data region DTR on a particular track will also be referred to as "data sector". The data region DTR includes a plurality of sectors. The data region DTR only needs to include only one sector. The data region DTR will also be referred to as "data sector DTR". The data sector has user data. Data other than the servo data written to the user data region DKa other than the servo sector will also be referred to as "user data". The "user data written to the data sector" will also be referred to as "data sector".

For example, at the time of seeking, the head HD slides on a horizontal plane of the disk DK as the actuator AC rotates around the bearing BR. In the example illustrated in FIG. 2, for example, at the time of seeking, the head HD1 slides on a horizontal plane of the disk DK1 as the actuator AC1 rotates around the bearing BR1.

Figure 3:
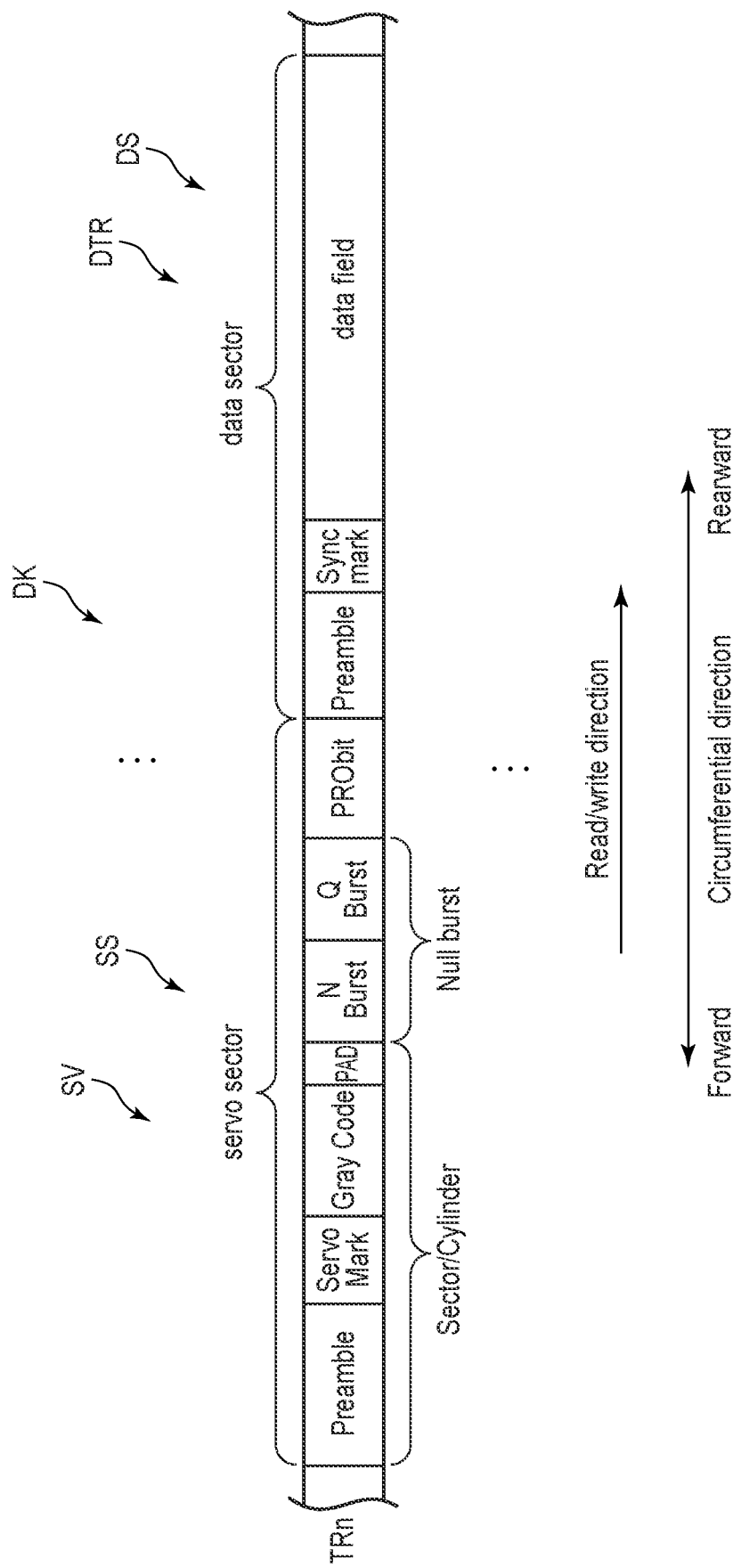
FIG. 3 is a schematic diagram illustrating exemplary configurations of a servo sector and a data sector according to the first embodiment.

FIG. 3 is a schematic diagram illustrating exemplary configurations of a servo sector SS and a data sector DS according to the present embodiment. FIG. 3 illustrates a particular servo sector SS written to a particular track TRn of the disk DK. As illustrated in FIG. 3, in the circumferential direction, a direction toward a tip of a forward arrow will be referred to as "forward (or forward direction), and a direction toward a tip of a rearward arrow will be referred to as "rearward (or rearward direction). For example, in the circumferential direction, a direction in which read/write is performed (read/write direction) corresponds to a direction from the forward direction to the rearward direction. The read/write direction corresponds to, for example, an opposite direction to the rotation direction illustrated in FIG. 2.

The servo sector SS includes a sector/cylinder, a Null burst, and RRObit. Note that the servo sector SS may not include the RRObit. The servo sector SS may include a postcode instead of the RRObit. In the servo sector SS, the sector/cylinder, the Null burst, and the RRObit are successively arranged in the read/write direction in the described order.

The sector/cylinder includes a preamble, a servo mark, a gray code, and a PAD. The preamble includes preamble information for synchronization with a reproduction signal of a servo pattern including the servo mark, the gray code, and the like. The servo mark has servo mark information indicating the start of the servo pattern. The gray code includes an address (cylinder address) of a particular track and an address of a servo sector of the particular track. The PAD has PAD information of a synchronization signal of a gap, servo AGC, and the like.

The Null burst is data (relative position data) used to detect a targeted position (hereinafter, also referred to as "target position") of the head HD on a particular track (or particular sector), for example, radial (and/or circumferential) misregistration (position error) of the head HD from a track center and includes a repetitive pattern in a particular cycle. The Null burst is written in a data pattern in which a phase of burst data is inverted by 180° in a servo track cycle in the radial direction of the disk DK. The servo track (servo cylinder) corresponds to a track to be subjected to write processing or read processing in response to a command from the host 700 or the like. The burst data is used to, for example, acquire a radial and/or circumferential position of the head HD (hereinafter, also referred to as "head position") on the disk DK. The Null burst includes, for example, an N burst and a Q burst. The N burst and the Q burst are written in a data pattern in which phases are shifted from each other by 90° in the radial direction of the disk DK.

The RRObit has, for example, a targeted path (hereinafter, also referred to as "target path") of the head HD concentrically arranged with the disk DK caused by wobble (repetitive runout: RRO) synchronized with the rotation of the disk DK obtained when the servo data is written to the disk. For example, the RRObit has data (hereinafter, referred to as "RRO correction data") for correcting an error caused by distortion of the track with respect to the track center. Hereinafter, for convenience of description, the error caused by the distortion of the track with respect to the target path triggered by the RRO will also simply be referred to as "RRO".

The data sector DS is adjacent to the servo sector SS. In the example illustrated in FIG. 3, the data sector DS is adjacent to the servo sector SS in the read/write direction (or rearward direction). User data is written to the data sector DS.

The data sector DS includes a preamble (preamble), a syncmark, and a data field. In the data sector DS, the preamble, the syncmark, and the data field are successively arranged in the read/write direction in the described order. The preamble has preamble information for synchronizing a reproduction signal of the data sector. Hereinafter, the preamble of the data sector DS will also be referred to as "data preamble". The syncmark includes information indicating the start of the data field. Hereinafter, the syncmark of the data sector DS will also be referred to as "data syncmark". The data field corresponds to a region where the user data is written (or recorded).

Figure 4:
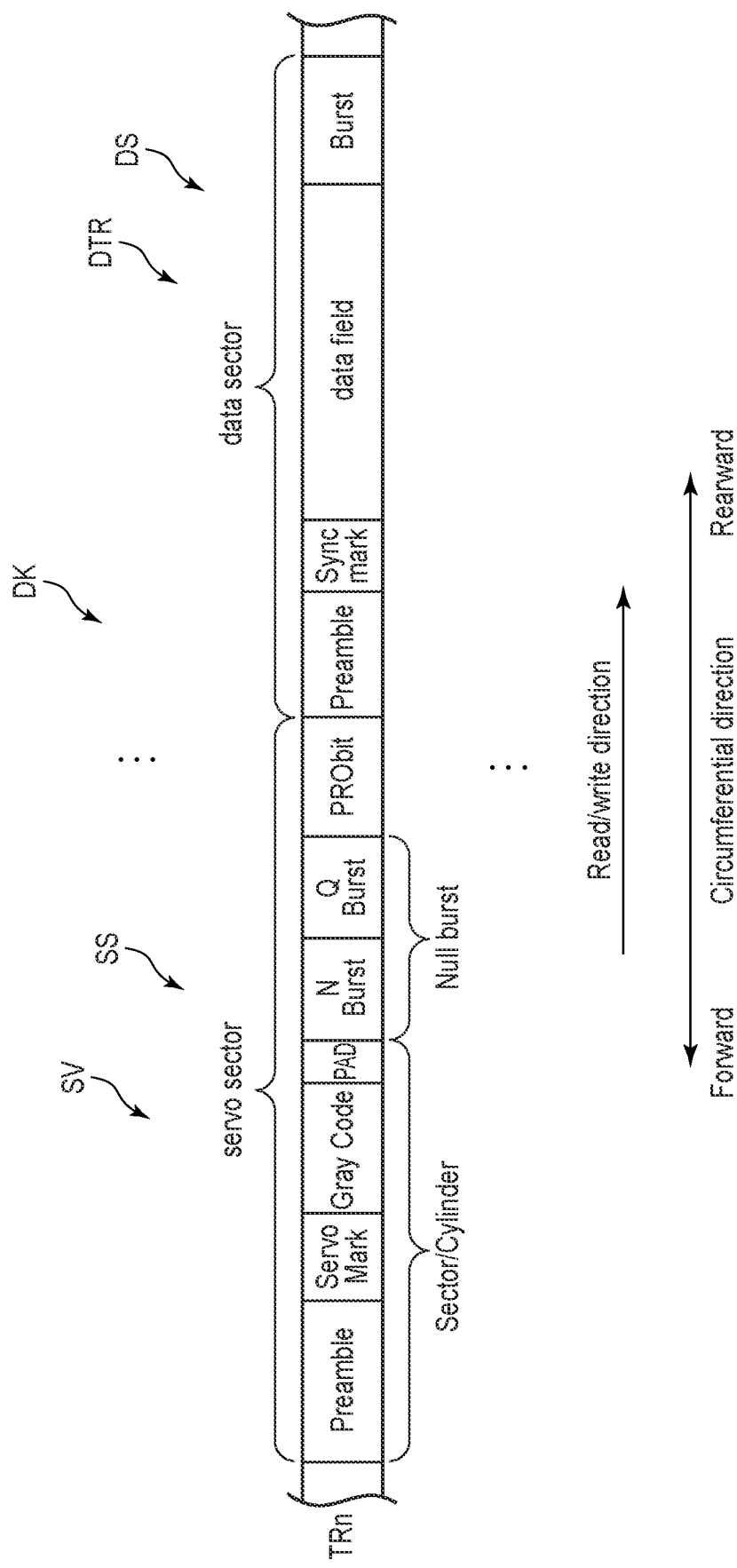
FIG. 4 is a schematic diagram illustrating exemplary configurations of the servo sector and the data sector according to the first embodiment.

FIG. 4 is a schematic diagram illustrating exemplary configurations of the servo sector SS and the data sector DS according to the present embodiment.

The data sector DS includes a data preamble, a data syncmark, a data field, and a burst. In the data sector DS, the preamble, the syncmark, the data field, and the burst are successively arranged in the read/write direction in the described order. The burst is data (relative position data) used to detect a radial and/or circumferential misregistration (position error) of the head HD from the track center of the particular track and includes a repetitive pattern in a particular cycle. Hereinafter, the burst of the data sector DS will also be referred to as "data burst".

Figure 5:
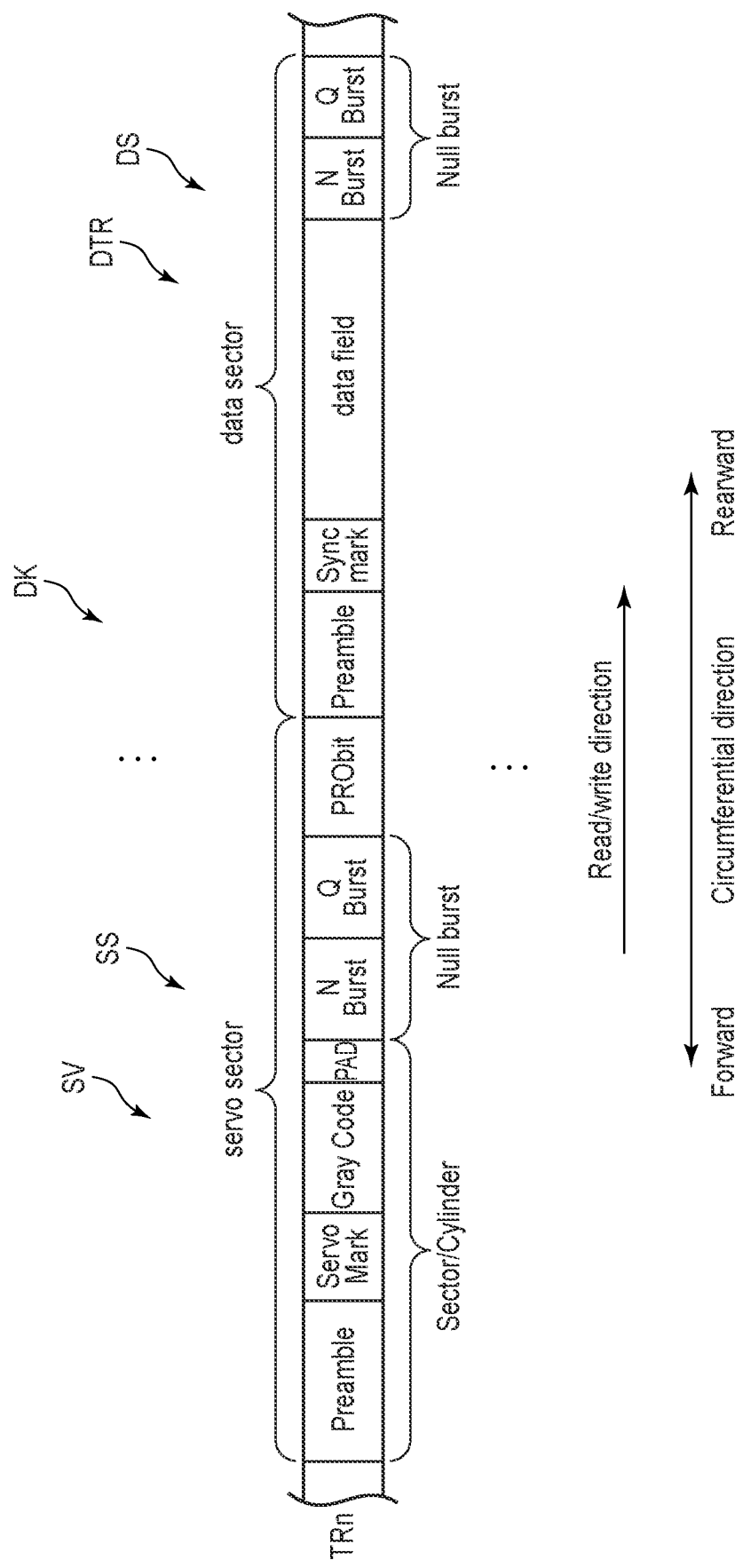
FIG. 5 is a schematic diagram illustrating exemplary configurations of the servo sector and the data sector according to the first embodiment.

FIG. 5 is a schematic diagram illustrating exemplary configurations of the servo sector SS and the data sector DS according to the present embodiment.

The data sector DS includes a data preamble, a data syncmark, a data field, and a Null burst. In the data sector DS, the preamble, the syncmark, the data field, and the Null burst are successively arranged in the read/write direction in the described order. The Null burst is data (relative position data) used to detect a radial and/or circumferential misregistration (position error) of the head HD from the track center of the particular track and includes a repetitive pattern in a particular cycle. Hereinafter, the Null burst of the data sector DS will also be referred to as "data Null burst". The data Null burst is written in a data pattern in which a phase of burst data is inverted by 180° in a servo track cycle in the radial direction of the disk DK. The data Null burst includes, for example, an N burst (hereinafter, also referred to as "data N burst") and a Q burst (hereinafter, also referred to as "data Q burst"). The data N burst and the data Q burst each is written in a pattern in which phases are shifted by 90° in a cycle. The data N burst and the data Q burst are written in a pattern in which phases of bursts adjacent in the circumferential direction are shifted by 180°.

The driver IC 20 controls driving of the SPM 13, the VCM 14 (VCMs 140 and 141), and/or the MA 16 under the control of the system controller 130 (specifically, an MPU 50 or HDC 60 described later). The driver IC 20 is electrically connected to the SPM 13, the VCM 14, and the MA 16. The driver IC 20 is connected to the SPM 13, the VCM 14, and the MA 16 via, for example, a particular interface.

The driver IC 20 includes an SPM controller 210, a VCM controller 220, and a microactuator (MA) controller 230. The SPM controller 210 controls rotation of the SPM 13. The VCM controller 220 controls driving of the VCM 14 by controlling a current (or voltage) to be supplied to the VCM 14. The MA controller 230 controls driving of the MA 16 by controlling a current (or voltage) to be supplied to the MA 16. A part of the configuration of the driver IC 20 (e.g., the SPM controller 210, the VCM controller 220, and the MA controller 230) may be provided in the system controller 130. In a case where the MA 16 is not provided in the actuator AC, the MA controller 230 may not be provided. Further, the driver IC 20 may not include at least one of the SPM controller 210, the VCM controller 220, and the MA controller 230.

In the example illustrated in FIG. 1, the driver IC 20 includes a driver IC 20A and a driver IC 20B. The driver ICs 20A and 20B are formed in separate configurations, for example, in separate circuits. Note that the driver ICs 20A and 20B may be formed in an integrated configuration, for example, in an integrated circuit. The driver IC 20 may include only one driver IC or three or more driver ICs depending on the number of actuators AC, heads HD, or the like. The SPM controller 210 includes an SPM controller 210A. The SPM controller 210 may include only one SPM controller or two or more SPM controllers. The VCM controller 220 includes VCM controllers 220A and 220B. The VCM controller 220 may include only one VCM controller or three or more VCM controllers. The MA controller 230 may include MA controllers 230A and 230B. The MA controller 230 may include only one MA controller or three or more MA controllers.

The driver IC 20A controls driving of the SPM 13, the VCM 140, and the MA 160 under the control of a system controller 130A (specifically, an MPU 50A or HDC 60A described later). The driver IC 20A is electrically connected to the SPM 13, the VCM 140, and the MA 160. The driver IC 20A is connected to the SPM 13, the VCM 140, and the MA 160 via, for example, a particular interface.

The driver IC 20A includes the SPM controller 210A, the VCM controller 220A, and the microactuator (MA) controller 230A. The SPM controller 210A controls rotation of the SPM 13. The VCM controller 220A controls driving of the VCM 140 by controlling a current (or voltage) to be supplied to the VCM 140. The MA controller 230A controls driving of the MA 160 by controlling a current (or voltage) to be supplied to the MA 160. A part of the configuration of the driver IC 20A (e.g., the SPM controller 210A, the VCM controller 220A, and the MA controller 230A) may be provided in the system controller 130A. In a case where the MA 160 is not provided in the actuator AC0, the MA controller 230A may not be provided.

The driver IC 20B controls driving of the VCM 141 and the MA 161 under the control of a system controller 130B (specifically, an MPU 50B or HDC 60B described later). The driver IC 20B is electrically connected to the VCM 141 and the MA 161. The driver IC 20B is connected to the VCM 141 and the MA 161 via, for example, a particular interface.

The driver IC 20B includes the VCM controller 220B and the MA controller 230B. The VCM controller 220B controls driving of the VCM 141 by controlling a current (or voltage) to be supplied to the VCM 141. The MA controller 230B controls driving of the MA 161 by controlling a current (or voltage) to be supplied to the MA 161. A part of the configuration of the driver IC 20B (e.g., the VCM controller 220B and the MA controller 230B) may be provided in the system controller 130B. In a case where the MA 161 is not provided in the actuator AC1, the MA controller 230B may not be provided.

The head amplifier IC (preamplifier) 30 amplifies a read signal read from the disk DK and outputs the amplified read signal to the system controller 130 (specifically, a read/write (R/W) channel 40 described later). The head amplifier IC 30 is electrically connected to each head HD, for example, the head HD0 and the head HD1. The head amplifier IC 30 outputs, to the head HD, a write current corresponding to a signal output from the R/W channel 40.

The head amplifier IC 30 includes a read head selection unit 310 and a read signal detector 320. The read head selection unit 310 selects the read head RH for reading data from the disk DK in the actuator AC. The read signal detector 320 detects a signal (read signal) read by the read head RH from the disk DK. A part of the configuration of the head amplifier IC 30 (e.g., the read head selection unit 310 and the read signal detector 320) may be provided in the system controller 130.

In the example illustrated in FIG. 1, the head amplifier IC 30 includes a head amplifier IC 30A and a head amplifier IC 30B. The head amplifier IC 30 may include only one head amplifier IC or three or more head amplifier ICs. The head amplifier ICs 30A and 30B are formed in separate configurations, for example, in separate circuits. Note that the head amplifier ICs 30A and 30B may be formed in an integrated configuration, for example, in an integrated circuit. The read head selection unit 310 includes read head selection units 310A and 310B. The read head selection unit 310 may include only one read head selection unit or three or more read head selection units. The read signal detector 320 includes read signal detectors 320A and 320B. The read signal detector 320 may include only one read signal detector or three or more read signal detectors.

The head amplifier IC 30A amplifies a read signal read from the disk DK0 and outputs the amplified read signal to the system controller 130A (specifically, a read/write (R/W) channel 40A described later). The head amplifier IC 30A is electrically connected to each head HD0, for example, the heads HD00 and HD01. The head amplifier IC 30A outputs, to the head HD0, a write current corresponding to a signal output from the R/W channel 40A.

The head amplifier IC 30A includes the read head selection unit 310A and the read signal detector 320A. The read head selection unit 310A selects the read head RH0 for reading data from the disk DK0 in the actuator AC0. The read signal detector 320A detects a signal (read signal) read by the read head RH0 from the disk DK0. A part of the configuration of the head amplifier IC 30A (e.g., the read head selection unit 310A and the read signal detector 320A) may be provided in the system controller 130A.

The head amplifier IC 30B amplifies a read signal read from the disk DK1 and outputs the amplified read signal to the system controller 130B (specifically, a read/write (R/W) channel 40B described later). The head amplifier IC 30B is electrically connected to each head HD1, for example, the heads HD10 and HD11. The head amplifier IC 30B outputs, to the head HD1, a write current corresponding to a signal output from the R/W channel 40B.

The head amplifier IC 30B includes the read head selection unit 310B and the read signal detector 320B. The read head selection unit 310B selects the read head RH1 for reading data from the disk DK1 in the actuator AC1. The read signal detector 320B detects a signal (read signal) read by the read head RH1 from the disk DK1. A part of the configuration of the head amplifier IC 30B (e.g., the read head selection unit 310B and the read signal detector 320B) may be provided in the system controller 130B.

The volatile memory 70 is a semiconductor memory that loses stored data when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like transmitted and received between the magnetic disk device 1 and the host 700. The buffer memory 80 may be integrally formed with the volatile memory 70. The buffer memory 80 is, for example, a DRAM, a static random access memory (SRAM), an SDRAM, a ferroelectric random access memory (FeRAM), or a magnetoresistive random access memory (MRAM).

The nonvolatile memory 90 is a semiconductor memory that records stored data even when power supply is cut off. The nonvolatile memory 90 is, for example, a NOR or NAND flash read only memory (FROM).

The shock sensor 170 detects a vibration and/or shock applied to the magnetic disk device 1 or the housing of the magnetic disk device 1 from the outside. When detecting a vibration and/or shock, the shock sensor 170 outputs a signal (hereinafter, also referred to as "vibration/shock detection signal") indicating that the vibration and/or shock has been detected. The shock sensor 170 is electrically connected to, for example, the write protect detector 180. When detecting a vibration and/or shock, the shock sensor 170 outputs a vibration/shock detection signal to the write protect detector 180.

The write protect detector 180 outputs a signal (also referred to as "write protect determination execution signal) for executing determination on prohibition of write (or write operation). When receiving a vibration/shock detection signal, the write protect detector 180 outputs a write protect determination execution signal. The write protect detector 180 is electrically connected to, for example, the R/W channel 40. When receiving a vibration/shock detection signal, the write protect detector 180 outputs a write protect determination execution signal to the R/W channel 40.

The controller communication unit 190 controls transfer of information between a plurality of system controllers 130, for example, the system controllers 130A and 130B described later. The controller communication unit 190 is electrically connected to, for example, the system controllers 130A and 130B. The controller communication unit 190 includes a communication unit 191. The communication unit 191 communicates data (information).

The system controller (controller) 130 is realized by using, for example, a large-scale integrated circuit (LSI) called a system-on-a-chip (SoC) in which a plurality of elements are integrated on a chip. The system controller 130 includes the read/write (R/W) channel 40, the microprocessor (MPU) 50, and the hard disk controller (HDC) 60. The system controller 130 is electrically connected to the driver IC 20, the head amplifier IC 30, the volatile memory 70, the buffer memory 80, the nonvolatile memory 90, the write protect detector 180, the controller communication unit 190, and the host system 700. The system controller 130 may include the SPM controller 210, the VCM controller 220, and the MA controller 230. The system controller 130 may include the driver IC 20 and the head amplifier IC 30. Two or more system controllers 130 may be provided depending on the number of actuators AC or heads HD.

The R/W channel 40 executes signal processing of read data transferred from the disk DK to the host 700 and write data transferred from the host 700 in response to an instruction from the MPU 50 described later. The R/W channel 40 has a circuit or function of measuring signal quality of read data. The R/W channel 40 is electrically connected to, for example, the head amplifier IC 30, the MPU 50, the HDC 60, and the write protect detector 180. The R/W channel 40 includes a write protect unit 410. Two or more R/W channels 40 may be provided depending on the number of actuators AC or heads HD.

The write protect unit 410 prohibits (or stops) write (or write operation) using the head HD. The write protect unit 410 prohibits (or stops) write (or write operation) using the head HD via the HDC 60. The write protect unit 410 includes a shock sensor write protect determination unit 411, a first HDC write protect determination unit 412, and a second HDC write protect determination unit 413. The first HDC write protect determination unit 412 and the second HDC write protect determination unit 413 may be provided in the HDC 60.

In a case where the shock sensor 170 detects a vibration or shock, the shock sensor write protect determination unit 411 determines whether to prohibit (or stop) write (or write operation) using a head HD of a particular actuator AC.

For example, when receiving a write protect determination execution signal, the shock sensor write protect determination unit 411 selects at least one actuator AC from among the plurality of actuators AC and determines whether to prohibit (or stop) write (or write operation) using at least one head HD of the at least one selected actuator AC.

For example, when receiving a write protect determination execution signal, the shock sensor write protect determination unit 411 selects at least one head HD from among the plurality of heads HD and determines whether to prohibit (or stop) write (or write operation) using the at least one selected head HD.

For example, when receiving a write protect determination execution signal, the shock sensor write protect determination unit 411 determines whether or not the vibration or shock is larger than a particular value or equal based on the write protect determination execution signal.

For example, when determining that the vibration or shock is larger than the particular value, the shock sensor write protect determination unit 411 selects at least one actuator AC from among the plurality of actuators AC and determines prohibition (or stop) of write (or write operation) using at least one head HD of the at least one selected actuator AC.

For example, when determining that the vibration or shock is larger than the particular value, the shock sensor write protect determination unit 411 selects at least one actuator AC from among the plurality of actuators AC and outputs a signal or information (hereinafter, also referred to as "write protect determination signal" or "write protect determination information") for determining prohibition (or stop) of write (or write operation) using at least one head HD of the at least one selected actuator AC to the HDC 60 corresponding to the head HD of the particular selected actuator AC.

For example, when determining that the vibration or shock is equal to or smaller than the particular value, the shock sensor write protect determination unit 411 does not determine prohibition (or stop) of write (or write operation) using the head HD of the particular actuator AC.

For example, when determining that the vibration or shock is larger than the particular value, the shock sensor write protect determination unit 411 selects at least one head HD from among the plurality of heads HD and determines prohibition (or stop) of write (or write operation) using the at least one selected head HD.

For example, when determining that the vibration or shock is larger than the particular value, the shock sensor write protect determination unit 411 selects at least one head HD from among the plurality of heads HD and outputs a write protect determination signal (or write protect determination information) for determining prohibition (or stop) of write (or write operation) using the at least one selected head HD to the HDC 60 corresponding to the selected head HD of the particular actuator AC.

For example, when determining that the vibration or shock is equal to or smaller than the particular value, the shock sensor write protect determination unit 411 does not determine prohibition (or stop) of write (or write operation) using the particular head HD.

The first HDC write protect determination unit 412 prohibits (or stops) write (or write operation) of a particular head HD corresponding to a particular HDC 60. For example, when receiving, from the particular HDC 60, a signal (hereinafter, also referred to as "write protect signal") for prohibiting (or stopping) write (or write operation) of the particular head HD corresponding to the particular HDC 60, the first HDC write protect determination unit 412 negates (deasserts) a write gate to prohibit (or stop) the write (or write operation) of the particular head HD corresponding to the particular HDC 60. In other words, when receiving, from the particular HDC 60, information (hereinafter, also referred to as "vibration detection information") including a write protect signal for prohibiting (or stopping) write (or write operation) of the particular head HD corresponding to the particular HDC 60 and indicating that the particular head HD corresponding to the particular HDC 60 has been vibrated, the first HDC write protect determination unit 412 negates (deasserts) the write gate to prohibit (or stop) the write (or write operation) of the particular head HD corresponding to the particular HDC 60.

For example, when receiving a write protect signal of write (or write operation) of a particular head HD corresponding to an HDC 60 (hereinafter, also referred to as "another HDC") different from the HDC 60 corresponding to the first HDC write protect determination unit 412, the first HDC write protect determination unit 412 negates (deasserts) the write gate to prohibit (or stop) write (or write operation) of the particular head HD corresponding to the particular HDC 60. In other words, when receiving vibration detection information including a write protect signal for prohibiting (or stopping) write (or write operation) of the particular head HD corresponding to the another HDC 60 and indicating that the particular head HD corresponding to the another HDC 60 has been vibrated, the first HDC write protect determination unit 412 negates (deasserts) the write gate to prohibit (or stop) write (or write operation) of the particular head HD corresponding to the particular HDC 60.

For example, when receiving a write protect signal for prohibiting (or stopping) write (or write operation) of the particular head HD corresponding to the another HDC 60, the first HDC write protect determination unit 412 outputs the write protect signal to the first HDC write protect determination unit 412 corresponding to the particular HDC 60 via the another HDC 60 to prohibit (or stop) write (or write operation) of the head HD corresponding to the particular HDC 60. In other words, when receiving vibration detection information including a write protect signal for prohibiting (or stopping) write (or write operation) of the particular head HD corresponding to the another HDC 60 and indicating that the particular head HD corresponding to the particular HDC 60 has been vibrated, the first HDC write protect determination unit 412 outputs the vibration detection information to the first HDC write protect determination unit 412 corresponding to the particular HDC 60 via the another HDC 60 to prohibit (or stop) write (or write operation) of the head HD corresponding to the particular HDC 60.

For example, when receiving a write protect signal for prohibiting (or stopping) write (or write operation) of the particular head HD corresponding to the another HDC 60, the first HDC write protect determination unit 412 outputs a signal for prohibiting (or stopping) write (or write operation) of the particular head HD corresponding to the particular HDC 60 to the another HDC 60 and outputs the write protect signal to the first HDC write protect determination unit 412 corresponding to the particular HDC 60 via the another HDC 60 to prohibit (or stop) the write (or write operation) of the particular head HD corresponding to the particular HDC 60. In other words, when receiving vibration detection information including a write protect signal for prohibiting (or stopping) write (or write operation) of the particular head HD corresponding to the another HDC 60 and indicating that the particular head HD corresponding to the another HDC 60 has been vibrated, the first HDC write protect determination unit 412 outputs a signal for prohibiting (or stopping) the write (or write operation) of the particular head HD corresponding to the another HDC 60 to the another HDC 60 and outputs the vibration detection information to the first HDC write protect determination unit 412 corresponding to the particular HDC 60 via the another HDC 60 to prohibit (or stop) write (or write operation) of the particular head HD corresponding to the particular HDC 60.

Note that, when receiving a write protect signal for prohibiting (or stopping) write (or write operation) of the particular head HD corresponding to the another HDC 60, the first HDC write protect determination unit 412 may output the write protect signal to the first HDC write protect determination unit 412 corresponding to the particular HDC 60 via the particular HDC 60 to prohibit (or stop) write (or write operation) of the head HD corresponding to the particular HDC 60. In other words, when receiving vibration detection information including a write protect signal for prohibiting (or stopping) write (or write operation) of the particular head HD corresponding to the another HDC 60 and indicating that the particular head HD corresponding to the another HDC 60 has been vibrated, the first HDC write protect determination unit 412 may output the vibration detection information to the first HDC write protect determination unit 412 corresponding to the particular HDC 60 via the particular HDC 60 to prohibit (or stop) write (or write operation) of the head HD corresponding to the particular HDC 60.

The second HDC write protect determination unit 413 prohibits (or stops) write (or write operation) of a particular head HD corresponding to another HDC 60. For example, when receiving, from the another HDC 60, a write protect signal for prohibiting (or stopping) write (or write operation) of the particular head HD corresponding to the another HDC 60, the second HDC write protect determination unit 413 negates (deasserts) a write gate to prohibit (or stop) the write (or write operation) of the particular head HD corresponding to the another HDC 60. In other words, when receiving, from the another HDC 60, vibration detection information including a write protect signal for prohibiting (or stopping) write (or write operation) of the particular head HD corresponding to the another HDC 60 and indicating that the particular head HD corresponding to the another HDC 60 has been vibrated, the second HDC write protect determination unit 413 negates (deasserts) the write gate to prohibit (or stop) the write (or write operation) of the particular head HD corresponding to the another HDC 60.

For example, when receiving a write protect signal for prohibiting (or stopping) write (or write operation) of a particular head HD corresponding to a particular HDC 60, the second HDC write protect determination unit 413 negates (deasserts) the write gate to prohibit (or stop) write (or write operation) of the particular head HD corresponding to the another HDC 60. In other words, when receiving vibration detection information including a write protect signal for prohibiting (or stopping) write (or write operation) of the particular head HD corresponding to the particular HDC 60 and indicating that the particular head HD corresponding to the particular HDC 60 has been vibrated, the second HDC write protect determination unit 413 negates (deasserts) the write gate to prohibit (or stop) the write (or write operation) of the particular head HD corresponding to the another HDC 60.

For example, when receiving a write protect signal for prohibiting (or stopping) write (or write operation) of the head HD corresponding to the particular HDC 60, the second HDC write protect determination unit 413 outputs the write protect signal to the second HDC write protect determination unit 413 corresponding to the another HDC 60 via the particular HDC 60 to prohibit (or stop) write (or write operation) of the particular head HD corresponding to the another HDC 60. In other words, when receiving vibration detection information including a write protect signal for prohibiting (or stopping) write (or write operation) of the head HD corresponding to the particular HDC 60 and indicating that the particular head HD corresponding to the particular HDC 60 has been vibrated, the second HDC write protect determination unit 413 outputs the vibration detection information via the particular HDC 60 to prohibit (or stop) the write (or write operation) of the particular head HD corresponding to the another HDC 60.

For example, when receiving a write protect signal for prohibiting (or stopping) write (or write operation) of the head HD corresponding to the particular HDC 60, the second HDC write protect determination unit 413 outputs a signal for prohibiting (or stopping) write (or write operation) of the particular head HD corresponding to the another HDC 60 to the particular HDC 60 and outputs the write protect signal to the second HDC write protect determination unit 413 corresponding to the another HDC 60 via the particular HDC 60 to prohibit (or stop) the write (or write operation) of the particular head HD corresponding to the another HDC 60. In other words, when receiving vibration detection information including a write protect signal for prohibiting (or stopping) write (or write operation) of the head HD corresponding to the particular HDC 60 and indicating that the particular head HD corresponding to the particular HDC 60 has been vibrated, the second HDC write protect determination unit 413 outputs a signal for prohibiting (or stopping) write (or write operation) of the particular head HD corresponding to the another HDC 60 to the particular HDC 60 and outputs the vibration detection information to the second HDC write protect determination unit 413 corresponding to the another HDC 60 via the particular HDC 60 to prohibit (or stop) the write (or write operation) of the particular head HD corresponding to the another HDC 60.

Note that, when receiving a write protect signal for prohibiting (or stopping) write (or write operation) of the particular head HD corresponding to the particular HDC 60, the second HDC write protect determination unit 413 may output the write protect signal to the second HDC write protect determination unit 413 corresponding to the another HDC 60 via the another HDC 60 to prohibit (or stop) write (or write operation) of the head HD corresponding to the another HDC 60. In other words, when receiving vibration detection information including a write protect signal for prohibiting (or stopping) write (or write operation) of the particular head HD corresponding to the particular HDC 60 and indicating that the particular head HD corresponding to the particular HDC 60 has been vibrated, the second HDC write protect determination unit 413 may output the vibration detection information to the second HDC write protect determination unit 413 corresponding to the another HDC 60 via the another HDC 60 to prohibit (or stop) write (or write operation) of the head HD corresponding to the another HDC 60.

The MPU 50 is a main controller that controls each unit of the magnetic disk device 1 in response to an instruction from the host 700 or the like. The MPU 50 controls the actuator AC and/or the MA 16 via the driver IC 20 and executes servo control for positioning the head HD. The MPU 50 controls a data write operation to the disk DK and selects a storage destination of write data. The MPU 50 also controls a data read operation (or read) from the disk DK and controls processing of read data. The MPU 50 is connected to each unit of the magnetic disk device 1. The MPU 50 is electrically connected to, for example, the driver IC 20, the R/W channel 40, and the HDC 60. Two or more MPUs 50 may be provided depending on the number of actuators AC or heads HD.

The MPU 50 seeks the head HD to a particular radial position at a particular circumferential position on the disk DK. The MPU 50 positions the head HD at the particular radial position and writes data to a particular sector (data sector) or reads data from a particular sector (data sector). Hereinafter, "to position or arrange a central portion of the head HD (write head WH or read head RH) at a particular position" will also simply be expressed as "to position or arrange the head HD (write head WH or read head RH) at a particular position". For example, the MPU 50 positions the head HD at a target position, for example, at the track center and writes data to a particular sector (data sector) or reads data from a particular sector (data sector). The MPU 50 may write data in shingled write magnetic recording (SMR) or shingled write recording (SWR) in which a track to be written next is overwritten on a part of a particular track in the radial direction or may write data in conventional magnetic recording (CMR) in which a track adjacent to a particular track in the radial direction (hereinafter, also referred to as "adjacent track") is written at a particular interval in the radial direction from the particular track.

The HDC 60 controls read/write processing and controls data transfer between the host 700 and the R/W channel 40 in response to an instruction from the MPU 50. The HDC 60 is electrically connected to, for example, the R/W channel 40, the MPU 50, the volatile memory 70, the buffer memory 80, and the nonvolatile memory 90. Two or more HDCs 60 may be provided depending on the number of actuators AC or heads HD.

The HDC 60 includes a servo controller 610 and a write operation determination unit 620. The HDC 60 executes processing of those units, for example, the servo controller 610 and the write operation determination unit 620 on firmware. The HDC 60 may include those units as a circuit. A part of the configuration of the HDC 60 may be provided in the MPU 50. For example, the servo controller 610 and the write operation determination unit 620 may be provided in the MPU 50. The HDC 60 prohibits (or stops) a write operation of the head HD. For example, when receiving a write protect signal, the HDC 60 prohibits (or stops) the write operation of the head HD at a particular timing.

The servo controller 610 controls a position of the head HD. In other words, the servo controller 610 controls access by the head HD to a particular region of the disk DK. The servo controller 610 includes a tracking controller 611 and a seek controller 612. Two or more servo controllers 610 may be provided depending on the number of actuators AC or heads HD.

The tracking controller 611 controls tracking of the head HD to a particular track of the disk DK. "Tracking of the head HD to a particular track of the disk DK" will also simply be referred to as "tracking". "Tracking" includes "to follow a particular path, for example, a particular track when data is written to the disk DK" and "to follow a particular path, for example, a particular track when data is read from the disk DK". The tracking controller 611 includes a DPES demodulation unit 6111. The tracking controller 611 may include an SPES demodulation unit. For example, the SPES demodulation unit demodulates a position error (servo sector position error signal (SPES)) read and demodulated from the servo sector SS of the disk DK.

The DPES demodulation unit 6111 demodulates a position error (position error information) (data sector position error signal (DPES)) read and demodulated from the data sector DS.

The seek controller 612 controls seek of the head HD from a particular track to a targeted track on the disk DK.

The write operation determination unit 620 determines a write operation. The write operation determination unit 620 includes a position write operation determination unit 621 and a speed write operation determination unit 622. The position write operation determination unit 621 determines the write operation of the head HD based on the position of the head HD. The speed write operation determination unit 622 determines the write operation of the head HD based on a speed of the head HD.

The write operation determination unit 620 determines whether to prohibit (or stop) write (or write operation) of a particular head HD corresponding to a particular HDC 60.

For example, when receiving a write protect determination signal (or write protect determination information) of write (or write operation) of the particular head HD corresponding to the particular HDC 60, the write operation determination unit 620 determines whether to prohibit (or stop) the write (or write operation) of the particular head HD corresponding to the particular HDC 60 based on the SPES read and demodulated from the servo sector SS of the disk DK or the DPES read and demodulated from the data sector DS thereof by the particular head HD corresponding to the particular HDC 60.

For example, when receiving a write protect determination signal (or write protect determination information) of write (or write operation) of the particular head HD corresponding to the particular HDC 60, the write operation determination unit 620 determines whether or not the SPES or DPES corresponding to the particular head HD related to the particular HDC 60 exceeds a threshold.

For example, when determining that the SPES or DPES corresponding to the particular head HD related to the particular HDC 60 exceeds the threshold, the write operation determination unit 620 outputs a write protect signal to a particular R/W channel 40 corresponding to the particular HDC 60.

For example, when receiving a signal for prohibiting write (or write operation) of a particular head HD corresponding to another HDC 60 from the second HDC write protect determination unit 413 corresponding to the particular HDC 60, the write operation determination unit 620 may output a write protect signal to a particular R/W channel (hereinafter, also referred to as "another R/W channel") 40 corresponding to the another HDC 60. For example, when receiving a signal for prohibiting write (or write operation) of the particular head HD corresponding to the another HDC 60 from the second HDC write protect determination unit 413 corresponding to the particular HDC 60, the write operation determination unit 620 may output a write protect signal to the another R/W channel 40 via a physical wiring, a communication circuit, or a transmission path including a conceptual path for transmitting or sending electricity, data, information, and the like.

Note that, when receiving a signal for prohibiting write (or write operation) of the particular head HD corresponding to the another HDC 60 from the second HDC write protect determination unit 413 corresponding to the particular HDC 60, the write operation determination unit 620 may not output a write protect signal to the another R/W channel 40 depending on a state of a particular system controller 130 (hereinafter, also referred to as "another system controller 130") corresponding to the another HDC 60, the particular head HD corresponding to the another HDC 60, or the like.

For example, when determining that the SPES or DPES corresponding to the particular head HD related to the particular HDC 60 exceeds the threshold, the write operation determination unit 620 may determine prohibition (or stop) of write (or write operation) of the particular head HD corresponding to the particular HDC 60 and output a write protect signal to the another R/W channel 40.

For example, when determining that the SPES or DPES corresponding to the particular head HD related to the particular HDC 60 is equal to or smaller than the threshold, the write operation determination unit 620 does not prohibit (or stop) the write (or write operation) using the particular head HD corresponding to the particular HDC 60 via the particular HDC 60. In other words, when determining that the SPES or DPES corresponding to the particular head HD related to the particular HDC 60 is equal to or smaller than the threshold, the write operation determination unit 620 continues (or carries on with) the write (or write operation) using the particular head HD corresponding to the particular HDC 60 via the particular HDC 60.

The write operation determination unit 620 determines whether to prohibit (or stop) write (or write operation) of a particular head HD corresponding to another HDC 60.

For example, when receiving a write protect determination signal (or write protect determination information) for prohibiting (or stopping) write (or write operation) of the particular head HD corresponding to the another HDC 60, the write operation determination unit 620 determines whether to prohibit (or stop) the write (or write operation) of the particular head HD corresponding to the another HDC 60 based on the SPES read and demodulated from the servo sector SS of the disk DK or the DPES read and demodulated from the data sector DS thereof by the particular head HD corresponding to the another HDC 60.

For example, when receiving a write protect determination signal (or write protect determination information) for prohibiting (or stopping) write (or write operation) of the particular head HD corresponding to the another HDC 60, the write operation determination unit 620 determines whether or not the SPES or DPES corresponding to the particular head HD related to the another HDC 60 exceeds a threshold.

For example, when determining that the SPES or DPES corresponding to the particular head HD related to the another HDC 60 exceeds the threshold, the write operation determination unit 620 determines prohibition (or stop) of write (or write operation) of the particular head HD corresponding to the another HDC 60 and outputs a write protect signal to a particular R/W channel 40 corresponding to the another HDC 60.

For example, when receiving a signal for prohibiting write (or write operation) of the particular head HD corresponding to the particular HDC 60 from the first HDC write protect determination unit 412 corresponding to another HDC 60, the write operation determination unit 620 may output a write protect signal to the particular R/W channel 40 corresponding to the particular HDC 60.

For example, when receiving a signal for prohibiting write (or write operation) of the particular head HD corresponding to the particular HDC 60 from the first HDC write protect determination unit 412 corresponding to the another HDC 60, the write operation determination unit 620 may output a write protect signal to the particular R/W channel 40 via a physical wiring, a communication circuit, or a transmission path including a conceptual path for transmitting or sending electricity, data, information, and the like.

Note that, when receiving a signal for prohibiting write (or write operation) of the particular head HD corresponding to the particular HDC 60 from the first HDC write protect determination unit 412 corresponding to the another HDC 60, the write operation determination unit 620 may not output a write protect signal to the particular R/W channel 40 depending on a state of a particular system controller 130 corresponding to the particular HDC 60, the particular head HD corresponding to the particular HDC 60, or the like.

For example, when determining that the SPES or DPES corresponding to the particular head HD related to the another HDC 60 exceeds the threshold, the write operation determination unit 620 may output a write protect signal to the particular R/W channel 40.

For example, when determining that the SPES or DPES corresponding to the particular head HD related to the another HDC 60 is equal to or smaller than the threshold, the write operation determination unit 620 does not prohibit (or stop) the write (or write operation) using the particular head HD corresponding to the another HDC 60 via the another HDC 60. In other words, when determining that the SPES or DPES corresponding to the particular head HD related to the another HDC 60 is equal to or smaller than the threshold, the write operation determination unit 620 continues (or carries on with) the write (or write operation) using the particular head HD corresponding to the another HDC 60 via the another HDC 60.

The system controller 130 includes the system controllers 130A and 130B. The system controller 130 may include only one system controller or three or more system controllers. The system controllers 130A and 130B are formed in separate configurations, for example, in separate circuits. Note that the system controllers 130A and 130B may be formed in an integrated configuration, for example, in an integrated circuit.

The R/W channel 40 includes the R/W channels 40A and 40B. The R/W channel 40 may include only one R/W channel or three or more R/W channels. The shock sensor write protect determination unit 411 includes shock sensor write protect determination units 411A and 411B. The shock sensor write protect determination unit 411 may include only one shock sensor write protect determination unit or three or more shock sensor write protect determination units. The first HDC write protect determination unit 412 includes first HDC write protect determination units 412A and 412B. The first HDC write protect determination unit 412 may include only one first HDC write protect determination unit or three or more first HDC write protect determination units. The second HDC write protect determination unit 413 includes second HDC write protect determination units 413A and 413B. The second HDC write protect determination unit 413 may include only one second HDC write protect determination unit or three or more second HDC write protect determination units.

The MPU 50 includes the MPUs 50A and 50B. The HDC 60 includes the HDCs 60A and 60B. The HDC 60 may include only one HDC or three or more HDCs. The servo controller 610 includes servo controllers 610A and 610B.

The servo controller 610 may include only one servo controller or three or more servo controllers. The tracking controller 611 includes tracking controllers 611A and 611B. The tracking controller 611 may include only one tracking controller or three or more tracking controllers. The DPES demodulation unit 6111 includes DPES demodulation units 6111A and 6111B. The DPES demodulation unit 6111 may include only one DPES demodulation unit or three or more DPES demodulation units. The seek controller 612 includes seek controllers 612A and 612B. The seek controller 612 may include only one seek controller or three or more seek controllers. The write operation determination unit 620 includes write operation determination units 620A and 620B. The write operation determination unit 620 may include only one write operation determination unit or three or more write operation determination units. The position write operation determination unit 621 includes position write operation determination units 621A and 621B. The position write operation determination unit 621 may include only one position write operation determination unit or three or more position write operation determination units. The speed write operation determination unit 622 includes speed write operation determination units 622A and 622B. The speed write operation determination unit 622 may include only one speed write operation determination unit or three or more speed write operation determination units.

The system controller 130A includes the R/W channel 40A, the MPU 50A, and the HDC 60A. The system controller 130A is electrically connected to the driver IC 20A, the head amplifier IC 30A, the volatile memory 70, the buffer memory 80, the nonvolatile memory 90, the write protect detector 180, the controller communication unit 190, and the host system 700. The system controller 130A is electrically connected to the system controller 130B via transmission paths WR0 and WR1. The transmission paths WR0 and WR1 may be physical wirings, communication circuits, or conceptual paths for transmitting or sending electricity, data, information, and the like. The system controller 130A may include the SPM controller 210A, the VCM controller 220A, and the MA controller 230A. The system controller 130A may include the driver IC 20A and the head amplifier IC 30A.

The R/W channel 40A executes signal processing of read data transferred from the disk DK0 to the host 700 and write data transferred from the host 700 in response to an instruction from the MPU 50A. The R/W channel 40A is electrically connected to, for example, the head amplifier IC 30A, the MPU 50A, the HDC 60A, and the write protect detector 180. The R/W channel 40A is connected to the write operation determination unit 620B (HDC 60B) via the transmission path WR1. Note that the R/W channel 40A may not be connected to the write operation determination unit 620B (HDC 60B) via the transmission path WR1. The R/W channel 40A includes a write protect unit 410A.

The write protect unit 410A prohibits (or stops) write (or write operation) using the heads HD0 and HD1 via the HDCs 60A and 60B. The write protect unit 410A is connected to the write operation determination unit 620B (HDC 60B) via the transmission path WR1. Note that the write protect unit 410A may not be connected to the write operation determination unit 620B (HDC 60B) via the transmission path WR1. The write protect unit 410A includes the shock sensor write protect determination unit 411A, the first HDC write protect determination unit 412A, and the second HDC write protect determination unit 413A.

In a case where the shock sensor 170 detects a vibration or shock, the shock sensor write protect determination unit 411A determines whether to prohibit (or stop) write (or write operation) using the head HD0 of the actuator AC0.

For example, when receiving a write protect determination execution signal, the shock sensor write protect determination unit 411A determines whether to prohibit (or stop) write (or write operation) using at least one head HD corresponding to the actuator AC0.

For example, when receiving a write protect determination execution signal, the shock sensor write protect determination unit 411A determines whether the vibration or shock is larger than a particular value based on the write protect determination execution signal. For example, when determining that the vibration or shock is larger than the particular value, the shock sensor write protect determination unit 411A determines prohibition (or stop) of the write (or write operation) of at least one head HD0 of the actuator AC0. For example, when determining that the vibration or shock is larger than the particular value, the shock sensor write protect determination unit 411A outputs a write protect determination signal for determining prohibition (or stop) of the write (or write operation) of the at least one head HD0 of the actuator AC0. For example, when determining that the vibration or shock is equal to or smaller than the particular value, the shock sensor write protect determination unit 411A does not determine prohibition (or stop) of the write (or write operation) using the at least one head HD0 of the actuator AC0.

The first HDC write protect determination unit 412A prohibits (or stops) write (or write operation) of the head HD0 corresponding to the HDC 60A. For example, when receiving a write protect signal for prohibiting (or stopping) write (or write operation) of the head HD0 from the HDC 60A, the first HDC write protect determination unit 412A negates (deasserts) a write gate to prohibit (or stop) the write (or write operation) of the head HD0. In other words, when receiving, from the HDC 60A, vibration detection information including a write protect signal for prohibiting (or stopping) the write (or write operation) of the head HD0 and indicating that the head HD0 has been vibrated, the first HDC write protect determination unit 412A negates (deasserts) the write gate to prohibit (or stop) the write (or write operation) of the head HD0.

For example, when receiving a write protect signal for prohibiting (or stopping) write (or write operation) of the head HD1 corresponding to the HDC 60B, the first HDC write protect determination unit 412A negates (deasserts) the write gate to prohibit (or stop) the write (or write operation) of the head HD0. In other words, when receiving vibration detection information including a write protect signal for prohibiting (or stopping) write (or write operation) of the head HD1 and indicating that the head HD1 has been vibrated, the first HDC write protect determination unit 412A negates (deasserts) the write gate to prohibit (or stop) the write (or write operation) of the head HD0.

The second HDC write protect determination unit 413A prohibits (or stops) write (or write operation) of the head HD1 corresponding to the HDC 60B. For example, when receiving a write protect signal for prohibiting (or stopping) write (or write operation) of the head HD1 from the HDC 60A, the second HDC write protect determination unit 413A outputs the write protect signal to the second HDC write protect determination unit 413B of the R/W channel 40B via the HDC 60A and the transmission path WR0, negates (deasserts) a write gate via the second HDC write protect determination unit 413B, and prohibits (or stops) the write (or write operation) of the head HD1. In other words, when receiving, from the HDC 60A, vibration detection information including a write protect signal for prohibiting (or stopping) write (or write operation) of the head HD1 and indicating that the head HD1 has been vibrated, the second HDC write protect determination unit 413A outputs the vibration detection information to the second HDC write protect determination unit 413B of the R/W channel 40B via the HDC 60A and the transmission path WR0, negates (deasserts) the write gate via the second HDC write protect determination unit 413B, and prohibits (or stops) the write (or write operation) of the head HD1.

For example, when receiving a write protect signal of write (or write operation) of the head HD1 from the HDC 60A, the second HDC write protect determination unit 413A outputs a signal for prohibiting the write (or write operation) of the head HD1 to the HDC 60A, outputs the write protect signal to the second HDC write protect determination unit 413B of the R/W channel 40B via the HDC 60A and the transmission path WR0, negates (deasserts) the write gate via the second HDC write protect determination unit 413B, and prohibits (or stops) the write (or write operation) of the head HD1. In other words, when receiving, from the HDC 60A, vibration detection information including a write protect signal of write (or write operation) of the head HD1 and indicating that the head HD1 has been vibrated, the second HDC write protect determination unit 413A outputs a signal for prohibiting the write (or write operation) of the head HD1 to the HDC 60A, outputs the vibration detection information to the second HDC write protect determination unit 413B of the R/W channel 40B via the HDC 60A and the transmission path WR0, negates (deasserts) the write gate via the second HDC write protect determination unit 413B, and prohibits (or stops) the write (or write operation) of the head HD1.

For example, when receiving a write protect signal for prohibiting (or stopping) write (or write operation) of the head HD1 from the HDC 60A, the second HDC write protect determination unit 413A outputs the write protect signal to the second HDC write protect determination unit 413B of the R/W channel 40B via the transmission path WR1 and the HDC 60B, negates (deasserts) the write gate via the second HDC write protect determination unit 413B, and prohibits (or stops) the write (or write operation) of the head HD1. In other words, when receiving, from the HDC 60A, vibration detection information including a write protect signal for prohibiting (or stopping) write (or write operation) of the head HD1 and indicating that the head HD1 has been vibrated, the second HDC write protect determination unit 413A outputs the vibration detection information to the second HDC write protect determination unit 413B of the R/W channel 40B via the transmission path WR1 and the HDC 60B, negates (deasserts) the write gate via the second HDC write protect determination unit 413B, and prohibits (or stops) the write (or write operation) of the head HD1.

For example, when receiving a write protect signal for prohibiting (or stopping) write (or write operation) of the head HD1 from the HDC 60A, the second HDC write protect determination unit 413A outputs a signal for prohibiting the write (or write operation) of the head HD1 to the HDC 60B, outputs the write protect signal to the second HDC write protect determination unit 413B of the R/W channel 40B via the transmission path WR1 and the HDC 60B, negates (deasserts) the write gate via the second HDC write protect determination unit 413B, and prohibits (or stops) the write (or write operation) of the head HD1. In other words, when receiving, from the HDC 60A, vibration detection information including a write protect signal for prohibiting (or stopping) write (or write operation) of the head HD1 and indicating that the head HD1 has been vibrated, the second HDC write protect determination unit 413A outputs a signal for prohibiting the write (or write operation) of the head HD1 to the HDC 60B, outputs the vibration detection information to the second HDC write protect determination unit 413B of the R/W channel 40B via the transmission path WR1 and the HDC 60B, negates (deasserts) the write gate via the second HDC write protect determination unit 413B, and prohibits (or stops) the write (or write operation) of the head HD1.

The MPU 50A controls the actuator AC0 via the driver IC 20A and executes servo control for positioning the head HD0. The MPU 50A controls a data write operation to the disk DK0 and selects a storage destination of write data. The MPU 50A also controls a data read operation from the disk DK0 and controls processing of read data. The MPU 50A is connected to each unit of the magnetic disk device 1. The MPU 50A is electrically connected to, for example, the driver IC 20A, the R/W channel 40A, and the HDC 60A.

The HDC 60A controls read/write processing and controls data transfer between the host 700 and the R/W channel 40A in response to an instruction from the MPU 50A. The HDC 60A is electrically connected to, for example, the R/W channel 40A, the MPU 50A, the volatile memory 70, the buffer memory 80, and the nonvolatile memory 90. The HDC 60A is connected to the R/W channel 40B via the transmission path WR0. Note that the HDC 60A may not be connected to the R/W channel 40B via the transmission path WR0.

The HDC 60A includes the servo controller 610A and the write operation determination unit 620A. The HDC 60A executes processing of those units, for example, the servo controller 610A and the write operation determination unit 620A on firmware. The HDC 60A may include those units as a circuit. A part of the configuration of the HDC 60A may be provided in the MPU 50A. For example, the servo controller 610A and the write operation determination unit 620A may be provided in the MPU 50A. The HDC 60A prohibits (or stops) a write operation of the head HD0. For example, when receiving a write protect signal, the HDC 60A prohibits (or stops) the write operation of the head HD0.

The servo controller 610A controls a position of the head HD0. In other words, the servo controller 610A controls access by the head HD0 to a particular region of the disk DK0. The servo controller 610A includes the tracking controller 611A and the seek controller 612A.

The tracking controller 611A controls tracking of the head HD0 to a particular track of the disk DK0. The tracking controller 611A includes the DPES demodulation unit 6111A. The tracking controller 611A may include an SPES demodulation unit.

The DPES demodulation unit 6111A reads the data sector DS of the disk DK0 and demodulates a DPES.

The seek controller 612A controls seek of the head HD0 from a particular track to a targeted track on the disk DK0.

The write operation determination unit 620A is connected to the R/W channel 40B via the transmission path WR0. Note that the write operation determination unit 620A may not be connected to the R/W channel 40B via the transmission path WR0. The write operation determination unit 620A includes the position write operation determination unit 621A and the speed write operation determination unit 622A. The position write operation determination unit 621A determines a write operation of the head HD0 based on the position of the head HD0. The speed write operation determination unit 622A determines the write operation of the head HD0 based on a speed of the head HD0.

The write operation determination unit 620A determines whether to prohibit (or stop) write (or write operation) of the head HD0 corresponding to the HDC 60A.

When receiving a write protect determination signal (or write protect determination information) of write (or write operation) of the head HD0 corresponding to the HDC 60A, the write operation determination unit 620A determines whether to prohibit (or stop) the write (or write operation) of the head HD0 based on an SPES read and demodulated from the servo sector SS of the disk DK0 or a DPES read and demodulated from the data sector DS thereof by the head HD0.

When receiving a write protect determination signal (or write protect determination information) of the write (or write operation) of the head HD0 corresponding to the HDC 60A, the write operation determination unit 620A determines whether or not the SPES or DPES corresponding to the head HD0 exceeds the threshold.

When determining that the SPES or DPES corresponding to the head HD0 exceeds the threshold, the write operation determination unit 620A determines prohibition (or stop) of the write (or write operation) of the head HD0 and outputs a write protect signal to the R/W channel 40A corresponding to the HDC 60A.

When receiving a signal for prohibiting write (or write operation) of the head HD1 corresponding to the HDC 60B from the second HDC write protect determination unit 413A, the write operation determination unit 620A may output a write protect signal to the R/W channel 40B. When receiving a signal for prohibiting write (or write operation) of the head HD1 corresponding to the HDC 60B from the second HDC write protect determination unit 413A, the write operation determination unit 620A may output a write protect signal to the R/W channel 40B via the transmission path WR0.

Note that, when receiving a signal for prohibiting write (or write operation) of the head HD1 corresponding to the HDC 60B from the second HDC write protect determination unit 413A, the write operation determination unit 620A may not output a write protect signal to the R/W channel 40B depending on a state of the system controller 130B, the head HD1, or the like.

For example, when determining that the SPES or DPES corresponding to the head HD0 exceeds the threshold, the write operation determination unit 620A outputs a write protect signal to the R/W channel 40B.

For example, when determining that the SPES or DPES corresponding to the head HD0 is equal to or smaller than the threshold, the write operation determination unit 620A does not prohibit (or stop) the write (or write operation) using the head HD0 via the HDC 60A. In other words, when determining that the SPES or DPES corresponding to the head HD0 is equal to or smaller than the threshold, the write operation determination unit 620A continues (or carries on with) the write (or write operation) using the head HD0.

The system controller 130B includes the R/W channel 40B, the MPU 50B, and the HDC 60B. The system controller 130B is electrically connected to the driver IC 20B, the head amplifier IC 30B, the write protect detector 180, the controller communication unit 190, and the host system 700. The system controller 130B is electrically connected to the system controller 130A via the transmission paths WR0 and WR1. The system controller 130B may include the VCM controller 220B and the MA controller 230B. The system controller 130B may include the driver IC 20B and the head amplifier IC 30B.

The R/W channel 40B executes signal processing of read data transferred from the disk DK1 to the host 700 and write data transferred from the host 700 in response to an instruction from the MPU 50B. The R/W channel 40B is electrically connected to, for example, the head amplifier IC 30B, the MPU 50B, the HDC 60B, and the write protect detector 180. The R/W channel 40B is connected to the write operation determination unit 620A (HDC 60A) via the transmission path WR0. Note that the R/W channel 40B may not be connected to the write operation determination unit 620A (HDC 60A) via the transmission path WR0. The R/W channel 40B includes a write protect unit 410B.

The write protect unit 410B prohibits (or stops) write (or write operation) using the heads HD0 and HD1 via the HDCs 60A and 60B. The write protect unit 410B is connected to the write operation determination unit 620A (HDC 60A) via the transmission path WR0. Note that the write protect unit 410B may not be connected to the write operation determination unit 620A (HDC 60A) via the transmission path WR0. The write protect unit 410B includes the shock sensor write protect determination unit 411B, the first HDC write protect determination unit 412B, and the second HDC write protect determination unit 413B.

In a case where the shock sensor 170 detects a vibration or shock, the shock sensor write protect determination unit 411B determines whether to prohibit (or stop) write (or write operation) using the head HD1 of the actuator AC1.

For example, when receiving a write protect determination execution signal, the shock sensor write protect determination unit 411B determines whether to prohibit (or stop) write (or write operation) using at least one head HD corresponding to the actuator AC1.

For example, when receiving a write protect determination execution signal, the shock sensor write protect determination unit 411B determines whether the vibration or shock is larger than a particular value based on the write protect determination execution signal. For example, when determining that the vibration or shock is larger than the particular value, the shock sensor write protect determination unit 411B determines prohibition (or stop) of the write (or write operation) of at least one head HD1 of the actuator AC1. For example, when determining that the vibration or shock is larger than the particular value, the shock sensor write protect determination unit 411B outputs a write protect determination signal for determining prohibition (or stop) of the write (or write operation) of the at least one head HD1 of the actuator AC1. For example, when determining that the vibration or shock is equal to or smaller than the particular value, the shock sensor write protect determination unit 411B does not determine prohibition (or stop) of the write (or write operation) using the at least one head HD1 of the actuator AC1.

The first HDC write protect determination unit 412B prohibits (or stops) write (or write operation) of the head HD0 corresponding to the HDC 60A. For example, when receiving a write protect signal for prohibiting (or stopping) write (or write operation) of the head HD0 from the HDC 60B, the first HDC write protect determination unit 412B outputs the write protect signal to the first HDC write protect determination unit 412A of the R/W channel 40A via the HDC 60B and the transmission path WR1, negates (deasserts) a write gate via the first HDC write protect determination unit 412A, and prohibits (or stops) the write (or write operation) of the head HD0. In other words, when receiving, from the HDC 60B, vibration detection information including a write protect signal for prohibiting (or stopping) write (or write operation) of the head HD0 and indicating that the head HD0 has been vibrated, the first HDC write protect determination unit 412B outputs the vibration detection information to the first HDC write protect determination unit 412A of the R/W channel 40A via the HDC 60B and the transmission path WR1, negates (deasserts) the write gate via the first HDC write protect determination unit 412A, and prohibits (or stops) the write (or write operation) of the head HD0.

For example, when receiving a write protect signal of write (or write operation) of the head HD0 from the HDC 60B, the first HDC write protect determination unit 412B outputs a signal for prohibiting the write (or write operation) of the head HD0 to the HDC 60B, outputs the write protect signal to the first HDC write protect determination unit 412A of the R/W channel 40A via the HDC 60B and the transmission path WR1, negates (deasserts) the write gate via the first HDC write protect determination unit 412A, and prohibits (or stops) the write (or write operation) of the head HD0. In other words, when receiving, from the HDC 60B, vibration detection information including a write protect signal of write (or write operation) of the head HD0 and indicating that the head HD0 has been vibrated, the first HDC write protect determination unit 412B outputs a signal for prohibiting the write (or write operation) of the head HD0 to the HDC 60B, outputs the vibration detection information to the first HDC write protect determination unit 412A of the R/W channel 40A via the HDC 60B and the transmission path WR1, negates (deasserts) the write gate via the first HDC write protect determination unit 412A, and prohibits (or stops) the write (or write operation) of the head HD0.

For example, when receiving a write protect signal of write (or write operation) of the head HD0 from the HDC 60B, the first HDC write protect determination unit 412B outputs the write protect signal to the first HDC write protect determination unit 412A of the R/W channel 40A via the transmission path WR0 and the HDC 60A, negates (deasserts) the write gate via the first HDC write protect determination unit 412A, and prohibits (or stops) the write (or write operation) of the head HD0. In other words, when receiving, from the HDC 60B, vibration detection information including a write protect signal of write (or write operation) of the head HD0 and indicating that the head HD0 has been vibrated, the first HDC write protect determination unit 412B outputs the vibration detection information to the first HDC write protect determination unit 412A of the R/W channel 40A via the transmission path WR0 and the HDC 60A, negates (deasserts) the write gate via the first HDC write protect determination unit 412A, and prohibits (or stops) the write (or write operation) of the head HD0.

For example, when receiving a write protect signal of write (or write operation) of the head HD0 from the HDC 60B, the first HDC write protect determination unit 412B outputs a signal for prohibiting the write (or write operation) of the head HD0 to the HDC 60A, outputs the write protect signal to the first HDC write protect determination unit 412A of the R/W channel 40A via the transmission path WR0 and the HDC 60A, negates (deasserts) the write gate via the first HDC write protect determination unit 412A, and prohibits (or stops) the write (or write operation) of the head HD0. In other words, when receiving, from the HDC 60B, vibration detection information including a write protect signal of write (or write operation) of the head HD0 and indicating that the head HD0 has been vibrated, the first HDC write protect determination unit 412B outputs a signal for prohibiting the write (or write operation) of the head HD0 to the HDC 60A, outputs the vibration detection information to the first HDC write protect determination unit 412A of the R/W channel 40A via the transmission path WR0 and the HDC 60A, negates (deasserts) the write gate via the first HDC write protect determination unit 412A, and prohibits (or stops) the write (or write operation) of the head HD0.

The second HDC write protect determination unit 413B prohibits (or stops) write (or write operation) of the head HD1 corresponding to the HDC 60B. For example, when receiving a write protect signal for prohibiting (or stopping) write (or write operation) of the head HD1 from the HDC 60B, the second HDC write protect determination unit 413B negates (deasserts) a write gate to prohibit (or stop) the write (or write operation) of the head HD1. In other words, when receiving, from the HDC 60B, vibration detection information including a write protect signal for prohibiting (or stopping) write (or write operation) of the head HD1 and indicating that the head HD1 has been vibrated, the second HDC write protect determination unit 413B negates (deasserts) the write gate to prohibit (or stop) the write (or write operation) of the head HD1.

For example, when receiving a write protect signal of write (or write operation) of the head HD0 corresponding to the HDC 60A, the second HDC write protect determination unit 413B negates (deasserts) the write gate to prohibit (or stop) write (or write operation) of the head HD1. In other words, when receiving vibration detection information including a write protect signal of write (or write operation) of the head HD0 corresponding to the HDC 60A and indicating that the head HD0 has been vibrated, the second HDC write protect determination unit 413B negates (deasserts) the write gate to prohibit (or stop) write (or write operation) of the head HD1.

The MPU 50B controls the actuator AC1 via the driver IC 20B and executes servo control for positioning the head HD1. The MPU 50B controls a data write operation to the disk DK1 and selects a storage destination of write data. The MPU 50B also controls a data read operation from the disk DK1 and controls processing of read data. The MPU 50B is connected to each unit of the magnetic disk device 1. The MPU 50B is electrically connected to, for example, the driver IC 20B, and the R/W channel 40B, the HDC 60B.

The HDC 60B controls read/write processing and controls data transfer between the host 700 and the R/W channel 40B in response to an instruction from the MPU 50B. The HDC 60B is electrically connected to, for example, the R/W channel 40B and the MPU 50B. The HDC 60B is connected to the R/W channel 40A via the transmission path WR1. Note that the HDC 60B may not be connected to the R/W channel 40A via the transmission path WR1.

The HDC 60B includes the servo controller 610B and the write operation determination unit 620B. The HDC 60B executes processing of those units, for example, the servo controller 610B and the write operation determination unit 620B on firmware. The HDC 60B may include those units as a circuit. A part of the configuration of the HDC 60B may be provided in the MPU 50B. For example, the servo controller 610B and the write operation determination unit 620B may be provided in the MPU 50B. The HDC 60B prohibits (or stops) a write operation of the head HD1. For example, when receiving a write protect signal, the HDC 60B prohibits (or stops) the write operation of the head HD1.

The servo controller 610B controls a position of the head HD1. In other words, the servo controller 610B controls access by the head HD1 to a particular region of the disk DK1. The servo controller 610B includes the tracking controller 611B and the seek controller 612B.

The tracking controller 611B controls tracking of the head HD1 to a particular track of the disk DK1. The tracking controller 611B includes the DPES demodulation unit 6111B. The tracking controller 611B may include an SPES demodulation unit.

The DPES demodulation unit 6111B reads the data sector DS of the disk DK1 and demodulates a DPES.

The seek controller 612B controls seek of the head HD1 from a particular track to a targeted track on the disk DK1.

The write operation determination unit 620B is connected to the R/W channel 40A via the transmission path WR1. Note that the write operation determination unit 620B may not be connected to the R/W channel 40A via the transmission path WR1. The write operation determination unit 620B includes the position write operation determination unit 621B and the speed write operation determination unit 622B. The position write operation determination unit 621B determines a write operation of the head HD1 based on the position of the head HD1. The speed write operation determination unit 622B determines the write operation of the head HD1 based on a speed of the head HD1.

The write operation determination unit 620B determines whether to prohibit (or stop) write (or write operation) of the head HD1 corresponding to the HDC 60B.

When receiving a write protect determination signal (or write protect determination information) of write (or write operation) of the head HD1 corresponding to the HDC 60B, the write operation determination unit 620B determines whether to prohibit (or stop) the write (or write operation) of the head HD1 based on an SPES read and demodulated from the servo sector SS of the disk DK1 or a DPES read and demodulated from the data sector DS thereof by the head HD1.

When receiving a write protect determination signal (or write protect determination information) of write (or write operation) of the head HD1 corresponding to the HDC 60B, the write operation determination unit 620B determines whether or not the SPES or DPES corresponding to the head HD1 exceeds the threshold.

When determining that the SPES or DPES corresponding to the head HD1 exceeds the threshold, the write operation determination unit 620B determines prohibition (or stop) of the write (or write operation) of the head HD1 and outputs a write protect signal to the R/W channel 40B corresponding to the HDC 60B.

When receiving a signal for prohibiting write (or write operation) of the head HD0 corresponding to the HDC 60A from the first HDC write protect determination unit 412B, the write operation determination unit 620B may output a write protect signal to the R/W channel 40A. When receiving a signal for prohibiting write (or write operation) of the head HD0 corresponding to the HDC 60A from the first HDC write protect determination unit 412B, the write operation determination unit 620B may output a write protect signal to the R/W channel 40A via the transmission path WR1.

Note that, when receiving a signal for prohibiting write (or write operation) of the head HD0 corresponding to the HDC 60A from the first HDC write protect determination unit 412B, the write operation determination unit 620B may not output a write protect signal to the R/W channel 40A depending on a state of the system controller 130A, the head HD0, or the like.

For example, when determining that the SPES or DPES corresponding to the head HD1 exceeds the threshold, the write operation determination unit 620B may output a write protect signal to the R/W channel 40A.

For example, when determining that the SPES or DPES corresponding to the head HD1 is equal to or smaller than the threshold, the write operation determination unit 620B does not prohibit (or stop) the write (or write operation) using the head HD1 via the HDC 60B. In other words, when determining that the SPES or DPES corresponding to the head HD1 is equal to or smaller than the threshold, the write operation determination unit 620B continues (or carries on with) the write (or write operation) using the head HD1.

A method of demodulating a DPES will be described with reference to FIGS. 6, 7, and 8.

FIG. 6 is a schematic diagram illustrating an exemplary method of demodulating a DPES based on data preambles having different frequencies of adjacent tracks. FIG. 6 illustrates the servo sector SS, the data sector DS, signal outputs (amplitude), phases (θa, θb), a normalized signal output, a coefficient k, and a DPES. In FIG. 6, a plurality of tracks TR are successively arranged in the radial direction. FIG. 6 illustrates the read head RH and the write head WH. FIG. 6 illustrates a radial width (hereinafter, simply referred to as "width") Wr1 of the read head RH and a width Ww of the write head WH. In the servo sector SS and the data sector DS of FIG. 6, the horizontal axis represents the circumferential direction (circumferential position or Down track), and the vertical axis represents the radial direction (radial position or Cross track). The servo sector SS corresponds to each of the servo sectors SS illustrated in FIGS. 3 to 5. A width Ws of the sector/cylinder is indicated in the servo sector SS of FIG. 6. Note that the width of the sector/cylinder may be different for each track. In FIG. 6, the data sector DS corresponds to the data sector DS illustrated in FIG. 3. A width Wd of each data sector DS is indicated in the data sector DS of FIG. 6. The width Wd corresponds to a track pitch of each track TR. In the data sector DS of FIG. 6, for example, data preambles are subjected to shingled recording by the write head WH having a width equal to or larger than the width Wd at the track pitch Wd. The data preambles of FIG. 6 are written in a pattern of an A phase (A-phase pattern) naT and a pattern of a B phase (B-phase pattern) nbT described later, the A-phase pattern naT having a low recording frequency, for example, having a recording frequency lower than that of the B-phase pattern nbT, the B-phase pattern nbT having a high recording frequency, for example, having a recording frequency higher than that of the A-phase pattern naT. In FIG. 6, the plurality of data preambles of the plurality of tracks TR successively arranged in the radial direction are alternately written in the A-phase pattern naT and the B-phase pattern nbT. That is, in FIG. 6, data preambles of two adjacent tracks are written in different patterns, for example, at different recording frequencies. A component including a fundamental frequency of (a fundamental harmonic of) the pattern nT (naT, nbT) or a higher harmonic thereof is used as a signal, and therefore it is preferable that the fundamental frequency (of the fundamental harmonic) of each pattern do not overlap with the frequency of the higher harmonic of the other pattern. In the signal outputs obtained by reading the data sector DS of FIG. 6, the horizontal axis represents the signal output and the vertical axis represents the radial position. As the signal outputs obtained by reading the data sector DS of FIG. 6, a signal output (A-phase signal output) Va corresponding to the A-phase pattern and a signal output (B-phase signal output) Vb corresponding to the B-phase pattern are indicated. In the phases (θa, θb) of FIG. 6, the horizontal axis represents the phase [radian] and the vertical axis represents the radial position. As the phases of FIG. 6, a phase (A phase) (θa) corresponding to the A-phase signal output and a phase (B phase) (01c) corresponding to the B-phase signal output are indicated. In the normalized signal outputs of FIG. 6, the horizontal axis represents the normalized signal output, and the vertical axis represents the radial position. As the normalized signal outputs of FIG. 6, a normalized signal output (A-phase normalized signal output) Va' corresponding to the A-phase signal output and a normalized signal output (B-phase normalized signal output) Vb' corresponding to the B-phase signal output are indicated. In the coefficient k of FIG. 6, the horizontal axis represents the coefficient k, and the vertical axis represents the radial position. In the DPES of FIG. 6, the horizontal axis represents the DPES [Data track], and the vertical axis represents the radial position.

In a case where the data sector is read by the read head RH, the system controller 130 executes discrete Fourier transformation (DFT) operation at the frequencies corresponding to the A-phase pattern naT and the B-phase pattern nbT and calculates the signal outputs and the phases (A phase θa and B phase θb). In magnetic recording, generally, a signal output decreases as a recording frequency increases. Therefore, the system controller 130 corrects (normalizes) this influence by using the following Expressions (1) and (2).

$$Va' = Va \times kva \qquad \text{Expression (1)}$$

$$Vb' = Vb \times kvb \qquad \text{Expression (2)}$$

Herein, kva represents a coefficient of the A phase (A-phase coefficient), and kvb represents a coefficient of the B phase (B-phase coefficient).

The system controller 130 calculates the coefficient k for calculating the DPES based on the following Expression (3).

$$k = \frac{Vb' - Va'}{Vb' + Va'} \qquad \text{Expression (3)}$$

The system controller 130 determines a sign of the coefficient k based on the A phase θa and the B phase θb as shown by the following Expression (4) and calculates the DPES in units of tracks.

$$DPES[\text{Data track}] = \qquad \text{Expression (4)}$$
$$\begin{cases} k & \because \theta a > 0 \text{ and } \theta b > 0, \theta a < 0 \text{ and } \theta b < 0 \\ -k & \because \theta a > 0 \text{ and } \theta b < 0, \theta a < 0 \text{ and } \theta b > 0 \end{cases}$$

The system controller 130 performs unit conversion by multiplying the DPES in units of tracks by the track pitch Wd. The DPES has only position information at the track pitch Wd, and, for example, the system controller 130 adds the DPES to a position calculated based on an SPES demodulated from a track (cylinder) and a Null burst of a previous servo sector, thereby calculating the position of the head HD in a particular data sector DS. In consideration of the speed of the head HD at a demodulation position immediately before the particular data sector DS, the system controller 130 may add a moving distance of the head HD to the particular data sector to the position of the head HD calculated by adding the DPES to the position calculated based on the SPES, thereby calculating the position of the head HD in the particular data sector. The system controller 130 may also calculate a SIN component and a COS component of a fundamental frequency of a recording frequency of a data preamble of the particular data sector DS and calculate the position of the head HD in the particular data sector DS based on the calculated SIN component and COS component.

Figure 7:
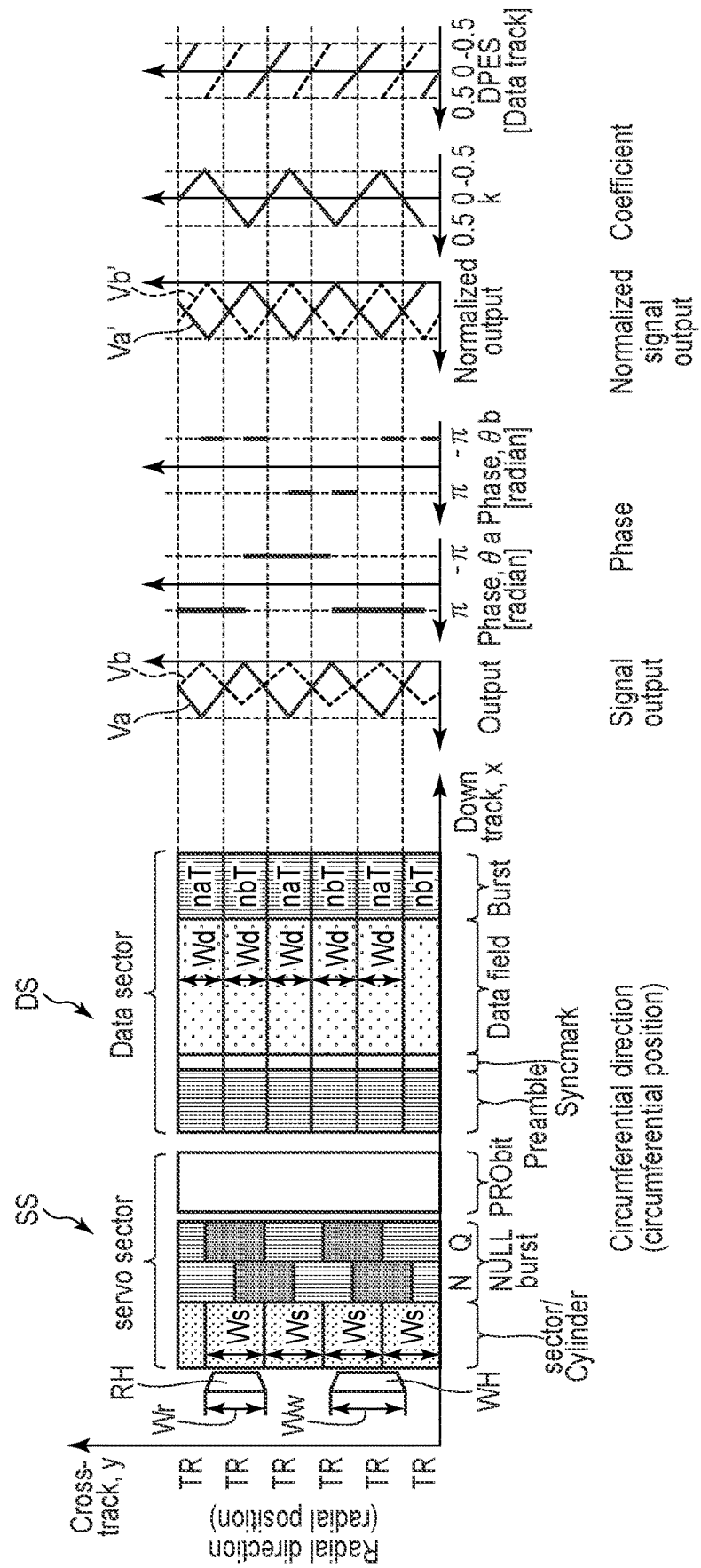
FIG. 7 is a schematic diagram illustrating an exemplary method of demodulating a DPES based on data bursts having different frequencies of adjacent tracks.

FIG. 7 is a schematic diagram illustrating an exemplary method of demodulating a DPES based on data bursts having different frequencies of adjacent tracks. In FIG. 7, the data sector DS corresponds to the data sector DS illustrated in FIG. 4. The data sector DS of FIG. 7 includes data bursts. The data bursts of FIG. 7 are written in the A-phase pattern naT and the B-phase pattern nbT. In FIG. 7, the plurality of data bursts of the plurality of tracks TR successively arranged in the radial direction are alternately written in the A-phase pattern naT and the B-phase pattern nbT. That is, in FIG. 7, data bursts of two adjacent tracks are written in different patterns, for example, at different recording frequencies.

The system controller 130 demodulates the DPES based on the data bursts in a similar manner to the method of demodulating the DPES based on the data preambles illustrated in FIG. 6 and calculates the position of the head HD based on the demodulated DPES. The system controller 130 may calculate a SIN component and a COS component of a fundamental frequency of a recording frequency of the data burst of the particular data sector DS and calculate the position of the head HD in the particular data sector DS based on the calculated SIN component and COS component.

Figure 8:
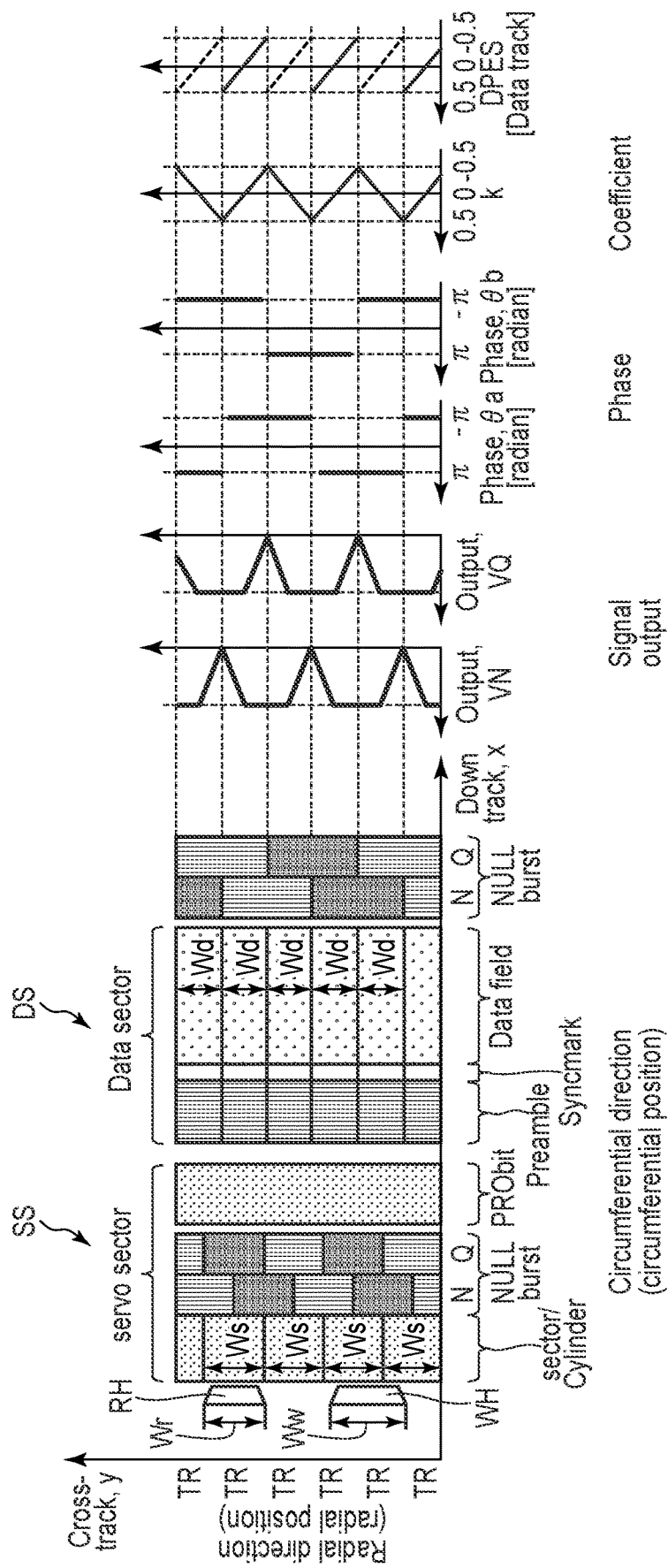
FIG. 8 is a schematic diagram illustrating an exemplary method of demodulating a DPES based on a data Null burst.

FIG. 8 is a schematic diagram illustrating an exemplary method of demodulating a DPES based on data Null bursts. FIG. 8 illustrates the servo sector SS, the data sector DS, signal outputs (VN, VQ), phases ($\theta$V, $\theta$Q), the coefficient k, and a DPES. FIG. 8 illustrates a width Wr2 of the read head RH. In FIG. 8, the data sector DS corresponds to the data sector DS illustrated in FIG. 4. In the data sector DS of FIG. 8, the data Null bursts are subjected to shingled recording by the write head WH having a width twice or more than the width Wd at the track pitch Wd. The data sector DS of FIG. 8 includes the data Null bursts. The data Null bursts of FIG. 8 are written in a pattern having a constant recording frequency and a width for two tracks in the radial direction. The data Null bursts of FIG. 8 have an N-phase data Null burst (N-phase data burst or data N burst) and a Q-phase data Q burst (Q-phase data burst or data Q burst) whose phases are shifted from each other by 90° with one cycle of four tracks. In the signal outputs obtained by reading the data Null bursts of FIG. 8 (hereinafter, also referred to as "Null burst signal outputs"), the horizontal axis represents the Null burst signal output, and the vertical axis represents the radial position. As the Null burst signal outputs, a signal output (N-phase signal output) VN corresponding to the data N burst and a signal output (Q-phase signal output) VQ corresponding to the data Q burst are indicated. In the phases of FIG. 8, the horizontal axis represents the phase [radian] and the vertical axis represents the radial position. As the phases of FIG. 8, a phase (N phase) ($\theta$N) corresponding to the N-phase signal output and a phase (Q phase) ($\theta$Q) corresponding to the Q-phase signal output are indicated. In the normalized signal outputs of FIG. 8, the horizontal axis represents the normalized signal output, and the vertical axis represents the radial position. As the normalized signal outputs of FIG. 8, a normalized signal output (N-phase normalized signal output) VN corresponding to the N-phase signal output and a normalized signal output (Q-phase normalized signal output) VQ corresponding to the Q-phase signal output are indicated. In the coefficient k of FIG. 8, the horizontal axis represents the coefficient k, and the vertical axis represents the radial position. In the DPES of FIG. 8, the horizontal axis represents the DPES [Data track], and the vertical axis represents the radial position.

In a case where the data sector is read by the read head RH, the system controller 130 executes DFT operation at a frequency corresponding to a pattern of the data sector and calculates the signal outputs VN and VQ and the phases $\theta$N and $\theta$Q. The system controller 130 calculates the coefficient k by using the following Expression (5).

$$k = \frac{VQ - VN}{VQ + VN} \qquad \text{Expression (5)}$$

The system controller 130 determines a sign of the coefficient k based on the N phase $\theta$N and the Q phase $\theta$Q as shown by the following Expression (6) and calculates the DPES in units of tracks.

$$DPES[\text{Data track}] = \qquad \text{Expression (6)}$$
$$\begin{cases} k \because \theta N > 0 \text{ and } \theta Q > 0, \theta N < 0 \text{ and } \theta Q < 0 \\ -k \because \theta N > 0 \text{ and } \theta Q < 0, \theta N < 0 \text{ and } \theta Q > 0 \end{cases}$$

The system controller 130 performs unit conversion by multiplying the DPES in units of tracks by the track pitch Wd. The DPES has only position information at the track pitch Wd, and, for example, the system controller 130 adds the DPES to a position calculated based on an SPES demodulated from a track (cylinder) and a Null burst of a previous servo sector, thereby calculating the position of the head HD in a particular data sector DS. In consideration of the speed at a demodulation position immediately before the particular data sector DS, the system controller 130 may add a moving distance of the head HD to the particular data sector to the position of the head HD calculated by adding the DPES to the position calculated based on the SPES, thereby calculating the position of the head HD in the particular data sector.

FIG. 9 illustrates exemplary timings at which the SPES and the DPES are demodulated. In FIG. 9, the horizontal axis represents time. The time on the horizontal axis of FIG. 9 passes as the horizontal axis approaches a tip of an arrow. FIG. 9 illustrates timings m, m+1, and m+2 at which the SPES is demodulated (hereinafter, also referred to as "SPES demodulation timings", "demodulation timings", or "timings"). In the time on the horizontal axis of FIG. 9, the SPES demodulation timings m, m+1, and m+2 are arranged in the described order at intervals toward the tip of the arrow of the time. FIG. 9 illustrates timings n, n+1, n+2, and n+3 at which the DPES is demodulated (hereinafter, also referred to as "DPES demodulation timings", "demodulation timings", or "timings"). In the time on the horizontal axis of FIG. 9, the DPES demodulation timings n, n+1, n+2, and n+3 are arranged in the described order at intervals toward the tip of the arrow of the time. The DPES demodulation timings n and n+1 are arranged between the SPES demodulation timings m and m+1. The DPES demodulation timing n corresponds to a timing after the SPES demodulation timing m, the DPES demodulation timing n+1 corresponds to a timing after the DPES demodulation timing n, and the SPES demodulation timing m+1 corresponds to a timing after the DPES demodulation timing n+1. The DPES demodulation timings n+2 and n+3 are arranged between the SPES demodulation timings m+1 and m+2. The DPES demodulation timing n+2 corresponds to a timing after the SPES demodulation timing m+1, the DPES demodulation timing n+3 corresponds to a timing after the DPES demodulation timing n+2, and the SPES demodulation timing m+2 corresponds to a timing after the DPES demodulation timing n+3.

As illustrated in FIG. 9, the system controller 130 can acquire information (DPES) at the radial position added to the data sector DS at shorter time intervals than information (SPES) at the radial position added to the servo sector SS. The system controller 130 acquires the SPES at the SPES demodulation timings m, m+1, and m+2. The system controller 130 acquires the DPES at the DPES demodulation timings n, n+1, n+2, and n+3. The system controller 130 can use the DPES for servo positioning control and for determining prohibition (or stop) of a write operation to the data sector DS.

FIG. 10 is a schematic diagram illustrating an exemplary method of determining prohibition of a write operation according to the present embodiment. In FIG. 10, the horizontal axis represents time, and the vertical axis represents a position error (and radial position). The time on the horizontal axis of FIG. 10 passes as the horizontal axis approaches a tip of an arrow. Times t0 and t1 are indicated on the time on the horizontal axis of FIG. 10. The time t1 corresponds to a time after the time t0. The time t0 corresponds to a radial position (hereinafter, also referred to as "current position" or "current position error") P0 of a current sample of the head HD. The position error on the vertical axis of FIG. 10 has a positive value increasing toward a tip of a positive arrow and a negative value decreasing toward a tip of a negative arrow. The position error on the vertical axis of FIG. 10 has thresholds +th and −th. The thresholds +th and −th have the same absolute value. The current position (current position error) P0 of the head HD is indicated on the vertical axis of FIG. 10.

In the example illustrated in FIG. 10, the system controller 130 determines whether or not the current position (current position error) P0 of the head HD exceeds the thresholds +th and −th. The system controller 130 determines that the current position (current position error) P0 of the head HD exceeds the threshold +th. When determining that the current position (current position error) of the head HD exceeds the threshold +th, the system controller 130 prohibits (or stops) a write operation.

FIG. 11 is a schematic diagram illustrating an exemplary method of determining prohibition of a write operation according to the present embodiment. In FIG. 11, the horizontal axis represents time, and the vertical axis represents a position error (and radial position). The time on the horizontal axis of FIG. 11 passes as the horizontal axis approaches a tip of an arrow. Times t0 and t1 are indicated on the time on the horizontal axis of FIG. 11. In FIG. 11, the time t1 corresponds to an estimated radial position (hereinafter, also referred to as "next estimated position" or "next position error") P1 of the next sample of the head HD. A time interval Δt sample between the time t0 and the time t1 is indicated in the time on the horizontal axis of FIG. 11. The position error on the vertical axis of FIG. 11 has thresholds +th and −th. The next estimated position (next position error) P1 of the head HD is indicated on the vertical axis of FIG. 11.

In the example illustrated in FIG. 11, the system controller 130 calculates the next estimated position (next position error) P1 of the head HD. The system controller 130 calculates the next estimated position (next position error) P1 by using the following Expression (7) based on the current position (current position error) P0 of the head HD, a speed v0 of the head HD, and the time interval Δt sample.

$$P1 = P0 + v0 \times \Delta t \text{sample} \qquad \text{Expression (7)}$$

FIG. 12 is a schematic diagram illustrating an exemplary method of determining prohibition of write operations of the plurality of heads HD of the respective plurality of actuators AC. FIG. 12 illustrates a timing at which the data sector DS is read by the valid head HD0 of the actuator AC0 to demodulate an SPES (hereinafter, also referred to as "SPES demodulation timing of the head HD0"), a timing at which the data sector DS is read by the valid head HD0 of the actuator AC0 to demodulate a DPES (hereinafter, also referred to as "DPES demodulation timing of the head HD0"), a timing at which the data sector DS is read by the valid head HD1 of the actuator AC1 to demodulate an SPES (hereinafter, also referred to as "SPES demodulation timing of the head HD1"), and a timing at which the data sector DS is read by the valid head HD1 of the actuator AC1 to demodulate a DPES (hereinafter, also referred to as "DPES demodulation timing of the head HD1"). In FIG. 12, the horizontal axis represents time. The time on the horizontal axis of FIG. 12 passes as the horizontal axis approaches a tip of an arrow.

FIG. 12 illustrates SPES demodulation timings h, h+1, and h+2 of the head HD0. In the time on the horizontal axis of FIG. 12, the SPES demodulation timings h, h+1, and h+2 of the head HD0 are arranged in the described order at intervals toward the tip of the arrow of the time. FIG. 12 illustrates DPES demodulation timings i, i+1, i+2, i+3, and i+4 of the head HD0. In the time on the horizontal axis of FIG. 12, the DPES demodulation timings i, i+1, i+2, i+3, and i+4 of the head HD0 are arranged in the described order at intervals toward the tip of the arrow of the time. The DPES demodulation timings i and i+1 of the head HD0 are arranged between the SPES demodulation timings h and h+1 of the head HD0. The DPES demodulation timing i of the head HD0 corresponds to a timing after the SPES demodulation timing h of the head HD0, the DPES demodulation timing i+1 of the head HD0 corresponds to a timing after the DPES demodulation timing i of the head HD0, and the SPES demodulation timing h+1 of the head HD0 corresponds to a timing after the DPES demodulation timing i+1 of the head HD0. The DPES demodulation timings i+2 and i+3 of the head HD0 are arranged between the SPES demodulation timings h+1 and h+2 of the head HD0. The DPES demodulation timing i+2 of the head HD0 corresponds to a timing after the SPES demodulation timing h+1 of the head HD0, the DPES demodulation timing i+3 of the head HD0 corresponds to a timing after the DPES demodulation timing i+2 of the head HD0, and the SPES demodulation timing h+2 of the head HD0 corresponds to a timing after the DPES demodulation timing i+3 of the head HD0. The DPES demodulation timing i+4 of the head HD0 corresponds to a timing after the SPES demodulation timing h+2 of the head HD0.

FIG. 12 illustrates SPES demodulation timings j, j+1, and j+2 of the head HD1. In the time on the horizontal axis of FIG. 12, the SPES demodulation timings j, j+1, and j+2 of the head HD1 are arranged in the described order at intervals toward the tip of the arrow of the time. FIG. 12 illustrates DPES demodulation timings k, k+1, k+2, and k+3 of the head HD1. In the time on the horizontal axis of FIG. 12, the DPES demodulation timings k, k+1, k+2, and k+3 of the head HD1 are arranged in the described order at intervals toward the tip of the arrow of the time. The DPES demodulation timings k and k+1 of the head HD1 are arranged between the SPES demodulation timings j and j+1 of the head HD1. The DPES demodulation timing k of the head HD1 corresponds to a timing after the SPES demodulation timing j of the head HD1, the DPES demodulation timing k+1 of the head HD1 corresponds to a timing after the DPES demodulation timing k of the head HD1, and the SPES demodulation timing j+1 of the head HD1 corresponds to a timing after the DPES demodulation timing k+1 of the head HD1. The DPES demodulation timings k+2 and k+3 of the head HD1 are arranged between the SPES demodulation timings j+1 and j+2 of the head HD1. The DPES demodulation timing k+2 of the head HD1 corresponds to a timing after the SPES demodulation timing j+1 of the head HD1, the DPES demodulation timing k+3 of the head HD1 corresponds to a timing after the DPES demodulation timing k+2 of the head HD1, and the SPES demodulation timing j+2 of the head HD1 corresponds to a timing after the DPES demodulation timing k+3 of the head HD1.

In FIG. 12, the DPES demodulation timing i of the head HD0 is arranged between the DPES demodulation timing k−1 of the head HD1 and the SPES demodulation timing j of the head HD1. The DPES demodulation timing i+1 of the head HD0 is arranged between the DPES demodulation timings k and k+1 of the head HD1. The SPES demodulation timing h+1 of the head HD0 and the DPES demodulation timing i+2 of the head HD0 are arranged between the DPES demodulation timing k+1 of the head HD1 and the SPES demodulation timing j+1 of the head HD1. The DPES demodulation timing i+3 of the head HD0 is arranged between the DPES demodulation timings k+2 and k+3 of the head HD1. The SPES demodulation timing h+2 of the head HD0 and the DPES demodulation timing i+4 of the head HD0 are arranged between the DPES demodulation timing k+3 of the head HD1 and the SPES demodulation timing j+2 of the head HD1.

In FIG. 12, the DPES demodulation timings i, i+1, i+2, i+3, and i+4 of the head HD0 are different from the DPES demodulation timings k−1, k, k+1, k+2, and k+3 of the head HD1. In other words, the DPES demodulation timings i, i+1, i+2, i+3, and i+4 of the head HD0 are set to be shifted from the DPES demodulation timings k−1, k, k+1, k+2, and k+3 of the head HD1. The SPES demodulation timings h, h+1, and h+2 of the head HD0 are different from the SPES demodulation timings j, j+1, j+2, and j+3 of the head HD1. In other words, the SPES demodulation timings h, h+1, and h+2 of the head HD0 are set to be shifted from the SPES demodulation timings j, j+1, and j+2 of the head HD1. That is, the data sector DS (data preamble, data burst, or data Null burst) of the disk DK0 is arranged to be shifted in the circumferential direction from the data sector DS of the disk DK1. The servo sector SS of the disk DK0 is also arranged to be shifted in the circumferential direction from the servo sector SS of the disk DK1. The servo sector SS and the data sector DS on the upper surface FS0 and the lower surface RS0 of the disk DK0 may be arranged to be shifted in the circumferential direction. The servo sector SS and the data sector DS on the upper surface FS1 and the lower surface RS1 of the disk DK1 may be arranged to be shifted in the circumferential direction. FIG. 12 illustrates a time interval Δtk between the DPES demodulation timing i+1 of the head HD0 and the DPES demodulation timing k+1 of the head HD1.

The system controller 130 performs self-servo write of the servo sectors SS of the disks DK0 and DK1 so that the data sector DS (data preamble, data burst, or data Null burst) of the disk DK0 and the data sector DS (data preamble, data burst, or data Null burst) of the disk DK1 are arranged to be shifted in the circumferential direction and the servo sector SS of the disk DK0 and the servo sector SS of the disk DK1 are arranged to be shifted in the circumferential direction. Note that the system controller 130 may perform self-servo write of the servo sectors SS on the upper surface FS0 and the lower surface RS0 of the disk DK0 so that the data sector DS (data preamble, data burst, or data Null burst) on the upper surface FS0 of the disk DK0 and the data sector DS (data preamble, data burst, or data Null burst) on the lower surface RS0 of the disk DK0 are arranged to be shifted in the circumferential direction and the servo sector SS on the upper surface FS0 of the disk DK0 and the servo sector SS on the lower surface RS0 of the disk DK0 are arranged to be shifted in the circumferential direction. The system controller 130 may also perform self-servo write of the servo sectors SS on the upper surface FS1 and the lower surface RS1 of the disk DK1 so that the data sector DS (data preamble, data burst, or data Null burst) on the upper surface FS1 of the disk DK1 and the data sector DS (data preamble, data burst, or data Null burst) on the lower surface RS1 of the disk DK1 are arranged to be shifted in the circumferential direction and the servo sector SS on the upper surface FS1 of the disk DK1 and the servo sector SS on the lower surface RS1 of the disk DK1 are arranged to be shifted in the circumferential direction. That is, the system controller 130 may set a different data sector format on each surface of the disk DK.

In the example illustrated in FIG. 12, the system controller 130A performs self-servo write of the servo sector SS so that the DPES can be demodulated at the timings i, i+1, i+2, i+3, and i+4 and the SPES can be demodulated at the timings h, h+1, and h+2.

In the example illustrated in FIG. 12, the system controller 130B performs self-servo write of the servo sector SS so that the DPES can be demodulated at the timings k−1, k, k+2, and k+3 and the SPES can be demodulated at the timings j, j+1, and j+2.

When determining prohibition of a write operation using a valid head HD of a particular actuator AC among the plurality of actuators AC, the system controller 130 outputs a write protect signal for prohibiting a write operation using a valid head HD of an actuator AC different from the above actuator AC to the HDC 60 corresponding to the different actuator AC.

In the example illustrated in FIG. 12, the system controller 130A demodulates a DPES at the DPES demodulation timing i+1 by using the head HD0 corresponding to the actuator AC0. When determining that the DPES demodulated at the DPES demodulation timing i+1 exceeds the threshold, the system controller 130A prohibits a write operation using the head HD0 at the DPES demodulation timing i+1. The system controller 130A outputs a write protect signal to the system controller 130B via the transmission path WR0. When receiving a write protect signal, the system controller 130B prohibits (stops) a write operation of the head HD1 corresponding to the actuator AC1 at the DPES demodulation timing k+1. Therefore, the system controller 130B can restrain data from being erroneously written to a region corresponding to the time interval Δtk. For example, the system controllers 130A and 130B preferably perform servo tracking on both of the heads HD0 and HD1 on the disk DK (DK0 and DK1) so that the DPES can be demodulated even in a case where the other of the heads HD0 and HD1 is in an idle state.

FIG. 13 is a block diagram illustrating an example of a positioning control system SYS of the head HD according to the present embodiment.

The magnetic disk device 1 includes the positioning control system SYS of the head HD (hereinafter, also simply referred to as "positioning control system"). The positioning control system SYS includes a positioning control system CSYS0 of the head HD0 of the actuator AC0 (hereinafter, also referred to as "positioning control system of the head HD0") and a positioning control system CSYS1 of the head HD1 of the actuator AC1 (hereinafter, also referred to as "positioning control system of the head HD1").

The positioning control system CSYS0 of the head HD0 includes a controller S01, a transmission characteristic Fxact (A, B) S02 of mutual interference between the actuators AC0 and AC1 (hereinafter, also referred to as "transmission characteristic"), a VCM S03, an MA S04, a calculator CL01, a calculator CL02, and a calculator CL03. For example, the system controller 130A includes the controller S01. The transmission characteristic Fxact (A, B) S02 outputs a signal (hereinafter, also referred to as "first compensation signal") for compensating a positional disturbance applied to the head HD1. Fxact (A, B) S02 may have a parameter for each configuration. The VCM S03 corresponds to the VCM 140. The MA S04 corresponds to the MA 160.

The positioning control system CSYS1 of the head HD1 includes a controller S11, a transmission characteristic Fxact (B, A) S12 of mutual interference between the actuators AC0 and AC1 (hereinafter, also referred to as "transmission characteristic"), a VCM S13, an MA S14, a calculator CL11, a calculator CL12, and a calculator CL13. For example, the system controller 130B includes the controller S11. The transmission characteristic Fxact (B, A) S12 outputs a signal (hereinafter, also referred to as "second compensation signal") for compensating a positional disturbance applied to the head HD0. The transmission characteristic Fxact (B, A) S12 may have a parameter for each configuration. The VCM S13 corresponds to the VCM 141. The MA S14 corresponds to the MA 161.

The calculator CL01 accepts input of information (current position information) POS0 on the current position of the head HD0 and a target position of the head HD0. The calculator CL01 outputs, to the controller S01, a position error PES0 of the head HD0 corresponding to a difference between the current position information POS0 of the head HD0 and the target position of the head HD0.

The controller S01 accepts input of the position error PES0. The controller S01 outputs the position error PES0 to the transmission characteristics Fxact (A, B) S02, the VCM S03, and the calculator CL02. The transmission characteristic Fxact (A, B) S02 accepts input of the position error PES0. The transmission characteristic Fxact (A, B) S02 converts the position error PES0 into a first compensation signal and outputs the converted first compensation signal to the calculator CL12. The VCM S03 accepts input of the position error PES0. Based on the position error PES0, the VCM S03 outputs an operation amount (hereinafter, also referred to as "first operation amount") for operating the actuator AC0 to the calculator CL03.

The calculator CLO2 accepts input of the position error PES0 and a second compensation signal described later. The calculator CLO2 outputs, to the MA S04, an addition value (hereinafter, also referred to as "first addition value") obtained by adding the second compensation signal to the position error PES0. The MA S04 accepts input of the first addition value. Based on the first addition value, the MA S04 outputs a fine operation amount (hereinafter, also referred to as "first fine operation amount") for finely operating the head HD0 to the calculator CL03. The calculator CLO3 accepts input of the first operation amount and the first fine operation amount. The calculator CLO3 outputs the current position information POS0 obtained by adding the first fine operation amount to the first operation amount to the calculator CL01 and moves the head HD0 to the target position based on the current position information.

The calculator CL 11 accepts input of current position information POS1 of the head HD1 and a target position of the head HD1. The calculator CL11 outputs, to the controller S11, a position error PES1 of the head HD1 corresponding to a difference between the current position information POS1 of the head HD1 and the target position of the head HD1.

The controller S11 accepts input of the position error PES1. The controller S11 outputs the position error PES1 to the transmission characteristics Fxact (B, A) S12, the VCM S13, and the calculator CL12. The transmission characteristic Fxact (B, A) S12 accepts input of the position error PES1. The transmission characteristic Fxact (B, A) S12 converts the position error PES1 into a second compensation signal and outputs the converted second compensation signal to the calculator CL02. The VCM S13 accepts input of the position error PES1. Based on the position error PES1, the VCM S13 outputs an operation amount (hereinafter, also referred to as "second operation amount") for operating the actuator AC1 to the calculator CL 13.

The calculator CL12 accepts input of the position error PES1 and the first compensation signal. The calculator CL12 outputs, to the MA S14, an addition value (hereinafter, also referred to as "second addition value") obtained by adding the first compensation signal to the position error PES1. The MA S14 accepts input of the second addition value. Based on the second addition value, the MA S14 outputs a fine operation amount (hereinafter, also referred to as "second fine operation amount") for finely operating the head HD1 to the calculator CL 13. The calculator CL 13 accepts input of the second operation amount and the second fine operation amount. The calculator CL13 outputs the current position information POS1 obtained by adding the second fine operation amount to the second operation amount to the calculator CL11 and moves the head HD1 to the target position based on the current position information.

Figure 14:
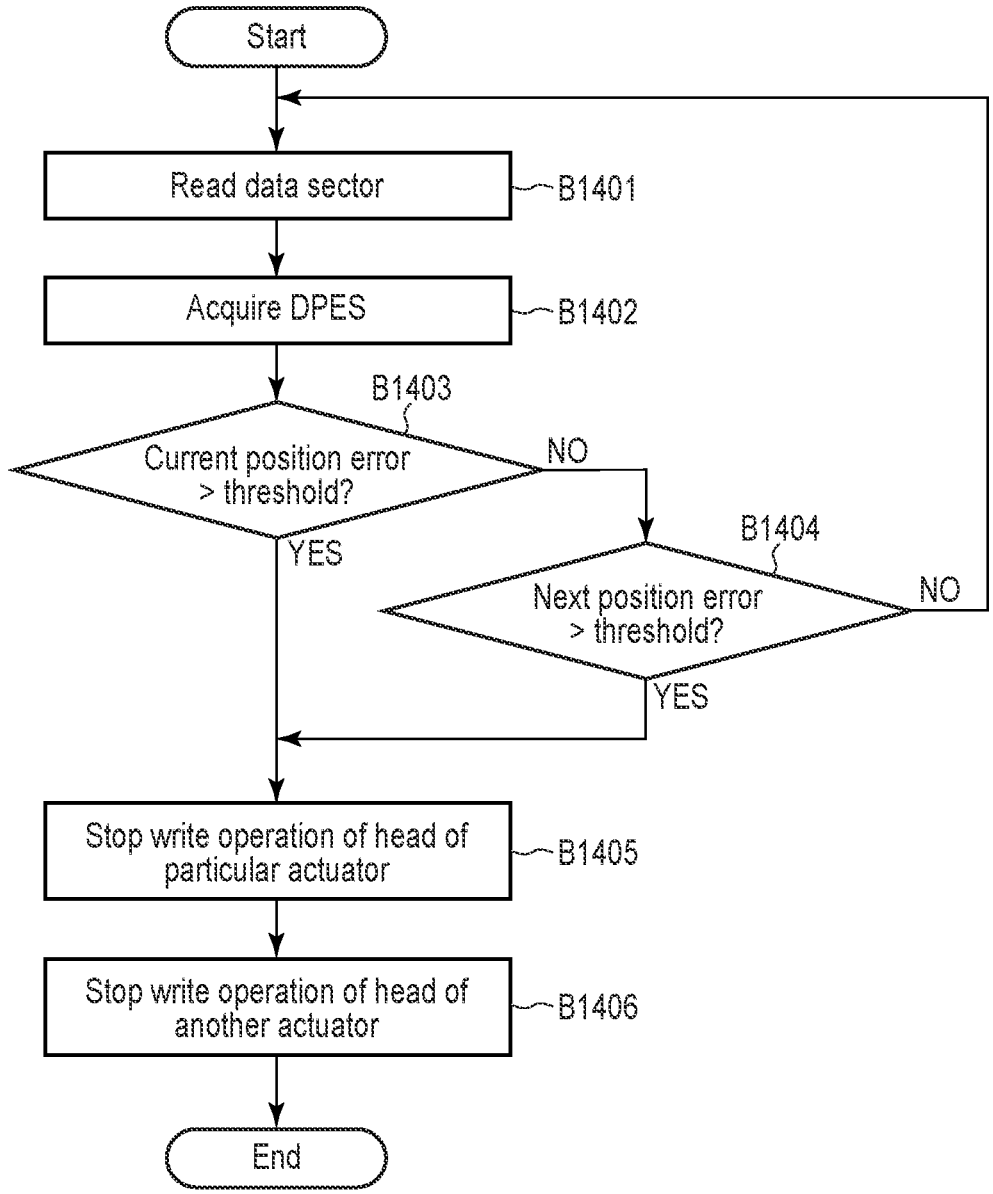
FIG. 14 is a flowchart showing an exemplary method of stopping a write operation according to the first embodiment.

FIG. 14 is a flowchart showing an exemplary method of stopping a write operation according to the present embodiment.

The system controller 130 reads a data sector by using a head HD of a particular actuator AC (B1401), demodulates a DPES based on particular information (or particular data) of the data sector, and thus acquires the DPES (B1402). Examples of the particular information of the data sector encompass a data preamble, a data burst, and a data Null burst. The system controller 130 determines whether or not a current position error corresponding to the head HD of the particular actuator AC is larger than a threshold for stopping the head HD (B1403).

When determining that the current position error corresponding to the head HD of the particular actuator AC is equal to or smaller than the threshold (NO in B1403), the system controller 130 determines whether or not the next position error of the head HD of the particular actuator AC is larger than the threshold for stopping the head HD (B1404). When determining that the next position error is equal to or smaller than the threshold (NO in B1404), the system controller 130 proceeds to the processing in B1401. When determining that the next position error is larger than the threshold (YES in B1404), the system controller 130 proceeds to the processing in B1405.

When determining that the current position error corresponding to the head HD of the particular actuator AC is larger than the threshold (YES in B1403), the system controller 130 stops (prohibits) a write operation of the head HD of the particular actuator AC (B1405), also stops (prohibits) a write operation of a head HD of another actuator AC different from the particular actuator AC (B1406), and ends the processing.

According to the present embodiment, the magnetic disk device 1 includes a plurality of disks DK, a plurality of heads HD corresponding to the plurality of disks, a plurality of actuators AC corresponding to the plurality of heads HD, and a plurality of system controllers 130 corresponding to the plurality of actuators AC. Data sectors DS of the respective disks DK are arranged to be shifted from each other in the circumferential direction. A particular system controller 130 among the plurality of system controllers 130 reads a servo sector SV of a disk DK corresponding to a head HD of a particular actuator AC corresponding to the particular system controller 130 by using the particular head HD and demodulates an SPES. The particular system controller 130 among the plurality of system controllers 130 reads a data sector DS of the disk DK corresponding to the head HD of the particular actuator AC corresponding to the particular system controller 130 by using the particular head HD and demodulates a DPES. The particular system controller 130 calculates a current position error of the particular head HD based on the SPES or DPES. In a case where the current position error of the particular head HD exceeds a threshold for stopping (or prohibiting) a write operation of the particular head HD, the particular system controller 130 stops (or prohibits) the write operation using the particular head HD. When stopping (or prohibiting) the write operation using the particular head HD, the particular system controller 130 can also stop (or prohibit) a write operation using a head HD of another actuator AC corresponding to another system controller 130 different from the particular system controller 130 among the plurality of system controllers 130. For example, the particular system controller 130 outputs a write protect signal to the another system controller 130 via the transmission path (WR0 or WR1) such as wiring, thereby stopping (or prohibiting) the write operation using the head HD of the another actuator AC. The magnetic disk device 1 can acquire a position error of the head HD based on a DPES demodulated by reading the data sector, instead of acquiring a position error of the head HD based only on an SPES demodulated by reading the servo sector, and can therefore acquire a position error of the head HD at a short time interval. When a vibration or shock is applied, the magnetic disk device 1 stops (or prohibit) a write operation based on the DPES or the like, instead of stopping (or prohibiting) a write operation based only on the SPES, and can therefore stop (prohibit) the write operation of the head HD in a short time. The magnetic disk device 1 can make a threshold used to stop (or prohibit) the write operation based on the DPES or the like smaller than a threshold used to stop (or prohibit) the write operation based only on the SPES. Further, when stopping (or prohibiting) the write (or write operation) of the head HD of the particular actuator AC, the magnetic disk device 1 can also stop (or prohibit) the write (or write operation) of the head HD of the another actuator AC different from the particular actuator AC. Therefore, the magnetic disk device 1 can increase a surface recording density of the data sector format. Accordingly, the magnetic disk device 1 can improve a format efficiency.

Next, magnetic disk devices according to other embodiments and modification examples will be described. In the other embodiments and modification examples, the same parts as those in the above-described embodiment will be denoted by the same reference signs, and detailed description thereof will be omitted.

First Modification Example

A configuration of the magnetic disk device 1 according to a first modification example of the first embodiment is different from the configuration of the magnetic disk device 1 according to the first embodiment.

FIG. 15 is a schematic diagram illustrating an exemplary configuration of the magnetic disk device 1 according to the first modification example.

In the example illustrated in FIG. 15, the communication unit 191 includes a write protect information transmission unit 1911. The write protect information transmission unit 1911 transmits a write protect signal.

The write protect unit 410 includes the shock sensor write protect determination unit 411 and the first HDC write protect determination unit 412 or the second HDC write protect determination unit 413.

The write operation determination unit 620 further includes a PES write operation determination unit 623. The PES write operation determination unit 623 determines whether to prohibit (or stop) write (or write operation) of a particular head HD corresponding to a particular HDC 60 or another HDC 60 based on an SPES or DPES read and demodulated from a servo sector SV or data sector DS of a disk DK corresponding to the particular HDC 60 or the another HDC 60 via the particular HDC 60 or the another HDC 60 by using a particular head HD corresponding to the particular HDC 60 or the another HDC 60.

For example, when receiving a write protect signal, the PES write operation determination unit 623 determines whether to prohibit (or stop) write (or write operation) of the particular head HD corresponding to the particular HDC 60 or the another HDC 60. In other words, when receiving vibration detection information, the PES write operation determination unit 623 determines whether to prohibit (or stop) write (or write operation) of the particular head HD corresponding to the particular HDC 60 or the another HDC 60. When determining prohibition (or stop) of the write (or write operation) of the particular head HD corresponding to the particular HDC 60 or the another HDC 60, the PES write operation determination unit 623 prohibits (or stops) the write (or write operation) of the particular head HD corresponding to the particular HDC 60 or the another HDC 60. When determining prohibition (stop) of the write (or write operation) of the particular head HD corresponding to the particular HDC 60 or the another HDC 60, the PES write operation determination unit 623 outputs a write protect signal to a particular R/W channel 40 or another R/W channel 40 via the particular HDC 60 or via the another HDC 60 and the write protect information transmission unit 1911. Note that, when receiving a write protect signal, the PES write operation determination unit 623 may not prohibit (or stop) the write (or write operation) of the particular head HD (write head WH) or another head HD (write head WH) depending on a state of a particular system controller 130, another system controller 130, the particular head HD corresponding to the particular HDC 60, or the particular head HD corresponding to the another HDC 60. In other words, when receiving a write protect signal, the PES write operation determination unit 623 may not output the write protect signal to the particular R/W channel 40 or the another R/W channel depending on a state of the particular system controller 130, the another system controller 130, the particular head HD corresponding to the particular HDC 60, or the particular head HD corresponding to the another HDC 60.

For example, when receiving a write protect signal, the PES write operation determination unit 623 prohibits (or stops) the write (or write operation) of the particular head HD corresponding to the particular HDC 60 or the another HDC 60. In other words, when receiving vibration detection information, the PES write operation determination unit 623 prohibits (or stops) the write (or write operation) of the particular head HD corresponding to the particular HDC 60 or the another HDC 60. When receiving vibration detection information, the PES write operation determination unit 623 outputs the vibration detection information to the particular R/W channel 40 or the another R/W channel 40 via the particular HDC 60 or via the another HDC 60 and the write protect information transmission unit 1911.

The write protect unit 410A includes the shock sensor write protect determination unit 411A and the first HDC write protect determination unit 412A.

The write operation determination unit 620A further includes a PES write operation determination unit 623A. The PES write operation determination unit 623A determines whether to prohibit (or stop) write (or write operation) of the head HD1 corresponding to the HDC 60B based on an SPES or DPES read and demodulated from the servo sector SV or the data sector DS of the disk DK1 corresponding to the HDC 60B via the HDC 60B by using the head HD1.

For example, when receiving a write protect signal for prohibiting (or stopping) write (or write operation) of the head HD0, the PES write operation determination unit 623A outputs a write protect signal for prohibiting (or stopping) write (or write operation) of the head HD1 to the R/W channel 40B via the write protect information transmission unit 1911 and the HDC 60B. In other words, when receiving vibration detection information including a write protect signal for prohibiting (or stopping) write (or write operation) of the head HD0 and indicating that the head HD0 has been vibrated, the PES write operation determination unit 623A outputs vibration detection information for prohibiting (or stopping) write (or write operation) of the head HD1 to the R/W channel 40B via the write protect information transmission unit 1911 and the HDC 60B.

Note that, when receiving a write protect signal for prohibiting (or stopping) write (or write operation) of the head HD0, the PES write operation determination unit 623A may not output a write protect signal for prohibiting (or stopping) write (or write operation) of the head HD1 to the R/W channel 40B depending on a state of the system controller 130B, the head HD1, or the like. In other words, when receiving vibration detection information including a write protect signal for prohibiting (or stopping) write (or write operation) of the head HD0 and indicating that the head HD0 has been vibrated, the PES write operation determination unit 623A may not output vibration detection information for prohibiting (or stopping) write (or write operation) of the head HD1 to the R/W channel 40B depending on a state of the system controller 130B, the head HD1, or the like.

The write protect unit 410B includes the shock sensor write protect determination unit 411B and the second HDC write protect determination unit 413B.

The write operation determination unit 620B further includes a PES write operation determination unit 623B. The PES write operation determination unit 623B determines whether to prohibit (or stop) write (or write operation) of the head HD0 corresponding to the HDC 60A based on an SPES or DPES read and demodulated from the servo sector SV or the data sector DS of the disk DK0 corresponding to the HDC 60A via the HDC 60A by using the head HD0.

For example, when receiving a write protect signal for prohibiting (or stopping) write (or write operation) of the head HD1, the PES write operation determination unit 623B outputs a write protect signal for prohibiting (or stopping) write (or write operation) of the head HD0 to the R/W channel 40A via the write protect information transmission unit 1911 and the HDC 60A. In other words, when receiving vibration detection information including a write protect signal for prohibiting (or stopping) write (or write operation) of the head HD1 and indicating that the head HD1 has been vibrated, the PES write operation determination unit 623B outputs vibration detection information for prohibiting (or stopping) write (or write operation) of the head HD0 to the R/W channel 40A via the write protect information transmission unit 1911 and the HDC 60A.

Note that, when receiving a write protect signal for prohibiting (or stopping) write (or write operation) of the head HD1, the PES write operation determination unit 623B may not output a write protect signal for prohibiting (or stopping) write (or write operation) of the head HD0 to the R/W channel 40A depending on a state of the system controller 130A, the head HD0, or the like. In other words, when receiving vibration detection information including a write protect signal for prohibiting (or stopping) write (or write operation) of the head HD1 and indicating that the head HD1 has been vibrated, the PES write operation determination unit 623B may not output vibration detection information for prohibiting (or stopping) write (or write operation) of the head HD0 to the R/W channel 40A depending on a state of the system controller 130A, the head HD0, or the like.

According to the first modification example, the magnetic disk device 1 further includes the write protect information transmission unit 1911. In a case where a current position error of a particular head HD corresponding to a particular actuator exceeds a threshold for stopping (or prohibiting) a write operation of the particular head HD, a particular system controller 130 stops (or prohibits) the write operation using the particular head HD. When stopping (or prohibiting) the write operation using the particular head HD, the particular system controller 130 can also stop (or prohibit) write (or write operation) of a head HD of another actuator AC corresponding to another system controller 130 different from the particular system controller 130 among a plurality of system controllers 130. For example, the particular system controller 130 outputs a write protect signal (or vibration detection information) to the another system controller 130 via the write protect information transmission unit 1911 to stop (or prohibit) the write (or write operation) of the head HD of the another actuator AC. Therefore, the magnetic disk device 1 can improve the format efficiency.

Second Embodiment

A configuration of a magnetic disk device 1 according to a second embodiment is different from the configurations of the magnetic disk devices 1 according to the first embodiment and the first modification example.

FIG. 16 is a schematic diagram illustrating an exemplary configuration of the magnetic disk device 1 according to the second embodiment.

In the example illustrated in FIG. 16, a disk DK includes a disk DK2. The disk DK2 is attached to a spindle 12. The disk DK2 has an upper surface FS2 and a lower surface RS2 opposite to the upper surface FS2. The disk DK2 may include two or more disks.

A head HD includes a head HD2. The head HD2 includes a head HD20 facing the upper surface FS2 of the disk DK2 and a head HD21 facing the lower surface RS2 of the disk DK2. The head HD2 may include only one head or three or more heads. The head HD2 includes a write head WH2 that writes data to the disk DK2 and a read head RH2 that reads data written to the disk DK2. The write head WH2 includes a write head WH20 and a write head WH21. The read head RH2 includes a read head RH20 and a read head RH21.

The head HD20 includes the write head WH20 that writes data to the upper surface FS2 and the read head RH20 that reads data written to the upper surface FS2. The head HD21 includes the write head WH21 that writes data to the lower surface RS2 and the read head RH21 that reads data written to the lower surface RS2.

An actuator block BK includes an actuator block BK2. The actuator block BK2 is rotatably attached to a bearing BR0 erected on a bottom wall HSB.

An arm AM includes an arm AM2. The arm AM2 includes an arm AM20 located on the upper surface FS2 side of the disk DK2 and an arm AM21 located on the lower surface RS2 side of the disk DK2. The arm AM2 may include only one arm or three or more arms depending on the number of heads HD2. The arm AM2 is connected to the actuator block BK2.

A VCM 14 includes a VCM 142. The VCM 142 is connected to the actuator block BK2 on a side opposite to the arm AM2.

A suspension 15 includes a suspension 152. The suspension 152 is attached to the arm AM2. The suspension 152 has a distal end portion on which the head HD2 is mounted, the distal end portion being opposite to one end portion connected to the arm AM2. The suspension 152 includes a suspension 1520 attached to the arm AM20 and a suspension 1521 attached to the arm AM21. The suspension 152 may include only one suspension or three or more suspensions depending on the number of arms AM2. The suspension 1520 has a distal end portion on which the head HD20 is mounted, the distal end portion being opposite to one end portion connected to the arm AM20. The suspension 1521 has a distal end portion on which the head HD21 is mounted, the distal end portion being opposite to one end portion connected to the arm AM21.

An MA 16 includes an MA 162. The MA 162 is attached to the suspension 152. The MA 162 finely controls operation of the head HD2 in the radial direction. For example, the MA 162 controls the operation of the head HD2 in the radial direction more finely than the VCM 142 does. The MA 162 includes, for example, an MA 1620 attached to the suspension 1520 and an MA 1621 attached to the suspension 1521. The MA 162 may include only one MA or three or more MAs depending on the number of suspensions 152.

The MA 1620 finely controls operation of the head HD20 in the radial direction. For example, the MA 1620 controls the operation of the head HD20 in the radial direction more finely than the VCM 142 does. The MA 1621 finely controls operation of the head HD21 in the radial direction. For example, the MA 1621 controls the operation of the head HD21 in the radial direction more finely than the VCM 142 does. For example, both the MAs 1620 and 1621 are driven independently of the VCM 142.

An actuator AC includes an actuator AC2. The actuator AC2 is rotatably attached to a bearing BR1. The actuator AC2 includes the suspension 152, the MA 162, the arm AM2, the actuator block BK2, and the VCM 142. The actuator AC2 drives the VCM 142 and finely drives the MA 162 around a rotation axis of the bearing BR1, thereby positioning the head HD2 mounted on the suspension 152 at a particular position of the disk DK2. In a case where the MA 162 is not provided, the actuator AC2 drives the VCM 142 around the bearing BR1, thereby positioning the head HD2 mounted on the suspension 152 at a particular position of the disk DK2.

A driver IC 20 includes a driver IC 20C and a driver IC 20D. The driver ICs 20C and 20D are formed in separate configurations, for example, in separate circuits. Note that the driver ICs 20C and 20D may be formed in an integrated configuration, for example, in an integrated circuit. An SPM controller 210 includes an SPM controller 210C. A VCM controller 220 includes a VCM controller 220C. An MA controller 230 includes MA controllers 230C and 230D.

The driver IC 20C controls driving of an SPM 13, the VCM 142, and the MA 1620 under the control of a system controller 130C (specifically, an MPU 50C or HDC 60C described later). The driver IC 20C is electrically connected to the SPM 13, the driver IC 20D, the VCM 142, and the MA 1620. The driver IC 20C is connected to the SPM 13, the driver IC 20D, the VCM 142, and the MA 1620 via, for example, a particular interface.

The driver IC 20C includes the SPM controller 210C, the VCM controller 220C, and the microactuator (MA) controller 230C. The SPM controller 210C controls rotation of the SPM 13. The VCM controller 220C controls driving of the VCM 142 by controlling a current (or voltage) to be supplied to the VCM 142. The MA controller 230C controls driving of the MA 1620 by controlling a current (or voltage) to be supplied to the MA 1620. A part of the configuration of the driver IC 20C (e.g., the SPM controller 210C, the VCM controller 220C, and the MA controller 230C) may be provided in the system controller 130C. In a case where the MA 1620 is not provided in the actuator AC2, the MA controller 230C may not be provided.

The driver IC 20D controls driving of the SPM 13, the VCM 142, and the MA 1621 under the control of a system controller 130D (specifically, an MPU 50D or HDC 60D described later). The driver IC 20D is electrically connected to the SPM 13, the driver IC 20C, the VCM 142, and the MA 1621. The driver IC 20D is connected to the SPM 13, the driver IC 20C, the VCM 142, and the MA 1621 via, for example, a particular interface.

The driver IC 20D includes the MA controller 230D. The SPM controller 210D controls rotation of the SPM 13. The VCM controller 220D controls driving of the VCM 142 by controlling a current (or voltage) to be supplied to the VCM 142. The MA controller 230D controls driving of the MA 1621 by controlling a current (or voltage) to be supplied to the MA 1621. A part of the configuration of the driver IC 20D (e.g., the MA controller 230D) may be provided in the system controller 130D. In a case where the MA 1621 is not provided in the actuator AC2, the MA controller 230D may not be provided.

A head amplifier IC 30 includes a head amplifier IC 30C and a head amplifier IC 30D. The head amplifier ICs 30C and 30D are formed in separate configurations, for example, in separate circuits. Note that the head amplifier ICs 30C and 30D may be formed in an integrated configuration, for example, in an integrated circuit. A read head selection unit 310 includes read head selection units 310C and 310D. A read signal detector 320 includes read signal detectors 320C and 320D.

The head amplifier IC 30C amplifies a read signal read from the upper surface FS2 of the disk DK2 and outputs the amplified read signal to the system controller 130C (specifically, a read/write (R/W) channel 40C described later). The head amplifier IC 30C is electrically connected to the head HD20. The head amplifier IC 30C outputs, to the head HD20, a write current corresponding to a signal output from the R/W channel 40C.

The head amplifier IC 30C includes the read head selection unit 310C and the read signal detector 320C. The read head selection unit 310C selects the read head RH20 for reading data from the upper surface FS2 of the disk DK2 in the actuator AC2. The read signal detector 320C detects a signal (read signal) read by the read head RH20 from the upper surface FS2 of the disk DK2. A part of the configuration of the head amplifier IC 30C (e.g., the read head selection unit 310C and the read signal detector 320C) may be provided in the system controller 130C.

The head amplifier IC 30D amplifies a read signal read from the lower surface RS2 of the disk DK2 and outputs the amplified read signal to the system controller 130D (specifically, a read/write (R/W) channel 40D described later). The head amplifier IC 30D is electrically connected to the head HD21. The head amplifier IC 30D outputs, to the head HD21, a write current corresponding to a signal output from the R/W channel 40D.

The head amplifier IC 30D includes the read head selection unit 310D and the read signal detector 320D. The read head selection unit 310D selects the read head RH21 for reading data from the lower surface RS2 of the disk DK2 in the actuator AC2. The read signal detector 320D selects the read head RH21 for reading data from the lower surface RS2 of the disk DK2. The read signal detector 320D detects a signal (read signal) read by the read head RH21 from the lower surface RS2 of the disk DK2. A part of the configuration of the head amplifier IC 30D (e.g., the read head selection unit 310D and the read signal detector 320D) may be provided in the system controller 130D.

The system controller 130 includes the system controllers 130C and 130D. The system controllers 130C and 130D are formed in separate configurations, for example, in separate circuits. Note that the system controllers 130C and 130D may be formed in an integrated configuration, for example, in an integrated circuit.

The R/W channel 40 includes the R/W channels 40C and 40D. A shock sensor write protect determination unit 411 includes shock sensor write protect determination units 411C and 411D. A first HDC write protect determination unit 412 includes first HDC write protect determination units 412C and 412D. A second HDC write protect determination unit 413 includes second HDC write protect determination units 413C and 413D.

An MPU 50 includes the MPUs 50C and 50D. An HDC 60 includes the HDCs 60C and 60D. A servo controller 610 includes servo controllers 610C and 610D. A tracking controller 611 includes tracking controllers 611C and 611D. A DPES demodulation unit 6111 includes DPES demodulation units 6111C and 6111D. A seek controller 612 includes seek controllers 612C and 612D. A write operation determination unit 620 includes write operation determination units 620C and 620D. A position write operation determination unit 621 includes position write operation determination units 621C and 621D. A speed write operation determination unit 622 includes speed write operation determination units 622C and 622D.

The system controller 130C includes the R/W channel 40C, the MPU 50C, and the HDC 60C. The system controller 130C is electrically connected to the driver IC 20C, the head amplifier IC 30C, a volatile memory 70, a buffer memory 80, a nonvolatile memory 90, a write protect detector 180, a controller communication unit 190, and a host system 700. The system controller 130C is electrically connected to the system controller 130D via transmission paths WR0 and WR1. The system controller 130C may include the SPM controller 210C, the VCM controller 220C, and the MA controller 230C. The system controller 130C may include the driver IC 20C and the head amplifier IC 30C.

The R/W channel 40C executes signal processing of read data transferred from the upper surface FS2 of the disk DK2 to the host 700 and write data transferred from the host 700 in response to an instruction from the MPU 50C. The R/W channel 40C is electrically connected to, for example, the head amplifier IC 30C, the MPU 50C, the HDC 60C, and the write protect detector 180. The R/W channel 40C is electrically connected to the write operation determination unit 620D (HDC 60D) via the transmission path WR1. Note that the R/W channel 40C may not be connected to the write operation determination unit 620D (HDC 60D) via the transmission path WR1. The R/W channel 40C includes a write protect unit 410C.

The write protect unit 410C prohibits (or stops) write (or write operation) using the head HD20 and the head HD21 via the HDC 60C and the HDC 60D. The write protect unit 410C is connected to the write operation determination unit 620D (HDC 60D) via the transmission path WR1. Note that the write protect unit 410C may not be connected to the write operation determination unit 620D (HDC 60D) via the transmission path WR1. The write protect unit 410C includes the shock sensor write protect determination unit 411C, the first HDC write protect determination unit 412C, and the second HDC write protect determination unit 413C.

In a case where the shock sensor 170 detects a vibration or shock, the shock sensor write protect determination unit 411C determines whether to prohibit (or stop) write (or write operation) using the head HD20.

For example, when receiving a write protect determination execution signal, the shock sensor write protect determination unit 411C determines whether or not the vibration or shock is larger than a particular value via the head HD20 based on the write protect determination execution signal. For example, when determining that the vibration or shock is larger than the particular value, the shock sensor write protect determination unit 411C determines prohibition (or stop) of the write (or write operation) of the head HD20. For example, when determining that the vibration or shock is larger than the particular value, the shock sensor write protect determination unit 411C outputs a write protect determination signal for determining prohibition (or stop) of the write (or write operation) of the head HD20. For example, when determining that the vibration or shock is equal to or smaller than the particular value, the shock sensor write protect determination unit 411C does not determine prohibition (or stop) of the write (or write operation) of the head HD20.

The first HDC write protect determination unit 412C prohibits (or stops) write (or write operation) of the head HD20 corresponding to the HDC 60C. For example, when receiving a write protect signal for prohibiting (or stopping) write (or write operation) of the head HD20 from the HDC 60C, the first HDC write protect determination unit 412C negates (deasserts) a write gate to prohibit (or stop) the write (or write operation) of the head HD20. In other words, when receiving, from the HDC 60C, vibration detection information including a write protect signal for prohibiting (or stopping) write (or write operation) of the head HD20 and indicating that the head HD20 has been vibrated, the first HDC write protect determination unit 412C negates (deasserts) the write gate to prohibit (or stop) the write (or write operation) of the head HD20.

For example, when receiving a write protect signal of write (or write operation) of the head HD21 corresponding to the HDC 60D, the first HDC write protect determination unit 412C negates (deasserts) the write gate to prohibit (or stop) write (or write operation) of the head HD20. In other words, when receiving vibration detection information including a write protect signal of write (or write operation) of the head HD21 corresponding to the HDC 60D and indicating that the head HD21 has been vibrated, the first HDC write protect determination unit 412C negates (deasserts) the write gate to prohibit (or stop) write (or write operation) of the head HD20.

The second HDC write protect determination unit 413C prohibits (or stops) write (or write operation) of the head HD21 corresponding to the HDC 60D. For example, when receiving a write protect signal of write (or write operation) of the head HD21 from the HDC 60C, the second HDC write protect determination unit 413C outputs the write protect signal to the second HDC write protect determination unit 413D of the R/W channel 40D via the HDC 60C and the transmission path WR0, negates (deasserts) a write gate via the second HDC write protect determination unit 413D, and prohibits (or stops) the write (or write operation) of the head HD21. In other words, when receiving, from the HDC 60C, vibration detection information including a write protect signal of write (or write operation) of the head HD21 and indicating that the head HD21 has been vibrated, the second HDC write protect determination unit 413C outputs the vibration detection information to the second HDC write protect determination unit 413D of the R/W channel 40D via the HDC 60C and the transmission path WR0, negates (deasserts) the write gate via the second HDC write protect determination unit 413D, and prohibits (or stops) the write (or write operation) of the head HD21.

For example, when receiving a write protect signal of write (or write operation) of the head HD21 from the HDC 60C, the second HDC write protect determination unit 413C outputs a signal for prohibiting the write (or write operation) of the head HD21 to the HDC 60C, outputs the write protect signal to the second HDC write protect determination unit 413D of the R/W channel 40D via the HDC 60C and the transmission path WR0, negates (deasserts) the write gate via the second HDC write protect determination unit 413D, and prohibits (or stops) the write (or write operation) of the head HD21. In other words, when receiving, from the HDC 60C, vibration detection information including a write protect signal of write (or write operation) of the head HD21 and indicating that the head HD21 has been vibrated, the second HDC write protect determination unit 413C outputs a signal for prohibiting the write (or write operation) of the head HD21 to the HDC 60C, outputs the vibration detection information to the second HDC write protect determination unit 413D of the R/W channel 40D via the HDC 60C and the transmission path WR0, negates (deasserts) the write gate via the second HDC write protect determination unit 413D, and prohibits (or stops) the write (or write operation) of the head HD21.

For example, when receiving a write protect signal of write (or write operation) of the head HD21 from the HDC 60C, the second HDC write protect determination unit 413C outputs the write protect signal to the second HDC write protect determination unit 413D of the R/W channel 40D via the transmission path WR1 and the HDC 60D, negates (deasserts) the write gate via the second HDC write protect determination unit 413D, and prohibits (or stops) the write (or write operation) of the head HD21. In other words, when receiving, from the HDC 60C, vibration detection information including a write protect signal of write (or write operation) of the head HD21 and indicating that the head HD21 has been vibrated, the second HDC write protect determination unit 413C outputs the vibration detection information to the second HDC write protect determination unit 413D of the R/W channel 40D via the transmission path WR1 and the HDC 60D, negates (deasserts) the write gate via the second HDC write protect determination unit 413D, and prohibits (or stops) the write (or write operation) of the head HD21.

For example, when receiving a write protect signal of write (or write operation) of the head HD21 from the HDC 60C, the second HDC write protect determination unit 413C outputs a signal for prohibiting the write (or write operation) of the head HD21 to the HDC 60D, outputs the write protect signal to the second HDC write protect determination unit 413D of the R/W channel 40D via the transmission path WR1 and the HDC 60D, negates (deasserts) the write gate via the second HDC write protect determination unit 413D, and prohibits (or stops) the write (or write operation) of the head HD21. In other words, when receiving, from the HDC 60C, vibration detection information including a write protect signal of write (or write operation) of the head HD21 and indicating that the head HD21 has been vibrated, the second HDC write protect determination unit 413C outputs a signal for prohibiting the write (or write operation) of the head HD21 to the HDC 60D, outputs the vibration detection information to the second HDC write protect determination unit 413D of the R/W channel 40D via the transmission path WR1 and the HDC 60D, negates (deasserts) the write gate via the second HDC write protect determination unit 413D, and prohibits (or stops) the write (or write operation) of the head HD21.

The MPU 50C controls the actuator AC2 and the MA 1620 via the driver IC 20C and executes servo control for positioning the head HD20. The MPU 50C controls a data write operation to the upper surface FS2 of the disk DK2 and selects a storage destination of write data. The MPU 50C also controls a data read operation from the upper surface FS2 of the disk DK2 and controls processing of read data. The MPU 50C is connected to each unit of the magnetic disk device 1. The MPU 50C is electrically connected to, for example, the driver IC 20C, the R/W channel 40C, and the HDC 60C.

The HDC 60C controls read/write processing and controls data transfer between the host 700 and the R/W channel 40C in response to an instruction from the MPU 50C. The HDC 60C is electrically connected to, for example, the R/W channel 40C, the MPU 50C, the volatile memory 70, the buffer memory 80, and the nonvolatile memory 90. The HDC 60C is electrically connected to the R/W channel 40D via the transmission path WR0. Note that the HDC 60 may not be connected to the R/W channel 40D via the transmission path WR0.

The HDC 60C includes the servo controller 610C and the write operation determination unit 620C. The HDC 60C executes processing of those units, for example, the servo controller 610C and the write operation determination unit 620C on firmware. The HDC 60C may include those units as a circuit. A part of the configuration of the HDC 60C may be provided in the MPU 50C. For example, the servo controller 610C and the write operation determination unit 620C may be provided in the MPU 50C. The HDC 60C prohibits (or stops) a write operation of the head HD20. For example, when receiving a write protect signal, the HDC 60C prohibits (or stops) the write operation of the head HD20.

The servo controller 610C controls a position of the head HD20. In other words, the servo controller 610C controls access by the head HD20 to a particular region on the upper surface FS2 of the disk DK2. The servo controller 610C includes the tracking controller 611C and the seek controller 612C.

The tracking controller 611C controls tracking of the head HD20 to a particular track on the upper surface FS2 of the disk DK2. The tracking controller 611C includes the DPES demodulation unit 6111C. The tracking controller 611C may include an SPES demodulation unit.

The DPES demodulation unit 6111C reads the data sector DS on the upper surface FS2 of the disk DK2 and demodulates a DPES.

The seek controller 612C controls seek of the head HD20 from a particular track to a targeted track on the upper surface FS2 of the disk DK2.

The write operation determination unit 620C is connected to the R/W channel 40D via the transmission path WR0. Note that the write operation determination unit 620C may not be connected to the R/W channel 40D via the transmission path WR0. The write operation determination unit 620C includes the position write operation determination unit 621C and the speed write operation determination unit 622C. The position write operation determination unit 621C determines a write operation of the head HD20 based on the position of the head HD20. The speed write operation determination unit 622C determines the write operation of the head HD20 based on a speed of the head HD20.

The write operation determination unit 620C determines whether to prohibit (or stop) write (or write operation) of the head HD20 corresponding to the HDC 60C.

When receiving a write protect determination signal (or write protect determination information) of write (or write operation) of the head HD20 corresponding to the HDC 60C, the write operation determination unit 620C determines whether to prohibit (or stop) the write (or write operation) of the head HD20 based on an SPES read and demodulated from the servo sector SS of the disk DK2 or a DPES read and demodulated from the data sector DS thereof by the head HD20.

When receiving a write protect determination signal (or write protect determination information) of write (or write operation) of the head HD20 corresponding to the HDC 60C, the write operation determination unit 620C determines whether or not the SPES or DPES corresponding to the head HD20 exceeds the threshold.

When determining that the SPES or DPES corresponding to the head HD20 exceeds the threshold, the write operation determination unit 620C determines prohibition (or stop) of the write (or write operation) of the head HD20 and outputs a write protect signal to the R/W channel 40C corresponding to the HDC 60C.

When receiving a signal for prohibiting write (or write operation) of the head HD21 corresponding to the HDC 60D from the second HDC write protect determination unit 413C, the write operation determination unit 620C may output a write protect signal to the R/W channel 40D. When receiving a signal for prohibiting write (or write operation) of the head HD21 corresponding to the HDC 60D from the second HDC write protect determination unit 413C, the write operation determination unit 620C may output a write protect signal to the R/W channel 40D via the transmission path WR0.

Note that, when receiving a signal for prohibiting write (or write operation) of the head HD21 corresponding to the HDC 60D from the second HDC write protect determination unit 413C, the write operation determination unit 620C may not output a write protect signal to the R/W channel 40D depending on a state of the system controller 130D, the head HD21, or the like.

For example, when determining that the SPES or DPES corresponding to the head HD20 exceeds the threshold, the write operation determination unit 620C may output a write protect signal to the R/W channel 40D.

For example, when determining that the SPES or DPES corresponding to the head HD20 is equal to or smaller than the threshold, the write operation determination unit 620C does not prohibit (or stop) the write (or write operation) using the head HD20 via the HDC 60C. In other words, when determining that the SPES or DPES corresponding to the head HD20 is equal to or smaller than the threshold, the write operation determination unit 620C continues (or carries on with) the write (or write operation) using the head HD20.

The system controller 130D includes the R/W channel 40D, the MPU 50D, and the HDC 60D. The system controller 130D is electrically connected to the driver IC 20D, the head amplifier IC 30D, the write protect detector 180, the controller communication unit 190, and the host system 700. The system controller 130D is electrically connected to the system controller 130C via the transmission paths WR0 and WR1. The system controller 130D may include the SPM controller 210D, the VCM controller 220D, and the MA controller 230D. The system controller 130D may include the driver IC 20D and the head amplifier IC 30D.

The R/W channel 40D executes signal processing of read data transferred from the lower surface RS2 of the disk DK2 to the host 700 and write data transferred from the host 700 in response to an instruction from the MPU 50D. The R/W channel 40D is electrically connected to, for example, the head amplifier IC 30D, the MPU 50D, the HDC 60D, and the write protect detector 180. The R/W channel 40D is electrically connected to the write operation determination unit 620C (HDC 60C) via the transmission path WR0. Note that the R/W channel 40D may not be connected to the write operation determination unit 620C (HDC 60C) via the transmission path WR0. The R/W channel 40D includes a write protect unit 410D.

The write protect unit 410D prohibits (or stops) write (or write operation) using the head HD20 and the head HD21 via the HDC 60C and the HDC 60D. The write protect unit 410D is connected to the write operation determination unit 620C (HDC 60C) via the transmission path WR0. Note that the write protect unit 410D may not be connected to the write operation determination unit 620C (HDC 60C) via the transmission path WR0. The write protect unit 410D includes the shock sensor write protect determination unit 411D, the first HDC write protect determination unit 412D, and the second HDC write protect determination unit 413D.

In a case where the shock sensor 170 detects a vibration or shock, the shock sensor write protect determination unit 411D determines whether to prohibit (or stop) write (or write operation) of the head HD21.

For example, when receiving a write protect determination execution signal, the shock sensor write protect determination unit 411D determines whether or not the vibration or shock is larger than a particular value via the head HD21 based on the write protect determination execution signal. For example, when determining that the vibration or shock is larger than the particular value, the shock sensor write protect determination unit 411D determines prohibition (or stop) of the write (or write operation) of the head HD21. For example, when determining that the vibration or shock is larger than the particular value, the shock sensor write protect determination unit 411D outputs a write protect determination signal for determining prohibition (or stop) of the write (or write operation) of the head HD21. For example, when determining that the vibration or shock is equal to or smaller than the particular value, the shock sensor write protect determination unit 411D does not determine prohibition (or stop) of the write (or write operation) of the head HD21.

The first HDC write protect determination unit 412D prohibits (or stops) the write (or write operation) of the head HD20 corresponding to the HDC 60C. For example, when receiving a write protect signal for prohibiting (or stopping) write (or write operation) of the head HD20 from the HDC 60D, the first HDC write protect determination unit 412D outputs the write protect signal to the first HDC write protect determination unit 412C of the R/W channel 40C via the HDC 60D and the transmission path WR1, negates (deasserts) a write gate via the first HDC write protect determination unit 412C, and prohibits (or stops) the write (or write operation) of the head HD20. In other words, when receiving, from the HDC 60D, vibration detection information including a write protect signal for prohibiting (or stopping) write (or write operation) of the head HD20 and indicating that the head HD20 has been vibrated, the first HDC write protect determination unit 412D outputs the vibration detection information to the first HDC write protect determination unit 412C of the R/W channel 40C via the HDC 60D and the transmission path WR1, negates (deasserts) the write gate via the first HDC write protect determination unit 412C, and prohibits (or stops) the write (or write operation) of the head HD20.

For example, when receiving a write protect signal of write (or write operation) of the head HD20 from the HDC 60D, the first HDC write protect determination unit 412D outputs a signal for prohibiting the write (or write operation) of the head HD20 to the HDC 60D, outputs the write protect signal to the first HDC write protect determination unit 412C of the R/W channel 40C via the HDC 60D and the transmission path WR1, negates (deasserts) the write gate via the first HDC write protect determination unit 412C, and prohibits (or stops) the write (or write operation) of the head HD20. In other words, when receiving, from the HDC 60D, vibration detection information including a write protect signal of write (or write operation) of the head HD20 and indicating that the head HD20 has been vibrated, the first HDC write protect determination unit 412D outputs a signal for prohibiting the write (or write operation) of the head HD20 to the HDC 60D, outputs the vibration detection information to the first HDC write protect determination unit 412C of the R/W channel 40C via the HDC 60D and the transmission path WR1, negates (deasserts) the write gate via the first HDC write protect determination unit 412C, and prohibits (or stops) the write (or write operation) of the head HD20.

For example, when receiving a write protect signal of write (or write operation) of the head HD20 from the HDC 60D, the first HDC write protect determination unit 412D outputs the write protect signal to the first HDC write protect determination unit 412C of the R/W channel 40C via the transmission path WR0 and the HDC 60C, negates (deasserts) the write gate via the first HDC write protect determination unit 412C, and prohibits (or stops) the write (or write operation) of the head HD20. In other words, when receiving, from the HDC 60D, vibration detection information including a write protect signal for prohibiting (or stopping) write (or write operation) of the head HD20 and indicating that the head HD20 has been vibrated, the first HDC write protect determination unit 412D outputs the vibration detection information to the first HDC write protect determination unit 412C of the R/W channel 40C via the transmission path WR0 and the HDC 60C, negates (deasserts) the write gate via the first HDC write protect determination unit 412C, and prohibits (or stops) the write (or write operation) of the head HD20.

For example, when receiving a write protect signal of write (or write operation) of the head HD20 from the HDC 60D, the first HDC write protect determination unit 412D outputs a signal for prohibiting the write (or write operation) of the head HD20 to the HDC 60C, outputs the write protect signal to the first HDC write protect determination unit 412C of the R/W channel 40C via the transmission path WR0 and the HDC 60C, negates (deasserts) the write gate via the first HDC write protect determination unit 412C, and prohibits (or stops) the write (or write operation) of the head HD20. In other words, when receiving, from the HDC 60D, vibration detection information including a write protect signal of write (or write operation) of the head HD20 and indicating that the head HD20 has been vibrated, the first HDC write protect determination unit 412D outputs a signal for prohibiting the write (or write operation) of the head HD20 to the HDC 60C, outputs the vibration detection information to the first HDC write protect determination unit 412C of the R/W channel 40C via the transmission path WR0 and the HDC 60C, negates (deasserts) the write gate via the first HDC write protect determination unit 412C, and prohibits (or stops) the write (or write operation) of the head HD20.

The second HDC write protect determination unit 413D prohibits (or stops) write (or write operation) of the head HD21 corresponding to the HDC 60D. For example, when receiving a write protect signal of write (or write operation) of the head HD21 from the HDC 60D, the second HDC write protect determination unit 413D negates (deasserts) a write gate to prohibit (or stop) the write (or write operation) of the head HD21. In other words, when receiving vibration detection information including a write protect signal of write (or write operation) of the head HD21 from the HDC 60D and indicating that the head HD21 has been vibrated, the second HDC write protect determination unit 413D negates (deasserts) the write gate to prohibit (or stop) the write (or write operation) of the head HD21.

For example, when receiving a write protect signal of write (or write operation) of the head HD20 corresponding to the HDC 60C, the second HDC write protect determination unit 413D negates (deasserts) the write gate to prohibit (or stop) write (or write operation) of the head HD21. In other words, when receiving vibration detection information including a write protect signal of write (or write operation) of the head HD20 corresponding to the HDC 60C and indicating that the head HD20 has been vibrated, the second HDC write protect determination unit 413D negates (deasserts) the write gate to prohibit (or stop) write (or write operation) of the head HD21.

The MPU 50D controls the actuator AC2 and the MA 1621 via the driver IC 20D and executes servo control for positioning the head HD21. The MPU 50D controls a data write operation to the lower surface RS2 of the disk DK2 and selects a storage destination of write data. The MPU 50D also controls a data read operation from the lower surface RS2 of the disk DK2 and controls processing of read data. The MPU 50D is connected to each unit of the magnetic disk device 1. The MPU 50D is electrically connected to, for example, the driver IC 20D, the R/W channel 40D, and the HDC 60D.

The HDC 60D controls read/write processing and controls data transfer between the host 700 and the R/W channel 40D in response to an instruction from the MPU 50D. The HDC 60D is electrically connected to, for example, the R/W channel 40D and the MPU 50D. The HDC 60D is electrically connected to the R/W channel 40C via the transmission path WR1. Note that the HDC 60D may not be connected to the R/W channel 40C via the transmission path WR1.

The HDC 60D includes the servo controller 610D and the write operation determination unit 620D. The HDC 60D executes processing of those units, for example, the servo controller 610D and the write operation determination unit 620D on firmware. The HDC 60D may include those units as a circuit. A part of the configuration of the HDC 60D may be provided in the MPU 50D. For example, the servo controller 610D and the write operation determination unit 620D may be provided in the MPU 50D. The HDC 60D prohibits (or stops) a write operation of the head HD21. For example, when receiving a write protect signal, the HDC 60D prohibits (or stops) the write operation of the head HD21.

The servo controller 610D controls a position of the head HD21. In other words, the servo controller 610D controls access by the head HD21 to a particular region on the lower surface RS2 of the disk DK2. The servo controller 610D includes the tracking controller 611D and the seek controller 612D.

The tracking controller 611D controls tracking of the head HD21 to a particular track on the lower surface RS2 of the disk DK2. The tracking controller 611D includes the DPES demodulation unit 6111D. The tracking controller 611D may include an SPES demodulation unit.

The DPES demodulation unit 6111D reads the data sector DS on the lower surface RS2 of the disk DK2 and demodulates a DPES.

The seek controller 612D controls seek of the head HD21 from a particular track to a targeted track on the lower surface RS2 of the disk DK2.

The write operation determination unit 620D is connected to the R/W channel 40C via the transmission path WR1. Note that the write operation determination unit 620D may not be connected to the R/W channel 40C via the transmission path WR1. The write operation determination unit 620D includes the position write operation determination unit 621D and the speed write operation determination unit 622D. The position write operation determination unit 621D determines a write operation of the head HD21 based on the position of the head HD21. The speed write operation determination unit 622D determines the write operation of the head HD21 based on a speed of the head HD21.

The write operation determination unit 620D determines whether to prohibit (or stop) write (or write operation) of the head HD21 corresponding to the HDC 60D.

When receiving a write protect determination signal (or write protect determination information) of write (or write operation) of the head HD21 corresponding to the HDC 60D, the write operation determination unit 620D determines whether to prohibit (or stop) the write (or write operation) of the head HD21 based on an SPES read and demodulated from the servo sector SS of the disk DK2 or a DPES read and demodulated from the data sector DS thereof by the head HD21.

When receiving a write protect determination signal (or write protect determination information) of write (or write operation) of the head HD21 corresponding to the HDC 60D, the write operation determination unit 620D determines whether or not the SPES or DPES corresponding to the head HD21 exceeds the threshold.

When determining that the SPES or DPES corresponding to the head HD21 exceeds the threshold, the write operation determination unit 620D determines prohibition (or stop) of the write (or write operation) of the head HD21 and outputs a write protect signal to the R/W channel 40D corresponding to the HDC 60D.

When receiving a signal for prohibiting write (or write operation) of the head HD20 corresponding to the HDC 60C from the first HDC write protect determination unit 412D, the write operation determination unit 620D may output a write protect signal to the R/W channel 40C. When receiving a signal for prohibiting write (or write operation) of the head HD20 corresponding to the HDC 60C from the first HDC write protect determination unit 412D, the write operation determination unit 620D may output a write protect signal to the R/W channel 40C via the transmission path WR1.

When receiving a signal for prohibiting write (or write operation) of the head HD20 corresponding to the HDC 60C from the first HDC write protect determination unit 412D, the write operation determination unit 620D may not output a write protect signal to the R/W channel 40C depending on a state of the system controller 130C, the head HD20, or the like.

For example, when determining that the SPES or DPES corresponding to the head HD21 exceeds the threshold, the write operation determination unit 620D may output a write protect signal to the R/W channel 40C.

For example, when determining that the SPES or DPES corresponding to the head HD21 is equal to or smaller than the threshold, the write operation determination unit 620D does not prohibit (or stop) the write (or write operation) using the head HD21 via the HDC 60D. In other words, when determining that the SPES or DPES corresponding to the head HD21 is equal to or smaller than the threshold, the write operation determination unit 620D continues (or carries on with) the write (or write operation) using the head HD21.

Figure 17:
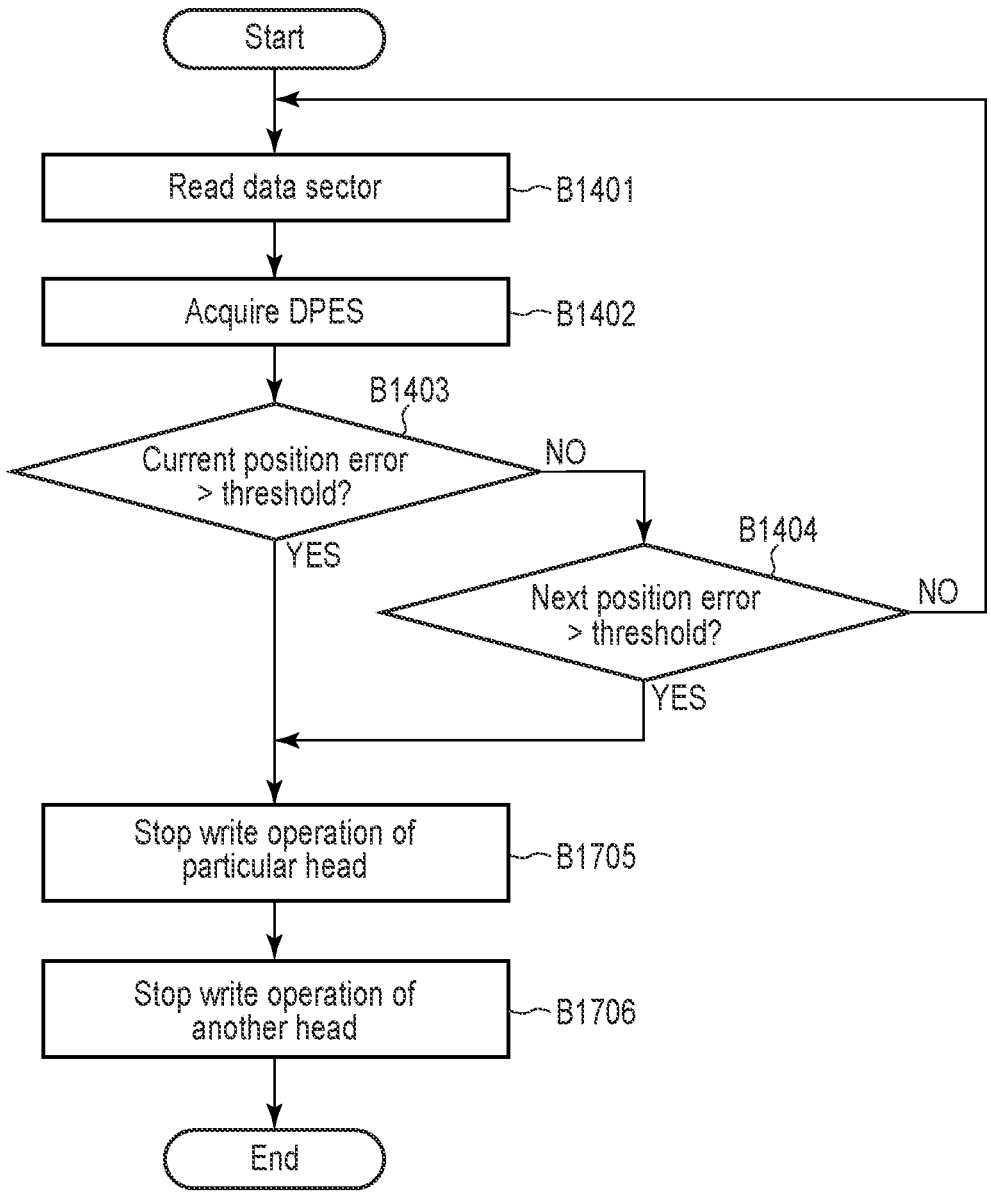
FIG. 17 is a flowchart showing an exemplary method of stopping a write operation according to the second embodiment.

FIG. 17 is a flowchart showing an exemplary method of stopping a write operation according to the second embodiment.

The system controller 130 reads a data sector by using a particular head HD (B1401), demodulates a DPES based on particular information (or particular data) of the data sector, and thus acquires the DPES (B1402). The system controller 130 determines whether or not a current position error corresponding to the particular head HD is larger than a threshold for stopping the head HD (B1403).

When determining that the current position error corresponding to the particular head HD is equal to or smaller than the threshold (NO in B1403), the system controller 130 determines whether or not the next position error of the particular head HD is larger than the threshold for stopping the head HD (B1404). When determining that the next position error is equal to or smaller than the threshold (NO in B1404), the system controller 130 proceeds to the processing in B1401. When determining that the next position error is larger than the threshold (YES in B1404), the system controller 130 proceeds to the processing in B1705.

When determining that the current position error corresponding to the particular head HD is larger than the threshold (YES in B1403), the system controller 130 stops (prohibits) a write operation of the particular head HD (B1705), also stops (prohibits) a write operation of another head HD different from the particular head HD (B1706), and ends the processing.

According to the second embodiment, when stopping (or prohibiting) a write operation of a particular head HD, the magnetic disk device 1 can also stop (or prohibit) a write operation of another head HD different from the particular head HD. Therefore, the magnetic disk device 1 can improve the format efficiency.

Second Modification Example

A configuration of the magnetic disk device 1 according to the second modification example of the second embodiment is different from the configuration of the magnetic disk device 1 according to the second embodiment.

Figure 18:
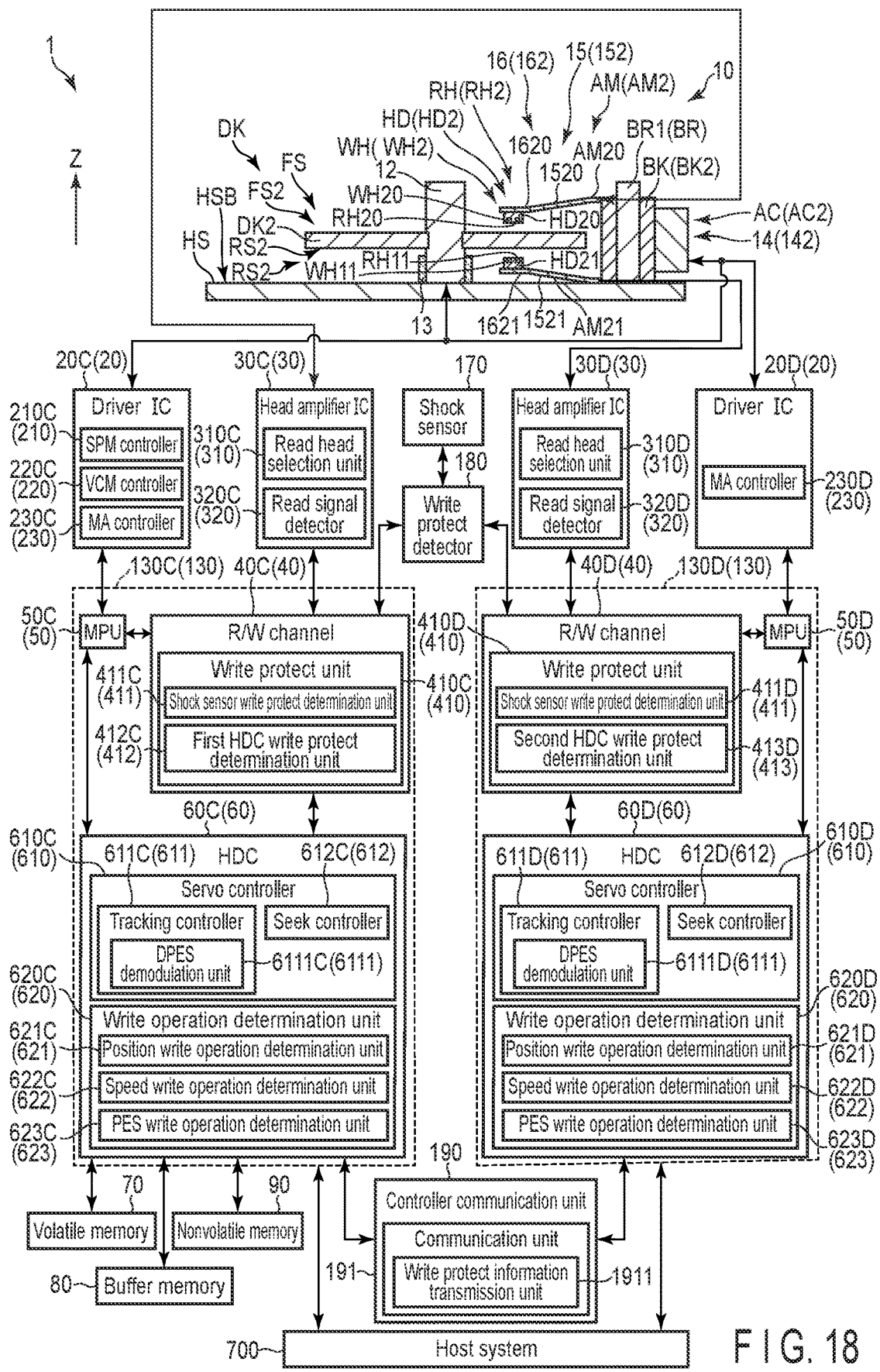
FIG. 18 is a schematic diagram illustrating an exemplary configuration of a magnetic disk device according to a second modification example.

FIG. 18 is a schematic diagram illustrating an exemplary configuration of the magnetic disk device 1 according to the second modification example.

In the example illustrated in FIG. 18, the write protect unit 410C includes the shock sensor write protect determination unit 411C and the first HDC write protect determination unit 412C.

The write operation determination unit 620C further includes a PES write operation determination unit 623C. The PES write operation determination unit 623C determines whether to prohibit (or stop) write (or write operation) of the head HD21 (write head WH21) based on an SPES or DPES read and demodulated from the servo sector SV or the data sector DS on the lower surface RS2 of the disk DK2 via the HDC 60D by using the head HD21 (read head RH21) corresponding to the HDC 60D.

For example, when receiving a write protect signal for prohibiting (or stopping) write (or write operation) of the head HD20, the PES write operation determination unit 623C outputs a write protect signal for prohibiting (or stopping) write (or write operation) of the head HD21 (write head WH21) to the R/W channel 40D via the write protect information transmission unit 1911 and the HDC 60D. In other words, when receiving vibration detection information including a write protect signal for prohibiting (or stopping) write (or write operation) of the head HD20 and indicating that the head HD20 has been vibrated, the PES write operation determination unit 623C outputs the vibration detection information for prohibiting (or stopping) write (or write operation) of the head HD21 (write head WH21) to the R/W channel 40D via the write protect information transmission unit 1911 and the HDC 60D.

Note that, when receiving a write protect signal for prohibiting (or stopping) write (or write operation) of the head HD20, the PES write operation determination unit 623C may not output the write protect signal for prohibiting (or stopping) write (or write operation) of the head HD21 (write head WH21) to the R/W channel 40D depending on a state of the system controller 130D, the head HD21, or the like. In other words, when receiving vibration detection information including a write protect signal for prohibiting (or stopping) write (or write operation) of the head HD20 and indicating that the head HD20 has been vibrated, the PES write operation determination unit 623C may not output the vibration detection information for prohibiting (or stopping) write (or write operation) of the head HD21 (write head WH21) to the R/W channel 40D depending on a state of the system controller 130D, the head HD21, or the like.

The write protect unit 410D includes the shock sensor write protect determination unit 411D and the second HDC write protect determination unit 413D.

The write operation determination unit 620D further includes a PES write operation determination unit 623D. The PES write operation determination unit 623D determines whether to prohibit (or stop) write (or write operation) of the head HD20 (write head WH20) based on an SPES or DPES obtained by reading and demodulating the servo sector SV or the data sector DS on the upper surface FS2 of the disk DK2 via the HDC 60C by using the head HD20 (read head RH20) corresponding to the HDC 60C.

For example, when receiving a write protect signal for prohibiting (or stopping) write (or write operation) of the head HD21, the PES write operation determination unit 623D outputs a write protect signal for prohibiting (or stopping) write (or write operation) of the head HD20 (write head WH20) to the R/W channel 40C via the write protect information transmission unit 1911 and the HDC 60C. In other words, when receiving vibration detection information including a write protect signal for prohibiting (or stopping) write (or write operation) of the head HD21 and indicating that the head HD21 has been vibrated, the PES write operation determination unit 623D outputs vibration detection information for prohibiting (or stopping) write (or write operation) of the head HD20 (write head WH20) to the R/W channel 40C via the write protect information transmission unit 1911 and the HDC 60C.

Note that, when receiving a write protect signal for prohibiting (or stopping) write (or write operation) of the head HD21, the PES write operation determination unit 623D may not output a write protect signal for prohibiting (or stopping) write (or write operation) of the head HD20 (write head WH20) to the R/W channel 40C depending on a state of the system controller 130C, the head HD20, or the like. In other words, when receiving vibration detection information including a write protect signal for prohibiting (or stopping) write (or write operation) of the head HD21 and indicating that the head HD21 has been vibrated, the PES write operation determination unit 623D may not output vibration detection information for prohibiting (or stopping) write (or write operation) of the head HD20 (write head WH20) to the R/W channel 40C depending on a state of the system controller 130C, the head HD20, or the like.

According to the second modification example, the magnetic disk device 1 further includes the write protect information transmission unit 1911. In a case where a current position error of a particular head HD exceeds a threshold for stopping (or prohibiting) a write operation of the particular head HD, a particular system controller 130 stops (or prohibits) the write operation using the particular head HD. When stopping (or prohibiting) the write operation using the particular head HD, the particular system controller 130 can also stop (or prohibit) a write operation using another head HD corresponding to another system controller 130 different from the particular system controller 130 among the plurality of system controllers 130. For example, the particular system controller 130 outputs a write protect signal (or vibration detection information) to the another system controller 130 via the write protect information transmission unit 1911 to stop (or prohibit) the write operation using the another head HD. Therefore, the magnetic disk device 1 can improve the format efficiency.

Third Embodiment

A configuration of a magnetic disk device 1 according to a third embodiment is different from the configurations of the magnetic disk devices 1 according to the embodiments and modification examples described above.

The magnetic disk device 1 according to the third embodiment is a two-dimensional magnetic recording (TDMR) magnetic disk device including a plurality of read heads in a single head.

Figure 19:
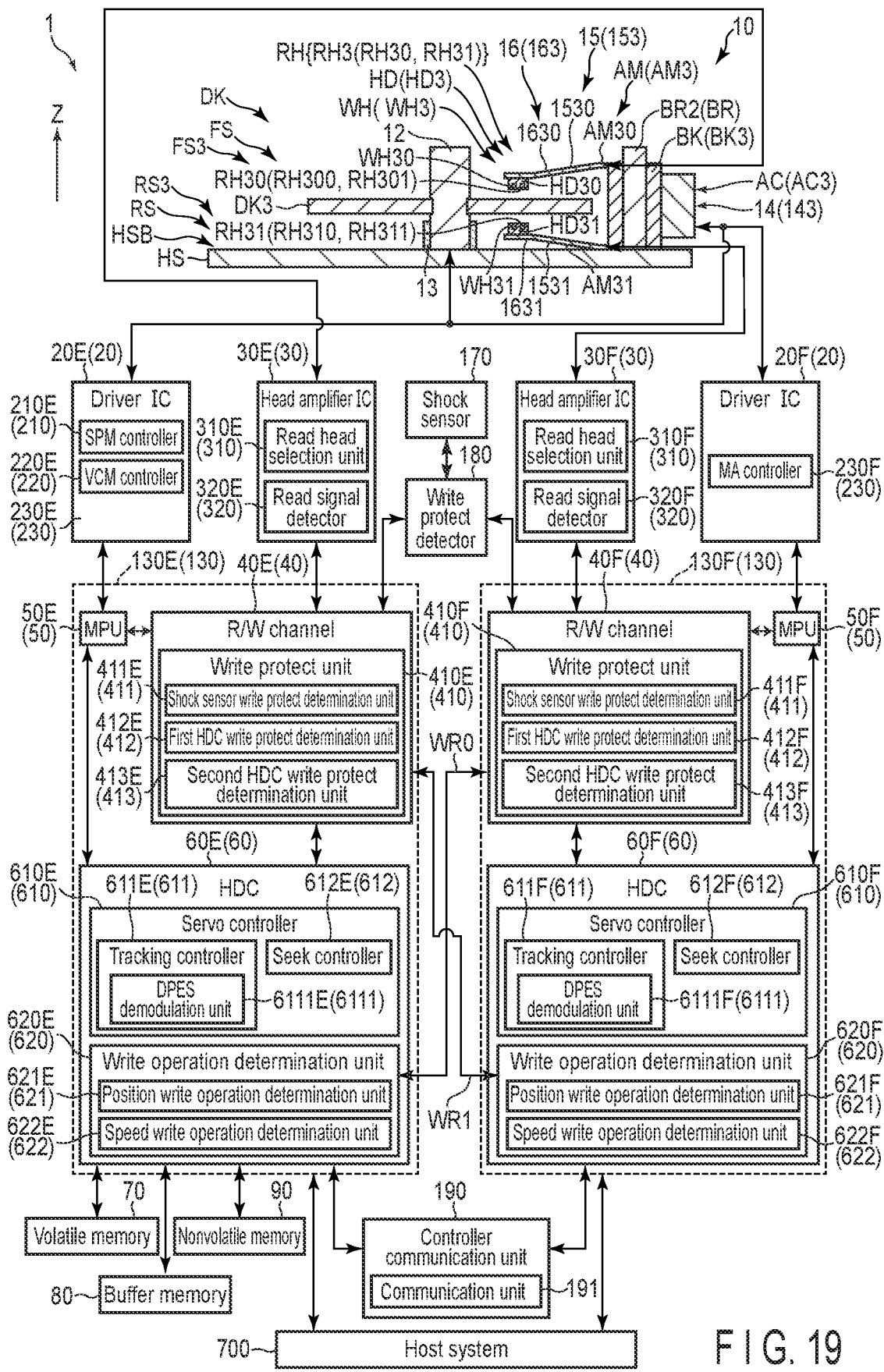
FIG. 19 is a schematic diagram illustrating an exemplary configuration of a magnetic disk device according to a third embodiment.

FIG. 19 is a schematic diagram illustrating an exemplary configuration of the magnetic disk device 1 according to the third embodiment.

In the example illustrated in FIG. 19, a disk DK includes a disk DK3. The disk DK3 is attached to a spindle 12. The disk DK3 has an upper surface FS3 and a lower surface RS3 opposite to the upper surface FS3. The disk DK3 may include two or more disks.

A head HD includes a head HD3. The head HD3 includes a head HD30 facing the upper surface FS3 of the disk DK3 and a head HD31 facing the lower surface RS3 of the disk DK3. The head HD3 may include only one head or three or more heads. The head HD3 includes a write head WH3 that writes data to the disk DK3 and a read head RH3 that reads data written to the disk DK3. The write head WH3 includes a write head WH30 and a write head WH31. The read head RH3 includes a read head RH30 and a read head RH31. The read head RH30 includes a read head RH300 and a read head RH301. The read head RH31 includes a read head RH310 and a read head RH311.

The head HD30 includes the write head WH30 that writes data to the upper surface FS3 of the disk DK3 and the plurality of read heads RH30 (RH300, RH301) that read data written to the upper surface FS3 of the disk DK3. The read head RH300 is provided at, for example, a position farthest from the write head WH30 in the head HD30. The read head RH301 is provided at, for example, a position second farthest from the write head WH30. In other words, the read head RH301 is arranged between the write head WH30 and the read head RH300. The read head RH30 may include three or more read heads.

The head HD31 includes the write head WH31 that writes data to the lower surface RS3 of the disk DK3 and the plurality of read heads RH31 (RH310, RH311) that read data written to the lower surface RS3 of the disk DK3. The read head RH310 is provided at, for example, a position farthest from the write head WH31 in the head HD31. The read head RH311 is provided at, for example, a position second farthest from the write head WH31. In other words, the read head RH311 is arranged between the write head WH31 and the read head RH310. The read head RH31 may include three or more read heads.

An actuator block BK includes an actuator block BK3.

An arm AM includes an arm AM3. The arm AM3 may include an arm AM30 located on the upper surface FS3 side of the disk DK3 and an arm AM31 located on the lower surface RS3 side of the disk DK3. The arm AM3 may include only one arm or three or more arms depending on the number of heads HD3. The arm AM3 is connected to the actuator block BK3.

A VCM 14 includes a VCM 143. The VCM 143 is connected to the actuator block BK3 on a side opposite to the arm AM3.

A suspension 15 includes a suspension 153. The suspension 153 is attached to the arm AM3. The suspension 153 has a distal end portion on which the head HD3 is mounted, the distal end portion being opposite to one end portion connected to the arm AM3. The suspension 153 includes a suspension 1530 attached to the arm AM30 and a suspension 1531 attached to the arm AM31. The suspension 153 may include only one suspension or three or more suspensions depending on the number of arms AM3. The suspension 1530 has a distal end portion on which the head HD30 is mounted, the distal end portion being opposite to one end portion connected to the arm AM30. The suspension 1531 has a distal end portion on which the head HD31 is mounted, the distal end portion being opposite to one end portion connected to the arm AM31.

An MA 16 includes an MA 163. The MA 163 is attached to the suspension 153. The MA 163 controls operation of the head HD3 in the radial direction more finely than the VCM 143 does. The MA 163 includes, for example, an MA 1630 attached to the suspension 1530 and an MA 1631 attached to the suspension 1531. The MA 163 may include only one MA or three or more MAs depending on the number of suspensions 153.

The MA 1630 finely controls operation of the head HD30 in the radial direction. For example, the MA 1630 controls the operation of the head HD30 in the radial direction more finely than the VCM 143 does. The MA 1631 finely controls operation of the head HD31 in the radial direction. For example, the MA 1631 controls the operation of the head HD31 in the radial direction more finely than the VCM 143 does. For example, both the MAs 1630 and 1631 are driven independently of the VCM 143.

An actuator AC includes an actuator AC3. The actuator AC3 is rotatably attached to a bearing BR2. The actuator AC3 includes the suspension 153, the MA 163, the arm AM3, the actuator block BK3, and the VCM 143. The actuator AC3 drives the VCM 143 and finely drives the MA 163 around a rotation axis of the bearing BR2, thereby positioning the head HD3 mounted on the suspension 153 at a particular position of the disk DK3. In a case where the MA 163 is not provided, the actuator AC3 drives the VCM 143 around the bearing BR2, thereby positioning the head HD3 mounted on the suspension 153 at a particular position of the disk DK3.

Figure 20:
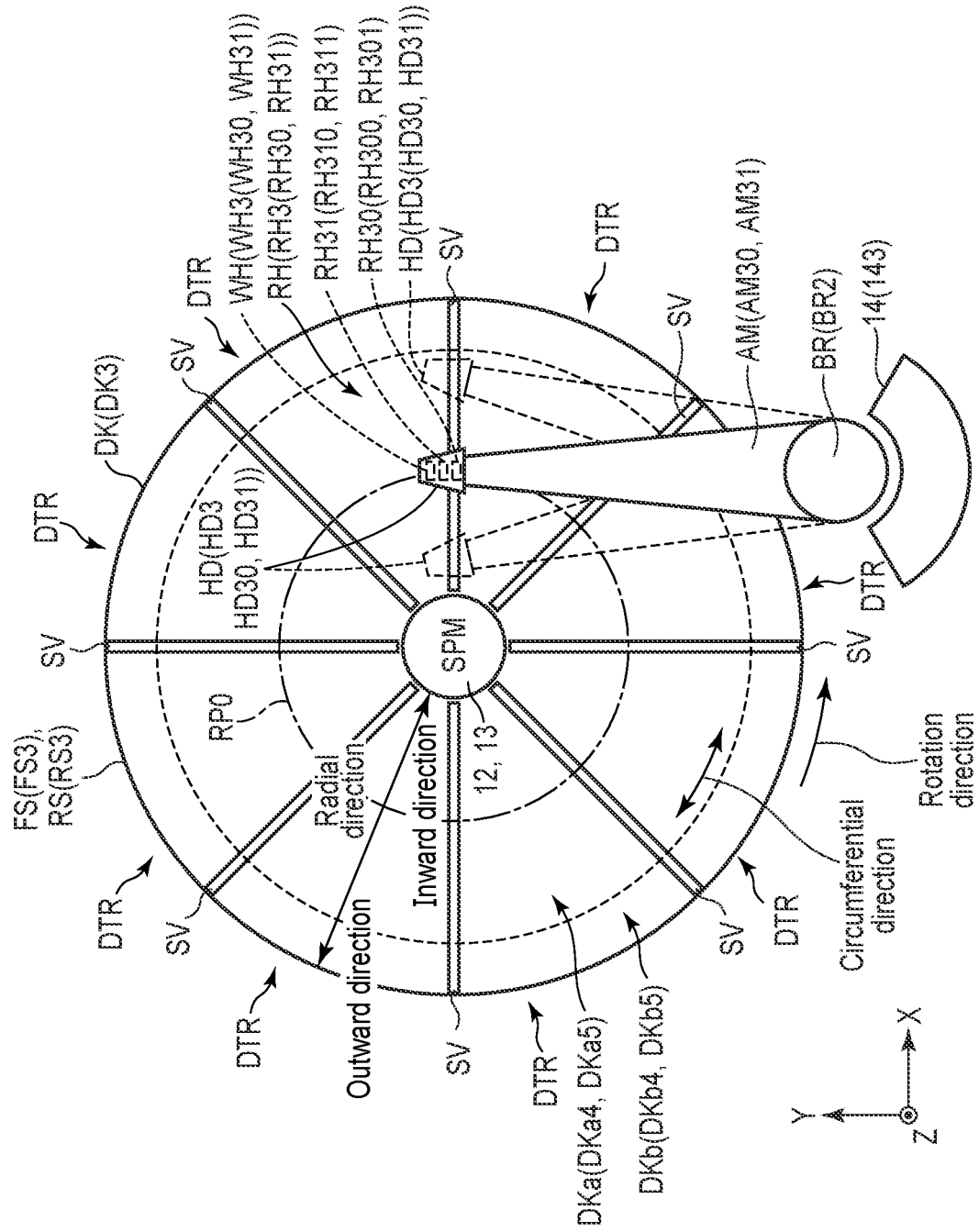
FIG. 20 is a plan view illustrating an exemplary arrangement of a head with respect to a disk according to the third embodiment.

FIG. 20 is a plan view illustrating an exemplary arrangement of the head HD with respect to the disk DK according to the third embodiment.

The magnetic disk device 1 positions the head HD at a particular position or a particular track of the disk DK with reference to the read head RH30, the read head RH31, or a central portion between the read heads RH30 and RH31.

In the example illustrated in FIG. 20, a user data region DKa4 and a system area DKb4 are allocated on the upper surface FS3 of the disk DK3. A user data region DKa5 and a system area DKb5 are allocated on the lower surface RS3 of the disk DK3. The disk DK3 has a radial position RP0.

In the example illustrated in FIG. 20, for example, at the time of seeking, the head HD3 slides on a horizontal plane of the disk DK3 as the actuator AC3 rotates around the bearing BR2. In a case where the head HD3 is located at the radial position RP0, a skew angle of the head HD3 is, for example, 0°. Hereinafter, the radial position RP0 will also be referred to as "reference position RP0". In a case where the head HD3 is located in the outward direction or inward direction with respect to the radial position RP0, an absolute value of the skew angle is larger than 0°.

FIG. 21 illustrates an exemplary geometric arrangement of the write head WH3 and the two read heads RH30 and RH31 in which the read head RH30 is located at a radial position RP0.

FIG. 21 illustrates a central portion WC (WC0, WC1) of the write head WH3 (WH30, WH31), a central portion RC0 (RC00, RC01) of the read head RH30 (RH300, RH301), and a central portion RC1 (RC10, RC11) of the read head RH31 (RH310, RH311). FIG. 21 illustrates an intermediate portion HR (HR0, HR1) between the central portion RC0 (RC00, RC01) of the read head RH30 (RH300, RH301) and the central portion RC1 (RC10, RC11) of the read head RH31 (RH310, RH311). A circumferential distance between the central portion RC0 of the read head RH30 and the central portion RC1 of the read head RH31 will also be referred to as "down track separation (DTS)". A radial distance between the central portion RC0 of the read head RH30 and the central portion RC1 of the read head RH31 will also be referred to as "cross track separation (CTS)". The central portion WC of the write head WH3 is separated by a distance OF0 in a direction perpendicular to a straight line passing through the central portion RC0 of the read head RH30 and the central portion RC1 of the read head RH31.

In the example illustrated in FIG. 21, in a case where the read head RH30 is positioned at the reference position RP0, the read heads RH30 and RH31 and the intermediate portion HR are linearly arranged in the circumferential direction. In a case where the read head RH30 is positioned at the reference position RP0, the write head WH3 is separated from the read heads RH30 and RH31 and the intermediate portion HR by the distance OF0 in the radial direction. Note that, in a case were the read head RH30 is positioned at the reference position RP0, the write head WH3, the read heads RH30 and RH31, and the intermediate portion HR may be linearly arranged in the circumferential direction.

The head HD3 moves in the radial direction while being inclined at a particular skew angle by driving the actuator AC3 or MA 16 in a state in which the geometric arrangement of the write head WH3 and the two read heads RH30 and RH31 illustrated in FIG. 21 is maintained.

Figure 22:
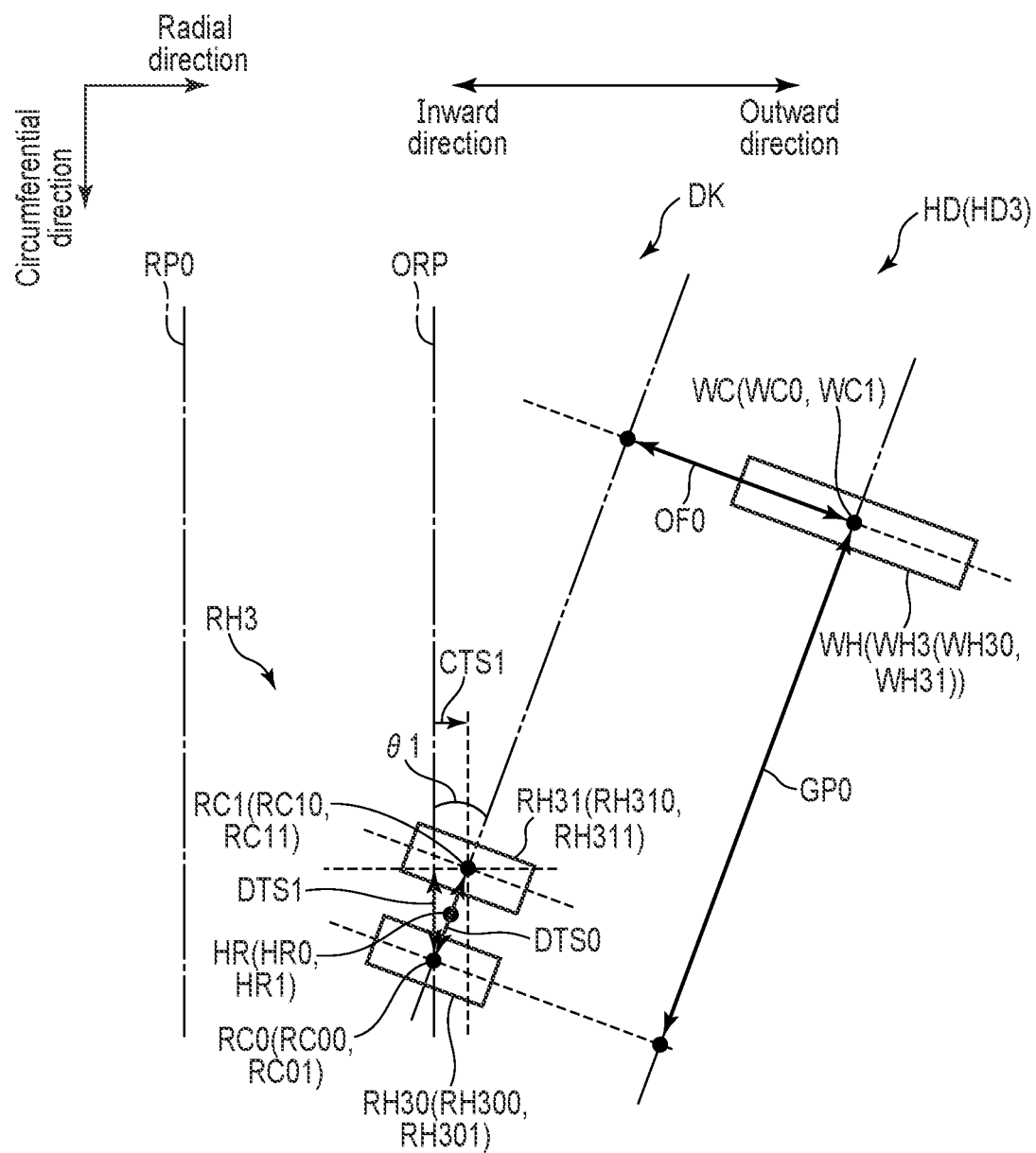
FIG. 22 illustrates an exemplary geometric arrangement of a write head and two read heads in which one read head is located at a radial position.

FIG. 22 illustrates an exemplary geometric arrangement of the write head WH3 and the two read heads RH30 and RH31 in which the read head RH30 is located at a radial position ORP. FIG. 22 illustrates the radial position ORP in the outward direction from the reference position RP0.

In the example illustrated in FIG. 22, in a case where the read head RH30 is located at the radial position ORP, the read heads RH30 and RH31 are separated by a cross track separation CTS1. In a case where the read head RH30 is located at the radial position ORP, the read heads RH30 and RH31 are separated by a down track separation DTS1. In a case where the read head RH30 is located at the radial position ORP, the head HD3 is inclined in the outward direction at a skew angle θ1.

A driver IC 20 includes a driver IC 20E and a driver IC 20F. The driver ICs 20E and 20F are formed in separate configurations, for example, in separate circuits. Note that the driver ICs 20E and 20F may be formed in an integrated configuration, for example, in an integrated circuit. An SPM controller 210 includes an SPM controller 210E. A VCM controller 220 includes a VCM controller 220E. An MA controller 230 includes MA controllers 230E and 230F.

The driver IC 20E controls driving of an SPM 13, the VCM 143, and the MA 1630 under the control of a system controller 130E (specifically, an MPU 50E or HDC 60E described later). The driver IC 20E is electrically connected to the SPM 13, the driver IC 20F, the VCM 143, and the MA 1630. The driver IC 20E is connected to the SPM 13, the driver IC 20E, the VCM 143, and the MA 1630 via, for example, a particular interface.

The driver IC 20E includes the SPM controller 210E, the VCM controller 220E, and the microactuator (MA) controller 230E. The SPM controller 210E controls rotation of the SPM 13. The VCM controller 220E controls driving of the VCM 143 by controlling a current (or voltage) to be supplied to the VCM 143. The MA controller 230E controls driving of the MA 1630 by controlling a current (or voltage) to be supplied to the MA 1630. A part of the configuration of the driver IC 20E (e.g., the SPM controller 210E, the VCM controller 220E, and the MA controller 230E) may be provided in the system controller 130E. In a case where the MA 1630 is not provided in the actuator AC3, the MA controller 230E may not be provided.

The driver IC 20F controls driving of an SPM 13, the VCM 143, and the MA 1631 under the control of a system controller 130F (specifically, an MPU 50F or HDC 60F described later). The driver IC 20F is electrically connected to the SPM 13, the driver IC 20E, the VCM 143, and the MA 1631. The driver IC 20F is connected to the SPM 13, the driver IC 20E, the VCM 143, and the MA 1631 via, for example, a particular interface.

The driver IC 20F includes the MA controller 230F. The SPM controller 210F controls rotation of the SPM 13. The VCM controller 220F controls driving of the VCM 143 by controlling a current (or voltage) to be supplied to the VCM 143. The MA controller 230F controls driving of the MA 1631 by controlling a current (or voltage) to be supplied to the MA 1631. A part of the configuration of the driver IC 20F (e.g., the MA controller 230F) may be provided in the system controller 130F. In a case where the MA 1631 is not provided in the actuator AC3, the MA controller 230F may not be provided.

The head amplifier IC 30 includes a head amplifier IC 30E and a head amplifier IC 30F. The head amplifier ICs 30E and 30F are formed in separate configurations, for example, in separate circuits. Note that the head amplifier ICs 30E and 30F may be formed in an integrated configuration, for example, in an integrated circuit. The read head selection unit 310 includes read head selection units 310E and 310F. The read signal detector 320 includes read signal detectors 320E and 320F.

The head amplifier IC 30E amplifies a read signal read from the upper surface FS3 of the disk DK3 and outputs the amplified read signal to the system controller 130E (specifically, a read/write (R/W) channel 40E described later). The head amplifier IC 30E is electrically connected to the head HD30. The head amplifier IC 30E outputs, to the head HD30, a write current corresponding to a signal output from the R/W channel 40E.

The head amplifier IC 30E includes the read head selection unit 310E and the read signal detector 320E. The read head selection unit 310E selects the read head RH30 for reading data from the upper surface FS3 of the disk DK3 in the actuator AC3. The read signal detector 320E detects a signal (read signal) read by the read head RH30 from the upper surface FS3 of the disk DK3. A part of the configuration of the head amplifier IC 30E (e.g., the read head selection unit 310E and the read signal detector 320E) may be provided in the system controller 130E.

The head amplifier IC 30F amplifies a read signal read from the lower surface RS3 of the disk DK3 and outputs the amplified read signal to the system controller 130F (specifically, a read/write (R/W) channel 40F described later). The head amplifier IC 30F is electrically connected to the head HD31. The head amplifier IC 30F outputs, to the head HD31, a write current corresponding to a signal output from the R/W channel 40F.

The head amplifier IC 30F includes the read head selection unit 310F and the read signal detector 320F. The read head selection unit 310F selects the read head RH31 for reading data from the lower surface RS3 of the disk DK3 in the actuator AC3. The read signal detector 320F selects the read head RH31 for reading data from the lower surface RS3 of the disk DK3. The read signal detector 320F detects a signal (read signal) read by the read head RH31 from the lower surface RS3 of the disk DK3. A part of the configuration of the head amplifier IC 30F (e.g., the read head selection unit 310F and the read signal detector 320F) may be provided in the system controller 130F.

The system controller 130 includes the system controllers 130E and 130F. The system controllers 130E and 130F are formed in separate configurations, for example, in separate circuits. Note that the system controllers 130E and 130F may be formed in an integrated configuration, for example, in an integrated circuit.

The R/W channel 40 includes the R/W channels 40E and 40F. A shock sensor write protect determination unit 411 includes shock sensor write protect determination units 411E and 411F. A first HDC write protect determination unit 412 includes first HDC write protect determination units 412E and 412F. A second HDC write protect determination unit 413 includes second HDC write protect determination units 413E and 413F.

An MPU 50 includes the MPUs 50E and 50F. An HDC 60 includes the HDCs 60E and 60F. A servo controller 610 includes servo controllers 610E and 610F. The tracking controller 611 includes tracking controllers 611E and 611F. A DPES demodulation unit 6111 includes DPES demodulation units 6111E and 6111F. A seek controller 612 includes seek controllers 612E and 612F. A write operation determination unit 620 includes write operation determination units 620E and 620F. A position write operation determination unit 621 includes position write operation determination units 621E and 621F. A speed write operation determination unit 622 includes speed write operation determination units 622E and 622F.

The system controller 130E includes the R/W channel 40E, the MPU 50E, and the HDC 60E. The system controller 130E is electrically connected to the driver IC 20E, the head amplifier IC 30E, a volatile memory 70, a buffer memory 80, a nonvolatile memory 90, a write protect detector 180, a controller communication unit 190, and a host system 700. The system controller 130E is electrically connected to the system controller 130E via transmission paths WR0 and WR1. The system controller 130E may include the SPM controller 210E, the VCM controller 220E, and the MA controller 230E. The system controller 130E may include the driver IC 20E and the head amplifier IC 30E.

The R/W channel 40E executes signal processing of read data transferred from the upper surface FS3 of the disk DK3 to the host 700 and write data transferred from the host 700 in response to an instruction from the MPU 50E. The R/W channel 40E is electrically connected to, for example, the head amplifier IC 30E, the MPU 50E, the HDC 60E, and the write protect detector 180. The R/W channel 40E is electrically connected to the write operation determination unit 620F (HDC 60F) via the transmission path WR1. Note that the R/W channel 40E may not be connected to the write operation determination unit 620F (HDC 60F) via the transmission path WR1. The R/W channel 40E includes a write protect unit 410E.

The write protect unit 410E prohibits (or stops) write (or write operation) using the head HD30 and the head HD31 via the HDC 60E and the HDC 60F. The write protect unit 410E is connected to the write operation determination unit 620F (HDC 60F) via the transmission path WR1. Note that the write protect unit 410E may not be connected to the write operation determination unit 620F (HDC 60F) via the transmission path WR1. The write protect unit 410E includes the shock sensor write protect determination unit 411E, the first HDC write protect determination unit 412E, and the second HDC write protect determination unit 413E.

In a case where the shock sensor 170 detects a vibration or shock, the shock sensor write protect determination unit 411E determines whether to prohibit (or stop) write (or write operation) using the head HD30.

For example, when receiving a write protect determination execution signal, the shock sensor write protect determination unit 411E determines whether or not the vibration or shock is larger than a particular value via the head HD30 based on the write protect determination execution signal. For example, when determining that the vibration or shock is larger than the particular value, the shock sensor write protect determination unit 411E determines prohibition (or stop) of the write (or write operation) of the head HD30. For example, when determining that the vibration or shock is larger than the particular value, the shock sensor write protect determination unit 411E outputs a write protect determination signal for determining prohibition (or stop) of the write (or write operation) of the head HD30. For example, when determining that the vibration or shock is equal to or smaller than the particular value, the shock sensor write protect determination unit 411E does not determine prohibition (or stop) of the write (or write operation) of the head HD30.

The first HDC write protect determination unit 412E prohibits (or stops) write (or write operation) of the head HD30 corresponding to the HDC 60E. For example, when receiving a write protect signal for prohibiting (or stopping) write (or write operation) of the head HD30 from the HDC 60E, the first HDC write protect determination unit 412E negates (deasserts) a write gate to prohibit (or stop) the write (or write operation) of the head HD30. In other words, when receiving, from the HDC 60E, vibration detection information including a write protect signal for prohibiting (or stopping) write (or write operation) of the head HD30 and indicating that the head HD30 has been vibrated, the first HDC write protect determination unit 412E negates (deasserts) the write gate to prohibit (or stop) the write (or write operation) of the head HD30.

For example, when receiving a write protect signal for prohibiting (or stopping) write (or write operation) of the head HD31 corresponding to the HDC 60E, the first HDC write protect determination unit 412E negates (deasserts) the write gate to prohibit (or stop) write (or write operation) of the head HD30. In other words, when receiving vibration detection information including a write protect signal for prohibiting (or stopping) write (or write operation) of the head HD31 corresponding to the HDC 60E and indicating that the head HD31 has been vibrated, the first HDC write protect determination unit 412E negates (deasserts) the write gate to prohibit (or stop) write (or write operation) of the head HD30.

The second HDC write protect determination unit 413E prohibits (or stops) write (or write operation) of the head HD31 corresponding to the HDC 60F. For example, when receiving a write protect signal of write (or write operation) of the head HD31 from the HDC 60E, the second HDC write protect determination unit 413E outputs the write protect signal to the second HDC write protect determination unit 413F of the R/W channel 40F via the HDC 60E and the transmission path WR0, negates (deasserts) a write gate via the second HDC write protect determination unit 413F, and prohibits (or stops) the write (or write operation) of the head HD31. In other words, when receiving, from the HDC 60E, vibration detection information including a write protect signal of write (or write operation) of the head HD31 and indicating that the head HD31 has been vibrated, the second HDC write protect determination unit 413E outputs the vibration detection information to the second HDC write protect determination unit 413F of the R/W channel 40F via the HDC 60E and the transmission path WR0, negates (deasserts) the write gate via the second HDC write protect determination unit 413F, and prohibits (or stops) the write (or write operation) of the head HD31.

For example, when receiving a write protect signal of write (or write operation) of the head HD31 from the HDC 60E, the second HDC write protect determination unit 413E outputs a signal for prohibiting the write (or write operation) of the head HD31 to the HDC 60E, outputs the write protect signal to the second HDC write protect determination unit 413F of the R/W channel 40F via the HDC 60E and the transmission path WR0, negates (deasserts) the write gate via the second HDC write protect determination unit 413F, and prohibits (or stops) the write (or write operation) of the head HD31. In other words, when receiving, from the HDC 60E, vibration detection information including a write protect signal of write (or write operation) of the head HD31 and indicating that the head HD31 has been vibrated, the second HDC write protect determination unit 413E outputs a signal for prohibiting the write (or write operation) of the head HD31 to the HDC 60E, outputs the vibration detection information to the second HDC write protect determination unit 413F of the R/W channel 40F via the HDC 60E and the transmission path WR0, negates (deasserts) the write gate via the second HDC write protect determination unit 413F, and prohibits (or stops) the write (or write operation) of the head HD31.

For example, when receiving a write protect signal of write (or write operation) of the head HD31 from the HDC 60E, the second HDC write protect determination unit 413E outputs the write protect signal to the second HDC write protect determination unit 413F of the R/W channel 40F via the transmission path WR1 and the HDC 60F, negates (deasserts) the write gate via the second HDC write protect determination unit 413F, and prohibits (or stops) the write (or write operation) of the head HD31. In other words, when receiving, from the HDC 60E, vibration detection information including a write protect signal of write (or write operation) of the head HD31 and indicating that the head HD31 has been vibrated, the second HDC write protect determination unit 413E outputs the vibration detection information to the second HDC write protect determination unit 413F of the R/W channel 40F via the transmission path WR1 and the HDC 60F, negates (deasserts) the write gate via the second HDC write protect determination unit 413F, and prohibits (or stops) the write (or write operation) of the head HD31.

For example, when receiving a write protect signal of write (or write operation) of the head HD31 from the HDC 60E, the second HDC write protect determination unit 413E outputs a signal for prohibiting the write (or write operation) of the head HD31 to the HDC 60F, outputs the write protect signal to the second HDC write protect determination unit 413F of the R/W channel 40F via the transmission path WR1 and the HDC 60F, negates (deasserts) the write gate via the second HDC write protect determination unit 413F, and prohibits (or stops) the write (or write operation) of the head HD31. In other words, when receiving, from the HDC 60E, vibration detection information including a write protect signal of write (or write operation) of the head HD31 and indicating that the head HD31 has been vibrated, the second HDC write protect determination unit 413E outputs a signal for prohibiting the write (or write operation) of the head HD31 to the HDC 60F, outputs the vibration detection information to the second HDC write protect determination unit 413F of the R/W channel 40F via the transmission path WR1 and the HDC 60F, negates (deasserts) the write gate via the second HDC write protect determination unit 413F, and prohibits (or stops) the write (or write operation) of the head HD31.

The MPU 50E controls the actuator AC3 and the MA 1630 via the driver IC 20E and executes servo control for positioning the head HD30. The MPU 50E controls a data write operation to the upper surface FS3 of the disk DK3 and selects a storage destination of write data. The MPU 50E also controls a data read operation from the upper surface FS3 of the disk DK3 and controls processing of read data. The MPU 50E is connected to each unit of the magnetic disk device 1. The MPU 50E is electrically connected to, for example, the driver IC 20E, the R/W channel 40E, and the HDC 60E.

The HDC 60E controls read/write processing and controls data transfer between the host 700 and the R/W channel 40E in response to an instruction from the MPU 50E. The HDC 60E is electrically connected to, for example, the R/W channel 40E, the MPU 50E, the volatile memory 70, the buffer memory 80, and the nonvolatile memory 90. The HDC 60E is electrically connected to the R/W channel 40F via the transmission path WR0. Note that the HDC 60E may not be connected to the R/W channel 40F via the transmission path WR0.

The HDC 60E includes the servo controller 610E and the write operation determination unit 620E. The HDC 60E executes processing of those units, for example, the servo controller 610E and the write operation determination unit 620E on firmware. The HDC 60E may include those units as a circuit. A part of the configuration of the HDC 60E may be provided in the MPU 50E. For example, the servo controller 610E and the write operation determination unit 620E may be provided in the MPU 50E. The HDC 60E prohibits (or stops) a write operation of the head HD30. For example, when receiving a write protect signal, the HDC 60E prohibits (or stops) the write operation of the head HD30.

The servo controller 610E controls a position of the head HD30. In other words, the servo controller 610E controls access by the head HD30 to a particular region on the upper surface FS3 of the disk DK3. The servo controller 610E includes the tracking controller 611E and the seek controller 612E.

The tracking controller 611E controls tracking of the head HD30 to a particular track on the upper surface FS3 of the disk DK3. The tracking controller 611E includes the DPES demodulation unit 6111E. The tracking controller 611E may include an SPES demodulation unit.

The DPES demodulation unit 6111E reads the data sector DS on the upper surface FS3 of the disk DK3 and demodulates a DPES.

The seek controller 612E controls seek of the head HD30 from a particular track to a targeted track on the upper surface FS3 of the disk DK3.

The write operation determination unit 620E is connected to the R/W channel 40F via the transmission path WR0. Note that the write operation determination unit 620E may not be connected to the R/W channel 40F via the transmission path WR0. The write operation determination unit 620E includes the position write operation determination unit 621E and the speed write operation determination unit 622E. The position write operation determination unit 621E determines a write operation of the head HD30 based on the position of the head HD30. The speed write operation determination unit 622E determines the write operation of the head HD30 based on a speed of the head HD30.

The write operation determination unit 620E determines whether to prohibit (or stop) write (or write operation) of the head HD30 corresponding to the HDC 60E.

When receiving a write protect determination signal (or write protect determination information) of write (or write operation) of the head HD30 corresponding to the HDC 60E, the write operation determination unit 620E determines whether to prohibit (or stop) the write (or write operation) of the head HD30 based on an SPES read and demodulated from the servo sector SS of the disk DK3 or a DPES read and demodulated from the data sector DS thereof by the head HD30.

When receiving a write protect determination signal (or write protect determination information) of write (or write operation) of the head HD30 corresponding to the HDC 60E, the write operation determination unit 620E determines whether or not the SPES or DPES corresponding to the head HD30 exceeds the threshold.

When determining that the SPES or DPES corresponding to the head HD30 exceeds the threshold, the write operation determination unit 620E determines prohibition (or stop) of the write (or write operation) of the head HD30 and outputs a write protect signal to the R/W channel 40E corresponding to the HDC 60E.

When receiving a signal for prohibiting write (or write operation) of the head HD31 corresponding to the HDC 60F from the second HDC write protect determination unit 413E, the write operation determination unit 620E may output a write protect signal to the R/W channel 40F. When receiving a signal for prohibiting write (or write operation) of the head HD31 corresponding to the HDC 60F from the second HDC write protect determination unit 413E, the write operation determination unit 620E may output a write protect signal to the R/W channel 40F via the transmission path WR0.

Note that, when receiving a signal for prohibiting write (or write operation) of the head HD31 corresponding to the HDC 60F from the second HDC write protect determination unit 413E, the write operation determination unit 620E may not output a write protect signal to the R/W channel 40F depending on a state of the system controller 130F, the head HD31, or the like.

For example, when determining that the SPES or DPES corresponding to the head HD30 exceeds the threshold, the write operation determination unit 620E may output a write protect signal to the R/W channel 40F.

For example, when determining that the SPES or DPES corresponding to the head HD30 is equal to or smaller than the threshold, the write operation determination unit 620E does not prohibit (or stop) the write (or write operation) using the head HD30 via the HDC 60E. In other words, when determining that the SPES or DPES corresponding to the head HD30 is equal to or smaller than the threshold, the write operation determination unit 620E continues (or carries on with) the write (or write operation) using the head HD30.

The system controller 130F includes the R/W channel 40F, the MPU 50F, and the HDC 60F. The system controller 130F is electrically connected to the driver IC 20F, the head amplifier IC 30F, the write protect detector 180, the controller communication unit 190, and the host system 700. The system controller 130F is electrically connected to the system controller 130E via the transmission paths WR0 and WR1. The system controller 130F may include the SPM controller 210F, the VCM controller 220F, and the MA controller 230F. The system controller 130F may include the driver IC 20F and the head amplifier IC 30F.

The R/W channel 40F executes signal processing of read data transferred from the lower surface RS3 of the disk DK3 to the host 700 and write data transferred from the host 700 in response to an instruction from the MPU 50F. The R/W channel 40F is electrically connected to, for example, the head amplifier IC 30F, the MPU 50F, the HDC 60F, and the write protect detector 180. The R/W channel 40F is electrically connected to the write operation determination unit 620E (HDC 60E) via the transmission path WR0. Note that the R/W channel 40F may not be connected to the write operation determination unit 620E (HDC 60E) via the transmission path WR0. The R/W channel 40F includes a write protect unit 410F.

The write protect unit 410F prohibits (or stops) write (or write operation) using the head HD30 and the head HD31 via the HDC 60E and the HDC 60F. The write protect unit 410F is connected to the write operation determination unit 620E (HDC 60E) via the transmission path WR0. Note that the write protect unit 410F may not be connected to the write operation determination unit 620E (HDC 60E) via the transmission path WR0. The write protect unit 410F includes the shock sensor write protect determination unit 411F, the first HDC write protect determination unit 412F, and the second HDC write protect determination unit 413F.

In a case where the shock sensor 170 detects a vibration or shock, the shock sensor write protect determination unit 411F determines whether to prohibit (or stop) write (or write operation) of the head HD31.

For example, when receiving a write protect determination execution signal, the shock sensor write protect determination unit 411F determines whether or not the vibration or shock is larger than a particular value via the head HD31 based on the write protect determination execution signal. For example, when determining that the vibration or shock is larger than the particular value, the shock sensor write protect determination unit 411F determines prohibition (or stop) of the write (or write operation) of the head HD31. For example, when determining that the vibration or shock is larger than the particular value, the shock sensor write protect determination unit 411F outputs a write protect determination signal for determining prohibition (or stop) of the write (or write operation) of the head HD31. For example, when determining that the vibration or shock is equal to or smaller than the particular value, the shock sensor write protect determination unit 411F does not determine prohibition (or stop) of the write (or write operation) of the head HD31.

The first HDC write protect determination unit 412F prohibits (or stops) write (or write operation) of the head HD30 corresponding to the HDC 60E. For example, when receiving a write protect signal for prohibiting (or stopping) write (or write operation) of the head HD30 from the HDC 60F, the first HDC write protect determination unit 412F outputs the write protect signal to the first HDC write protect determination unit 412E of the R/W channel 40E via the HDC 60F and the transmission path WR1, negates (deasserts) a write gate via the first HDC write protect determination unit 412E, and prohibits (or stops) the write (or write operation) of the head HD30. In other words, when receiving, from the HDC 60F, vibration detection information including a write protect signal for prohibiting (or stopping) write (or write operation) of the head HD30 and indicating that the head HD30 has been vibrated, the first HDC write protect determination unit 412F outputs the vibration detection information to the first HDC write protect determination unit 412E of the R/W channel 40E via the HDC 60F and the transmission path WR1, negates (deasserts) the write gate via the first HDC write protect determination unit 412E, and prohibits (or stops) the write (or write operation) of the head HD30.

For example, when receiving a write protect signal of write (or write operation) of the head HD30 from the HDC 60F, the first HDC write protect determination unit 412F outputs a signal for prohibiting the write (or write operation) of the head HD30 to the HDC 60F, outputs the write protect signal to the first HDC write protect determination unit 412E of the R/W channel 40E via the HDC 60F and the transmission path WR1, negates (deasserts) the write gate via the first HDC write protect determination unit 412E, and prohibits (or stops) the write (or write operation) of the head HD30. In other words, when receiving, from the HDC 60F, vibration detection information including a write protect signal of write (or write operation) of the head HD30 and indicating that the head HD30 has been vibrated, the first HDC write protect determination unit 412F outputs a signal for prohibiting the write (or write operation) of the head HD30 to the HDC 60F, outputs the vibration detection information to the first HDC write protect determination unit 412E of the R/W channel 40E via the HDC 60F and the transmission path WR1, negates (deasserts) the write gate via the first HDC write protect determination unit 412E, and prohibits (or stops) the write (or write operation) of the head HD30.

For example, when receiving a write protect signal of write (or write operation) of the head HD30 from the HDC 60F, the first HDC write protect determination unit 412F outputs the write protect signal to the first HDC write protect determination unit 412E of the R/W channel 40E via the transmission path WR0 and the HDC 60E, negates (deasserts) the write gate via the first HDC write protect determination unit 412E, and prohibits (or stops) the write (or write operation) of the head HD30. In other words, when receiving, from the HDC 60F, vibration detection information including a write protect signal of write (or write operation) of the head HD30 and indicating that the head HD30 has been vibrated, the first HDC write protect determination unit 412F outputs the vibration detection information to the first HDC write protect determination unit 412E of the R/W channel 40E via the transmission path WR0 and the HDC 60E, negates (deasserts) the write gate via the first HDC write protect determination unit 412E, and prohibits (or stops) the write (or write operation) of the head HD30.

For example, when receiving a write protect signal of write (or write operation) of the head HD30 from the HDC 60F, the first HDC write protect determination unit 412F outputs a signal for prohibiting the write (or write operation) of the head HD30 to the HDC 60E, outputs the write protect signal to the first HDC write protect determination unit 412E of the R/W channel 40E via the transmission path WR0 and the HDC 60E, negates (deasserts) the write gate via the first HDC write protect determination unit 412E, and prohibits (or stops) the write (or write operation) of the head HD30. In other words, when receiving, from the HDC 60F, vibration detection information including a write protect signal of write (or write operation) of the head HD30 and indicating that the head HD30 has been vibrated, the first HDC write protect determination unit 412F outputs a signal for prohibiting the write (or write operation) of the head HD30 to the HDC 60E, outputs the vibration detection information to the first HDC write protect determination unit 412E of the R/W channel 40E via the transmission path WR0 and the HDC 60E, negates (deasserts) the write gate via the first HDC write protect determination unit 412E, and prohibits (or stops) the write (or write operation) of the head HD30.

The second HDC write protect determination unit 413F prohibits (or stops) write (or write operation) of the head HD31 corresponding to the HDC 60F. For example, when receiving a write protect signal of write (or write operation) of the head HD31 from the HDC 60F, the second HDC write protect determination unit 413F negates (deasserts) a write gate to prohibit (or stop) the write (or write operation) of the head HD31. In other words, when receiving vibration detection information including a write protect signal of write (or write operation) of the head HD31 from the HDC 60F and indicating that the head HD31 has been vibrated, the second HDC write protect determination unit 413F negates (deasserts) the write gate to prohibit (or stop) the write (or write operation) of the head HD31.

For example, when receiving a write protect signal of write (or write operation) of the head HD30 corresponding to the HDC 60E, the second HDC write protect determination unit 413F negates (deasserts) the write gate to prohibit (or stop) write (or write operation) of the head HD31. In other words, when receiving vibration detection information including a write protect signal of write (or write operation) of the head HD30 corresponding to the HDC 60E and indicating that the head HD30 has been vibrated, the second HDC write protect determination unit 413F negates (deasserts) the write gate to prohibit (or stop) write (or write operation) of the head HD31.

The MPU 50F controls the actuator AC3 and the MA 1631 via the driver IC 20F and executes servo control for positioning the head HD31. The MPU 50F controls a data write operation to the lower surface RS3 of the disk DK3 and selects a storage destination of write data. The MPU 50F also controls a data read operation from the lower surface RS3 of the disk DK3 and controls processing of read data. The MPU 50F is connected to each unit of the magnetic disk device 1. The MPU 50F is electrically connected to, for example, the driver IC 20F, the R/W channel 40F, and the HDC 60F.

The HDC 60F controls read/write processing and controls data transfer between the host 700 and the R/W channel 40F in response to an instruction from the MPU 50F. The HDC 60F is electrically connected to, for example, the R/W channel 40F and the MPU 50F. The HDC 60F is electrically connected to the R/W channel 40E via the transmission path WR1. Note that the HDC 60F may not be connected to the R/W channel 40E via the transmission path WR1.

The HDC 60F includes the servo controller 610F and the write operation determination unit 620F. The HDC 60F executes processing of those units, for example, the servo controller 610F and the write operation determination unit 620F on firmware. The HDC 60F may include those units as a circuit. A part of the configuration of the HDC 60F may be provided in the MPU 50F. For example, the servo controller 610F and the write operation determination unit 620F may be provided in the MPU 50F. The HDC 60F prohibits (or stops) a write operation of the head HD31. For example, when receiving a write protect signal, the HDC 60F prohibits (or stops) the write operation of the head HD31.

The servo controller 610F controls a position of the head HD31. In other words, the servo controller 610F controls access by the head HD31 to a particular region on the lower surface RS3 of the disk DK3. The servo controller 610F includes the tracking controller 611F and the seek controller 612F.

The tracking controller 611F controls tracking of the head HD31 to a particular track on the lower surface RS3 of the disk DK3. The tracking controller 611F includes the DPES demodulation unit 6111F. The tracking controller 611F may include an SPES demodulation unit.

The DPES demodulation unit 6111F reads the data sector DS on the lower surface RS3 of the disk DK3 and demodulates a DPES.

The seek controller 612F controls seek of the head HD31 from a particular track to a targeted track on the lower surface RS3 of the disk DK3.

The write operation determination unit 620F is connected to the R/W channel 40E via the transmission path WR1. Note that the write operation determination unit 620F may not be connected to the R/W channel 40E via the transmission path WR1. The write operation determination unit 620F includes the position write operation determination unit 621F and the speed write operation determination unit 622F. The position write operation determination unit 621F determines a write operation of the head HD31 based on the position of the head HD31. The speed write operation determination unit 622F determines the write operation of the head HD31 based on a speed of the head HD31.

The write operation determination unit 620F determines whether to prohibit (or stop) write (or write operation) of the head HD31 corresponding to the HDC 60F.

When receiving a write protect determination signal (or write protect determination information) of write (or write operation) of the head HD31 corresponding to the HDC 60F, the write operation determination unit 620F determines whether to prohibit (or stop) the write (or write operation) of the head HD31 based on an SPES read and demodulated from the servo sector SS of the disk DK3 or a DPES read and demodulated from the data sector DS thereof by the head HD31.

When receiving a write protect determination signal (or write protect determination information) of write (or write operation) of the head HD31 corresponding to the HDC 60F, the write operation determination unit 620F determines whether or not the SPES or DPES corresponding to the head HD31 exceeds the threshold.

When determining that the SPES or DPES corresponding to the head HD31 exceeds the threshold, the write operation determination unit 620F determines prohibition (or stop) of the write (or write operation) of the head HD31 and outputs a write protect signal to the R/W channel 40F corresponding to the HDC 60F.

When receiving a signal for prohibiting write (or write operation) of the head HD30 corresponding to the HDC 60E from the first HDC write protect determination unit 412F, the write operation determination unit 620F may output a write protect signal to the R/W channel 40E. When receiving a signal for prohibiting write (or write operation) of the head HD30 corresponding to the HDC 60E from the first HDC write protect determination unit 412F, the write operation determination unit 620F may output a write protect signal to the R/W channel 40E via the transmission path WR1.

Note that, when receiving a signal for prohibiting write (or write operation) of the head HD30 corresponding to the HDC 60E from the first HDC write protect determination unit 412F, the write operation determination unit 620F may not output a write protect signal to the R/W channel 40E depending on a state of the system controller 130E, the head HD30, or the like.

For example, when determining that the SPES or DPES corresponding to the head HD31 exceeds the threshold, the write operation determination unit 620F outputs a write protect signal to the R/W channel 40E.

For example, when determining that the SPES or DPES corresponding to the head HD31 is equal to or smaller than the threshold, the write operation determination unit 620F does not prohibit (or stop) the write (or write operation) using the head HD31 via the HDC 60F. In other words, when determining that the SPES or DPES corresponding to the head HD31 is equal to or smaller than the threshold, the write operation determination unit 620F continues (or carries on with) the write (or write operation) using the head HD31.

FIG. 23 is a schematic diagram illustrating an exemplary method of demodulating an SPES and a DPES according to the third embodiment. FIG. 23 illustrates the read heads RH30 and RH31 located in the servo sector SV in a particular region of the disk DK3. In the example illustrated in FIG. 23, the read head RH is positioned at the reference position RP0.

The system controller 130 reads the servo sector SV by using the read heads RH30 and RH31 and demodulates an SPES. The read heads RH30 and RH31 are shifted in the circumferential direction at the down track separation, and thus the system controller 130 can demodulate the SPES at different timings.

The system controller 130 reads the data sector DS by using the read heads RH30 and RH31 and demodulates a DPES. The read heads RH30 and RH31 are shifted in the circumferential direction at the down track separation, and thus the system controller 130 can demodulate the DPES at different timings.

Figure 24:
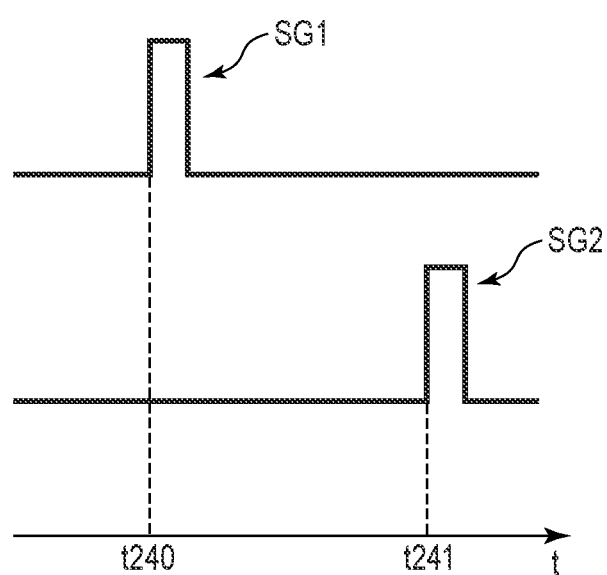
FIG. 24 is a schematic diagram illustrating an exemplary servo gate according to the third embodiment.

FIG. 24 is a schematic diagram illustrating an exemplary servo gate according to the third embodiment. In FIG. 24, the horizontal axis represents time. The time on the horizontal axis of FIG. 24 passes as the horizontal axis approaches the tip of the arrow. Timings t240 and t241 are indicated on the time on the horizontal axis of FIG. 24. In the time on the horizontal axis of FIG. 24, the timing t241 corresponds to a time after the timing t240. FIG. 24 illustrates servo gates SG1 and SG2. The servo gate SG1 corresponds to the timing t240. The servo gate SG2 corresponds to the timing t241. The servo gate SG1 corresponds to a timing at which the read head RH30 reads the servo sector SV and demodulates an SPES, and the servo gate SG2 corresponds to a timing at which the read head RH31 reads the servo sector SV and demodulates a DPES. The servo gates SG1 and SG2 are asserted at a rising timing and are negated at a falling timing.

The system controller 130 asserts the servo gate SG1 at the timing t240, reads the servo sector SV by using the read head RH30, and demodulates an SPES. The system controller 130 asserts the servo gate SG2 at the timing t241, reads the servo sector SV by using the read head RH31, and demodulates the SPES.

The system controller 130 asserts the servo gate SG1 at the timing t240, reads the data sector DS by using the read head RH30, and demodulates a DPES. The system controller 130 asserts the servo gate SG2 at the timing t241, reads the data sector DS by using the read head RH31, and demodulates the DPES.

Figure 25:
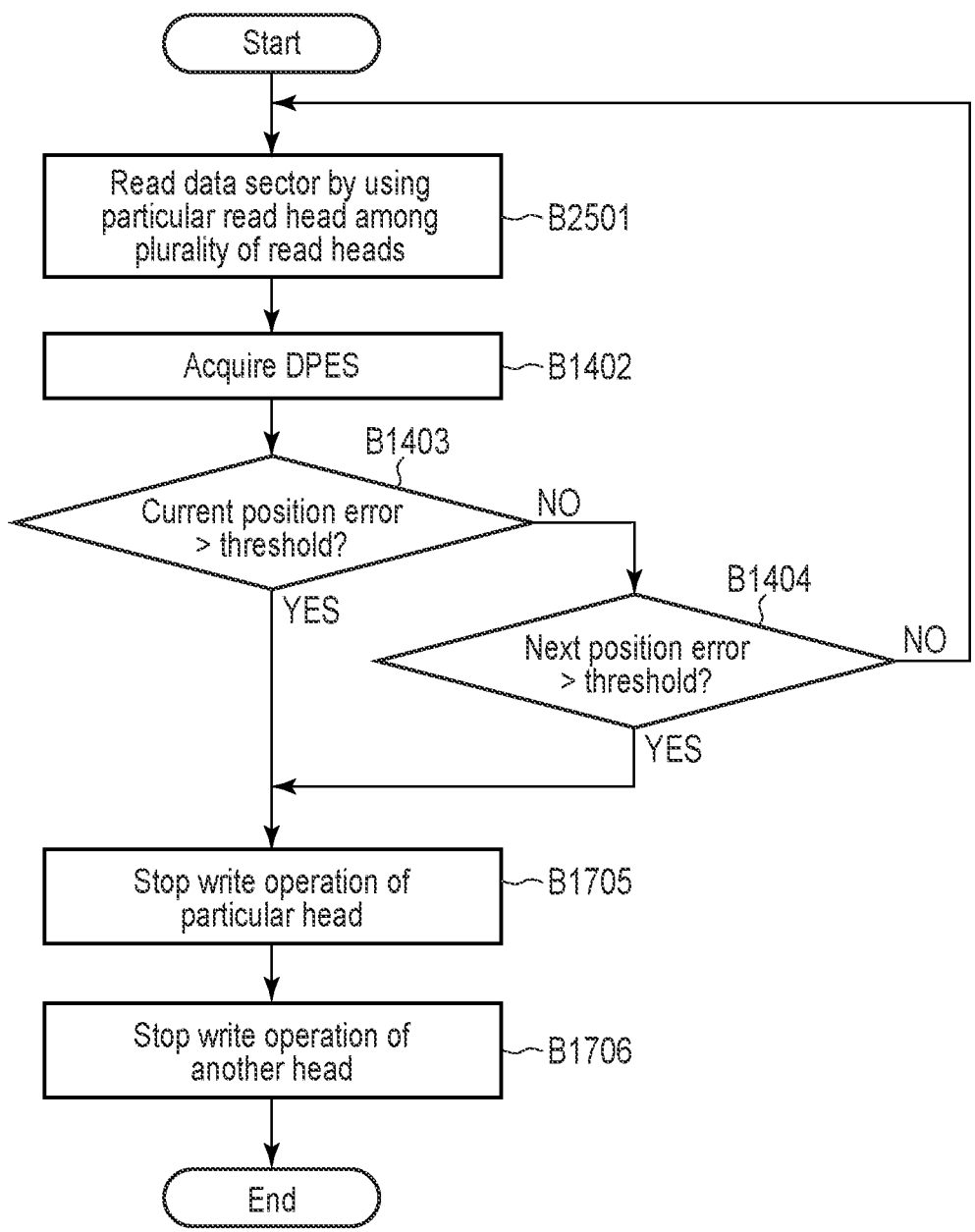
FIG. 25 is a flowchart showing an exemplary method of stopping a write operation according to the third embodiment.

FIG. 25 is a flowchart showing an exemplary method of stopping a write operation according to the third embodiment.

The system controller 130 reads a data sector by using a particular read head RH among the plurality of read heads RH (B2501), demodulates a DPES based on particular information (or particular data) of the data sector, and thus acquires the DPES (B1402). The system controller 130 determines whether or not a current position error corresponding to the particular head HD is larger than a threshold for stopping the head HD (B1403).

When determining that the current position error corresponding to the particular head HD is equal to or smaller than the threshold (NO in B1403), the system controller 130 determines whether or not the next position error of the particular head HD is larger than the threshold for stopping the head HD (B1404). When determining that the next position error is equal to or smaller than the threshold (NO in B1404), the system controller 130 proceeds to the processing in B2501. When determining that the next position error is larger than the threshold (YES in B1404), the system controller 130 proceeds to the processing in B1705.

When determining that the current position error corresponding to the particular head HD is larger than the threshold (YES in B1403), the system controller 130 stops (prohibits) a write operation of the particular head HD (B1705), also stops (prohibits) a write operation of another head HD different from the particular head HD (B1706), and ends the processing.

According to the third embodiment, the magnetic disk device 1 includes a plurality of disks DK, a plurality of heads HD, and a plurality of system controllers 130 corresponding to the plurality of heads HD. Each of the plurality of heads HD includes a write head WH and a plurality of read heads RH. The particular system controller 130 among the plurality of system controllers 130 reads a servo sector SV of a disk DK corresponding to a particular read head RH among the plurality of read heads RH of the particular head HD corresponding to the particular system controller 130 by using the particular read head RH and demodulates an SPES. The particular system controller 130 among the plurality of system controllers 130 reads a data sector DS of a disk DK corresponding to a particular read head RH among the plurality of read heads RH of the particular head HD corresponding to the particular system controller 130 by using the particular read head RH and demodulates a DPES. The particular system controller 130 calculates a current position error of the particular head HD based on the SPES or DPES. In a case where a current position error of a particular head HD exceeds a threshold for stopping (or prohibiting) a write operation of the particular head HD, a particular system controller 130 stops (or prohibits) the write operation using the particular head HD. When stopping (or prohibiting) the write operation using the particular head HD, the particular system controller 130 can also stop (or prohibit) a write operation using another head HD different from the particular head HD among the plurality of system controllers 130. Therefore, the magnetic disk device 1 can improve the format efficiency.

Third Modification Example

A configuration of the magnetic disk device 1 according to the third modification example of the third embodiment is different from the configuration of the magnetic disk device 1 according to the third embodiment.

Figure 26:
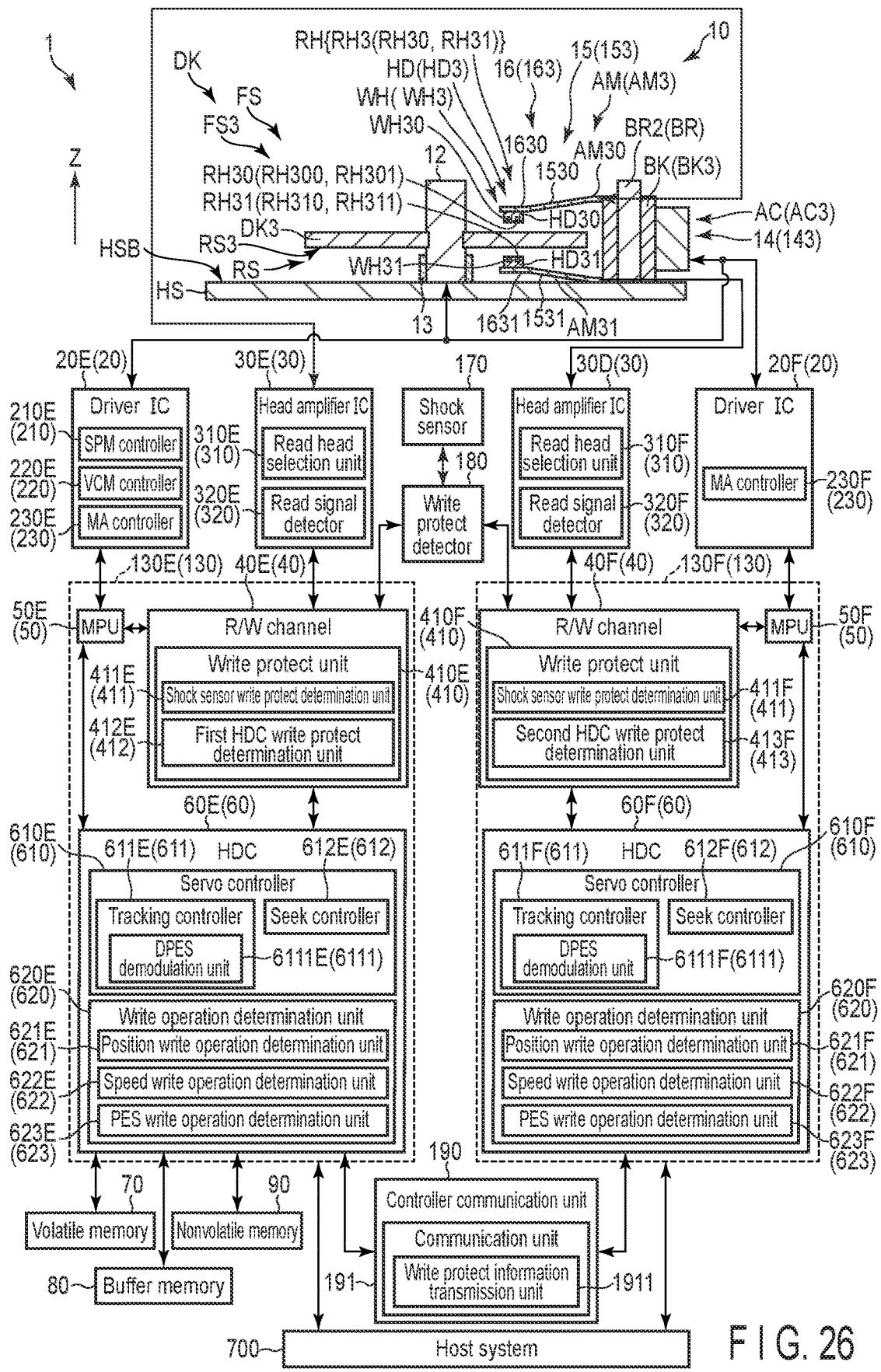
FIG. 26 is a schematic diagram illustrating an exemplary configuration of a magnetic disk device according to a third modification example.

FIG. 26 is a schematic diagram illustrating an exemplary configuration of the magnetic disk device 1 according to the third modification example.

In the example illustrated in FIG. 26, the write protect unit 410E includes the shock sensor write protect determination unit 411E and the first HDC write protect determination unit 412E.

The write operation determination unit 620E further includes a PES write operation determination unit 623E. The PES write operation determination unit 623E determines whether to prohibit (or stop) a write operation of the head HD31 (write head WH31) based on an SPES or DPES obtained by reading and demodulating the servo sector SV or the data sector DS on the lower surface RS3 of the disk DK3 by using the head HD31 (read head RH310 or RH311) corresponding to the HDC 60F via the HDC 60F.

For example, when receiving a write protect signal for prohibiting (or stopping) write (or write operation) of the head HD30, the PES write operation determination unit 623E outputs a write protect signal for prohibiting (or stopping) write (or write operation) of the head HD31 (write head WH31) to the R/W channel 40F via the write protect information transmission unit 1911 and the HDC 60F. In other words, when receiving vibration detection information including a write protect signal for prohibiting (or stopping) write (or write operation) of the head HD30 and indicating that the head HD30 has been vibrated, the PES write operation determination unit 623E outputs vibration detection information for prohibiting (or stopping) write (or write operation) of the head HD31 (write head WH31) to the R/W channel 40F via the write protect information transmission unit 1911 and the HDC 60F.

Note that, when receiving a write protect signal for prohibiting (or stopping) write (or write operation) of the head HD30, the PES write operation determination unit 623E may not output a write protect signal for prohibiting (or stopping) write (or write operation) of the head HD31 (write head WH31) to the R/W channel 40F depending on a state of the system controller 130F, the head HD31, or the like. In other words, when receiving vibration detection information including a write protect signal for prohibiting (or stopping) write (or write operation) of the head HD30 and indicating that the head HD30 has been vibrated, the PES write operation determination unit 623E may not output vibration detection information for prohibiting (or stopping) write (or write operation) of the head HD31 (write head WH31) to the R/W channel 40F depending on a state of the system controller 130F, the head HD31, or the like.

The write protect unit 410F includes the shock sensor write protect determination unit 411F and the second HDC write protect determination unit 413F.

The write operation determination unit 620F further includes a PES write operation determination unit 623F. The PES write operation determination unit 623F determines whether to prohibit (or stop) write (or write operation) of the head HD30 (write head WH30) based on an SPES or DPES obtained by reading and demodulating the servo sector SV or the data sector DS on the upper surface FS3 of the disk DK3 via the HDC 60E by using the head HD30 (read head RH300 and RH301) corresponding to the HDC 60E.

For example, when receiving a write protect signal for prohibiting (or stopping) write (or write operation) of the head HD31, the PES write operation determination unit 623F outputs a write protect signal for prohibiting (or stopping) write (or write operation) of the head HD30 (write head WH30) to the R/W channel 40E via the write protect information transmission unit 1911 and the HDC 60E. In other words, when receiving vibration detection information including a write protect signal for prohibiting (or stopping) write (or write operation) of the head HD31 and indicating that the head HD31 has been vibrated, the PES write operation determination unit 623F outputs vibration detection information for prohibiting (or stopping) write (or write operation) of the head HD30 (write head WH30) to the R/W channel 40E via the write protect information transmission unit 1911 and the HDC 60E.

Note that, when receiving a write protect signal for prohibiting (or stopping) write (or write operation) of the head HD31, the PES write operation determination unit 623F may not output a write protect signal for prohibiting (or stopping) write (or write operation) of the head HD30 (write head WH30) to the R/W channel 40E depending on a state of the system controller 130E, the head HD30, or the like. In other words, when receiving vibration detection information including a write protect signal for prohibiting (or stopping) write (or write operation) of the head HD31 and indicating that the head HD31 has been vibrated, the PES write operation determination unit 623F may not output vibration detection information for prohibiting (or stopping) write (or write operation) of the head HD30 (write head WH30) to the R/W channel 40E depending on a state of the system controller 130E, the head HD30, or the like.

According to the third modification example, the magnetic disk device 1 further includes the write protect information transmission unit 1911. In a case where a current position error of a particular head HD exceeds a threshold for stopping (or prohibiting) a write operation of the particular head HD, a particular system controller 130 stops (or prohibits) the write operation using the particular head HD. When stopping (or prohibiting) the write operation using the particular head HD, the particular system controller 130 can also stop (or prohibit) a write operation using another head HD corresponding to another system controller 130 different from the particular system controller 130 among the plurality of system controllers 130. For example, the particular system controller 130 outputs a write protect signal to another system controller 130 via the write protect information transmission unit 1911 to stop (or prohibit) a write operation using another head HD. Therefore, the magnetic disk device 1 can improve the format efficiency.

Fourth Embodiment

A configuration of a magnetic disk device 1 according to a fourth embodiment is different from the configurations of the magnetic disk devices 1 according to the embodiments and modification examples described above.

Figure 27:
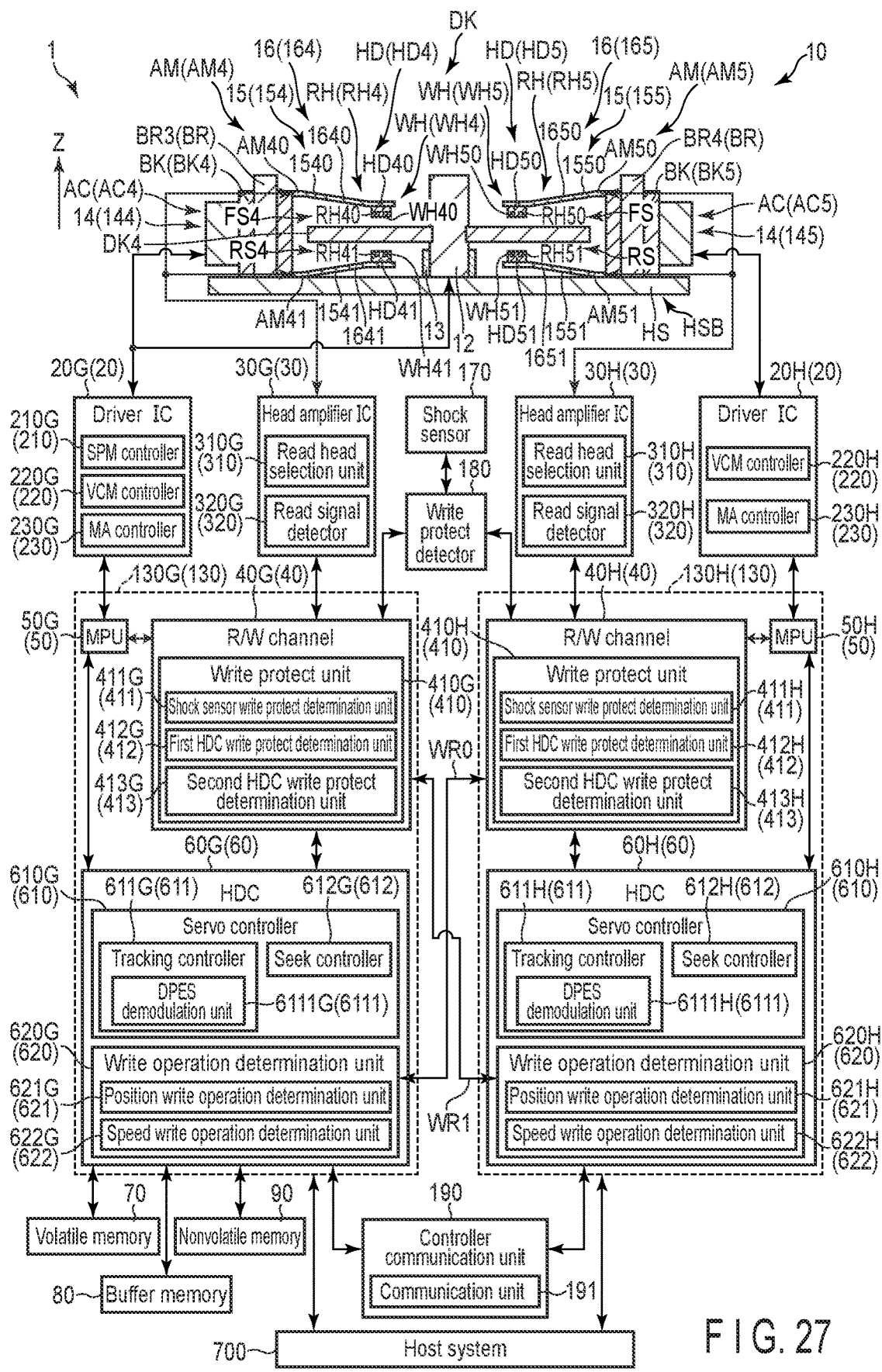
FIG. 27 is a schematic diagram illustrating an exemplary configuration of a magnetic disk device according to a fourth embodiment.

FIG. 27 is a schematic diagram illustrating an exemplary configuration of the magnetic disk device 1 according to the fourth embodiment.

In the example illustrated in FIG. 27, a disk DK includes a disk DK4. The disk DK4 is attached to a spindle 12. The disk DK4 has an upper surface FS4 and a lower surface RS4 opposite to the upper surface FS4. The disk DK4 may include two or more disks.

A head HD includes heads HD4 and HD5. The head HD4 includes a head HD40 facing the upper surface FS4 of the disk DK4 and a head HD41 facing the lower surface RS4 of the disk DK4. The head HD4 may include only one head or three or more heads. The head HD4 includes a write head WH4 that writes data to the disk DK4 and a read head RH4 that reads data written to the disk DK4. The write head WH4 includes a write head WH40 and a write head WH41. The read head RH4 includes a read head RH40 and a read head RH41.

The head HD40 includes the write head WH40 that writes data to the upper surface FS4 and the read head RH40 that reads data written to the upper surface FS4. The head HD41 includes the write head WH41 that writes data to the lower surface RS4 and the read head RH41 that reads data written to the lower surface RS4.

The head HD5 includes a head HD50 facing the upper surface FS4 of the disk DK4 and a head HD51 facing the lower surface RS4 of the disk DK4. The head HD5 may include only one head or three or more heads. The head HD5 includes a write head WH5 that writes data to the disk DK4 and a read head RH5 that reads data written to the disk DK4. The write head WH5 includes a write head WH50 and a write head WH51. The read head RH5 includes a read head RH50 and a read head RH51.

The head HD50 includes the write head WH50 that writes data to the upper surface FS4 and the read head RH50 that reads data written to the upper surface FS4. The head HD51 includes the write head WH51 that writes data to the lower surface RS4 and the read head RH51 that reads data written to the lower surface RS4.

An actuator block BK includes actuator blocks BK4 and BK5. The actuator block BK4 is rotatably attached to a bearing BR3 erected on a bottom wall HSB. The actuator block BK5 is rotatably attached to a bearing BR4 erected on the bottom wall HSB. The bearing BR4 is located to face the bearing BR3 across a straight line passing through a center of the spindle 12 in plan view. For example, the bearing BR3 is symmetrically located with the bearing BR4 about the straight line passing through the center of the spindle 12 in plan view.

An arm AM includes an arm AM4 and an arm AM5. The arm AM4 includes an arm AM40 located on the upper surface FS4 side of the disk DK4 and an arm AM41 located on the lower surface RS4 side of the disk DK4. The arm AM4 may include only one arm or three or more arms depending on the number of heads HD4. The arm AM4 is connected to the actuator block BK4.

The arm AM5 includes an arm AM50 located on the upper surface FS4 side of the disk DK4 and an arm AM51 located on the lower surface RS4 side of the disk DK4. The arm AM5 may include only one arm or three or more arms depending on the number of heads HD5. The arm AM5 is connected to the actuator block BK5.

A VCM 14 includes VCMs 144 and 145. The VCM 144 is connected to the actuator block BK4 on a side opposite to the arm AM4. The VCM 145 is connected to the actuator block BK5 on a side opposite to the arm AM5.

A suspension 15 includes suspensions 154 and 155. The suspension 154 is attached to the arm AM4. The suspension 154 has a distal end portion on which the head HD4 is mounted, the distal end portion being opposite to one end portion connected to the arm AM4. The suspension 154 includes a suspension 1540 attached to the arm AM40 and a suspension 1541 attached to the arm AM41. The suspension 154 may include only one suspension or three or more suspensions depending on the number of arms AM4. The suspension 1540 has a distal end portion on which the head HD40 is mounted, the distal end portion being opposite to one end portion connected to the arm AM40. The suspension 1541 has a distal end portion on which the head HD41 is mounted, the distal end portion being opposite to one end portion connected to the arm AM41.

The suspension 155 is attached to the arm AM5. The suspension 155 has a distal end portion on which the head HD5 is mounted, the distal end portion being opposite to one end portion connected to the arm AM5. The suspension 155 includes a suspension 1550 attached to the arm AM50 and a suspension 1551 attached to the arm AM51. The suspension 155 may include only one suspension or three or more suspensions depending on the number of arms AM5. The suspension 1550 has a distal end portion on which the head HD50 is mounted, the distal end portion being opposite to one end portion connected to the arm AM50. The suspension 1551 has a distal end portion on which the head HD51 is mounted, the distal end portion being opposite to one end portion connected to the arm AM51.

An MA 16 includes MAs 164 and 165. The MA 164 is attached to the suspension 154. The MA 164 finely controls operation of the head HD4 in the radial direction. For example, the MA 164 controls the operation of the head HD4 in the radial direction more finely than the VCM 144 does. The MA 164 includes, for example, an MA 1640 attached to the suspension 1540 and an MA 1641 attached to the suspension 1541. The MA 164 may include only one MA or three or more MAs depending on the number of suspensions 154.

The MA 1640 finely controls operation of the head HD40 in the radial direction. For example, the MA 1640 controls the operation of the head HD40 in the radial direction more finely than the VCM 144 does. The MA 1641 finely controls operation of the head HD41 in the radial direction. For example, the MA 1641 controls the operation of the head HD41 in the radial direction more finely than the VCM 144 does. Note that the MA 1640 and the MA 1641 may be driven independently of the VCM 144.

The MA 165 is attached to the suspension 155. The MA 165 finely controls operation of the head HD5 in the radial direction. For example, the MA 165 controls the operation of the head HD5 in the radial direction more finely than the VCM 145 does. The MA 165 includes, for example, an MA 1650 attached to the suspension 1550 and an MA 1651 attached to the suspension 1551. The MA 165 may include only one MA or three or more MAs depending on the number of suspensions 155.

The MA 1650 finely controls operation of the head HD50 in the radial direction. For example, the MA 1650 controls the operation of the head HD50 in the radial direction more finely than the VCM 145 does. The MA 1651 finely controls operation of the head HD51 in the radial direction. For example, the MA 1651 controls the operation of the head HD51 in the radial direction more finely than the VCM 145 does. Note that the MA 1650 and the MA 1651 may be driven independently of the VCM 145.

An actuator AC includes actuators AC4 and AC5. The actuator AC4 is rotatably attached to the bearing BR3. The actuator AC4 includes the suspension 154, the MA 164, the arm AM4, the actuator block BK4, and the VCM 144. The actuator AC4 drives the VCM 144 and finely drives the MA 164 around a rotation axis of the bearing BR3, thereby positioning the head HD4 mounted on the suspension 154 at a particular position of the disk DK4. In a case where the MA 164 is not provided, the actuator AC4 drives the VCM 144 around the bearing BR3, thereby positioning the head HD4 mounted on the suspension 154 at a particular position of the disk DK4.

The actuator AC5 is rotatably attached to the bearing BR4. The actuator AC5 includes the suspension 155, the MA 165, the arm AM5, the actuator block BK5, and the VCM 145. The actuator AC5 drives the VCM 145 and finely drives the MA 165 around a rotation axis of the bearing BR4, thereby positioning the head HD5 mounted on the suspension 155 at a particular position of the disk DK4. In a case where the MA 165 is not provided, the actuator AC5 drives the VCM 145 around the bearing BR4, thereby positioning the head HD5 mounted on the suspension 155 at a particular position of the disk DK4.

The driver IC 20 includes a driver IC 20G and a driver IC 20H. The driver ICs 20G and 20H are formed in separate configurations, for example, in separate circuits. Note that the driver ICs 20G and 20H may be formed in an integrated configuration, for example, in an integrated circuit. An SPM controller 210 includes an SPM controller 210G. A VCM controller 220 includes VCM controllers 220G and 220H. An MA controller 230 includes MA controllers 230G and 230H.

The driver IC 20G controls driving of an SPM 13, the VCM 144, and the MA 164 under the control of the system controller 130G (specifically, an MPU 50G or HDC 60G described later). The driver IC 20G is electrically connected to the SPM 13, the driver IC 20D, the VCM 144, and the MA 164. The driver IC 20G is connected to the SPM 13, the driver IC 20G, the VCM 144, and the MA 164 via, for example, a particular interface.

The driver IC 20G includes the SPM controller 210G, a VCM controller 220G, and the microactuator (MA) controller 230G. The SPM controller 210G controls rotation of the SPM 13. The VCM controller 220G controls driving of the VCM 144 by controlling a current (or voltage) to be supplied to the VCM 144. The MA controller 230G controls driving of the MA 164 by controlling a current (or voltage) to be supplied to the MA 164. A part of the configuration of the driver IC 20G (e.g., the SPM controller 210G, the VCM controller 220G, and the MA controller 230G) may be provided in the system controller 130G. In a case where the MA 164 is not provided in the actuator AC4, the MA controller 230G may not be provided.

The driver IC 20H controls driving of the VCM 145 and the MA 165 under the control of a system controller 130H (specifically, an MPU 50H or HDC 60H described later). The driver IC 20H is electrically connected to the VCM 145 and the MA 165. The driver IC 20H is connected to the VCM 145 and the MA 165 via, for example, a particular interface.

The driver IC 20H includes the VCM controller 220H and the MA controller 230H. The VCM controller 220H controls driving of the VCM 145 by controlling a current (or voltage) to be supplied to the VCM 145. The MA controller 230H controls driving of the MA 165 by controlling a current (or voltage) to be supplied to the MA 165. A part of the configuration of the driver IC 20H (e.g., the VCM controller 220H and the MA controller 230H) may be provided in the system controller 130H. In a case where the MA 165 is not provided in the actuator AC5, the MA controller 230H may not be provided.

The head amplifier IC 30 includes a head amplifier IC 30G and a head amplifier IC 30H. The head amplifier IC 30 may include only one head amplifier IC or three or more head amplifier ICs. The head amplifier ICs 30G and 30H are formed in separate configurations, for example, in separate circuits. Note that the head amplifier ICs 30G and 30H may be formed in an integrated configuration, for example, in an integrated circuit. The read head selection unit 310 includes read head selection units 310G and 310H. The read head selection unit 310 may include only one read head selection unit or three or more read head selection units. The read signal detector 320 includes read signal detectors 320G and 320H. The read signal detector 320 may include only one read signal detector or three or more read signal detectors.

The head amplifier IC 30G amplifies a read signal read from the disk DK4 and outputs the amplified read signal to the system controller 130G (specifically, a read/write (R/W) channel 40G described later). The head amplifier IC 30G is electrically connected to each head HD4, for example, the heads HD40 and HD41. The head amplifier IC 30G outputs a write current corresponding to a signal output from the R/W channel 40G to the head HD4.

The head amplifier IC 30G includes the read head selection unit 310G and the read signal detector 320G. The read head selection unit 310G selects the read head RH4 for reading data from the disk DK4 in the actuator AC4. The read signal detector 320G detects a signal (read signal) read by the read head RH4 from the disk DK4. A part of the configuration of the head amplifier IC 30G (e.g., the read head selection unit 310G and the read signal detector 320G) may be provided in the system controller 130G.

The head amplifier IC 30H amplifies a read signal read from the disk DK4 and outputs the amplified read signal to the system controller 130H (specifically, a read/write (R/W) channel 40H described later). The head amplifier IC 30H is electrically connected to each head HD5, for example, the heads HD50 and HD51. The head amplifier IC 30H outputs a write current corresponding to a signal output from the R/W channel 40H to the head HD5.

The head amplifier IC 30H includes the read head selection unit 310H and the read signal detector 320H. The read head selection unit 310H selects the read head RH5 for reading data from the disk DK4 in the actuator AC5. The read signal detector 320H selects the read head RH5 for reading data from the disk DK4. The read signal detector 320H detects a signal (read signal) read by the read head RH5 from the disk DK4. A part of the configuration of the head amplifier IC 30H (e.g., the read head selection unit 310H and the read signal detector 320H) may be provided in the system controller 130H.

The system controller 130 includes the system controllers 130G and 130H. The system controller 130 may include only one system controller or three or more system controllers. The system controllers 130G and 130H are formed in separate configurations, for example, in separate circuits. Note that the system controllers 130G and 130H may be formed in an integrated configuration, for example, in an integrated circuit.

The R/W channel 40 includes the R/W channels 40G and 40H. The R/W channel 40 may include only one R/W channel or three or more R/W channels. A shock sensor write protect determination unit 411 includes shock sensor write protect determination units 411G and 411H. The shock sensor write protect determination unit 411 may include only one shock sensor write protect determination unit or three or more shock sensor write protect determination units. The first HDC write protect determination unit 412 includes first HDC write protect determination units 412G and 412H. The first HDC write protect determination unit 412 may include only one first HDC write protect determination unit or three or more first HDC write protect determination units. The second HDC write protect determination unit 413 includes second HDC write protect determination units 413G and 413H. The second HDC write protect determination unit 413 may include only one second HDC write protect determination unit or three or more second HDC write protect determination units.

An MPU 50 includes the MPUs 50G and 50H. An HDC 60 includes the HDCs 60G and 60H. The HDC 60 may include only one HDC or three or more HDCs. The servo controller 610 includes servo controllers 610G and 610H. The servo controller 610 may include only one servo controller or three or more servo controllers. The tracking controller 611 includes tracking controllers 611G and 611H. The tracking controller 611 may include only one tracking controller or three or more tracking controllers. The DPES demodulation unit 6111 includes DPES demodulation units 6111G and 6111H. The DPES demodulation unit 6111 may include only one DPES demodulation unit or three or more DPES demodulation units. The seek controller 612 includes seek controllers 612G and 612H. The seek controller 612 may include only one seek controller or three or more seek controllers. The write operation determination unit 620 includes write operation determination units 620G and 620H. The write operation determination unit 620 may include only one write operation determination unit or three or more write operation determination units. A position write operation determination unit 621 includes position write operation determination units 621G and 621H. The position write operation determination unit 621 may include only one position write operation determination unit or three or more position write operation determination units. The speed write operation determination unit 622 includes speed write operation determination units 622G and 622H. The speed write operation determination unit 622 may include only one speed write operation determination unit or three or more speed write operation determination units.

The system controller 130G includes the R/W channel 40G, the MPU 50G, and the HDC 60G. The system controller 130G is electrically connected to the driver IC 20G, the head amplifier IC 30G, a volatile memory 70, a buffer memory 80, a nonvolatile memory 90, a write protect detector 180, a controller communication unit 190, and a host system 700. The system controller 130G is electrically connected to the system controller 130G via transmission paths WR0 and WR1. The transmission path WR0 and the transmission path WR1 may be physical wirings, communication circuits, or conceptual paths for transmitting or sending electricity, data, information, and the like. The system controller 130G may include the SPM controller 210G, the VCM controller 220G, and the MA controller 230G. The system controller 130G may include the driver IC 20G and the head amplifier IC 30G.

The R/W channel 40G executes signal processing of read data transferred from the disk DK4 to the host 700 and write data transferred from the host 700 in response to an instruction from the MPU 50G. The R/W channel 40G is electrically connected to, for example, the head amplifier IC 30G, the MPU 50G, the HDC 60G, and the write protect detector 180. The R/W channel 40G is connected to the write operation determination unit 620H (HDC 60H) via the transmission path WR1. Note that the R/W channel 40G may not be connected to the write operation determination unit 620H (HDC 60H) via the transmission path WR1. The R/W channel 40G includes a write protect unit 410G.

The write protect unit 410G prohibits (or stops) write (or write operation) using the head HD4 and the head HD5 via the HDC 60G and the HDC 60H. The write protect unit 410G is connected to the write operation determination unit 620H (HDC 60H) via the transmission path WR1. Note that the write protect unit 410G may not be connected to the write operation determination unit 620H (HDC 60H) via the transmission path WR1. The write protect unit 410G includes the shock sensor write protect determination unit 411G, the first HDC write protect determination unit 412G, and the second HDC write protect determination unit 413G.

In a case where the shock sensor 170 detects a vibration or shock, the shock sensor write protect determination unit 411G determines whether to prohibit (or stop) write (or write operation) using the head HD4 of the actuator AC4.

For example, when receiving a write protect determination execution signal, the shock sensor write protect determination unit 411G determines whether to prohibit (or stop) write (or write operation) using at least one head HD corresponding to the actuator AC4.

For example, when receiving a write protect determination execution signal, the shock sensor write protect determination unit 411G determines whether or not the vibration or shock is larger than a particular value based on the write protect determination execution signal. For example, when determining that the vibration or shock is larger than the particular value, the shock sensor write protect determination unit 411G determines prohibition (or stop) of the write (or write operation) of the at least one head HD4 of the actuator AC4. For example, when determining that the vibration or shock is larger than the particular value, the shock sensor write protect determination unit 411G outputs a write protect determination signal to determine prohibition (or stop) of the write (or write operation) of the at least one head HD4 of the actuator AC4. For example, when determining that the vibration or shock is equal to or smaller than the particular value, the shock sensor write protect determination unit 411G does not determine prohibition (or stop) of the write (or write operation) using the at least one head HD4 of the particular actuator AC4.

The first HDC write protect determination unit 412G prohibits (or stops) write (or write operation) of the head HD4 corresponding to the HDC 60G. For example, when receiving a write protect signal for prohibiting (or stopping) write (or write operation) of the head HD4 from the HDC 60G, the first HDC write protect determination unit 412G negates (deasserts) a write gate to prohibit (or stop) the write (or write operation) of the head HD4. In other words, when receiving, from the HDC 60G, vibration detection information including a write protect signal for prohibiting (or stopping) write (or write operation) of the head HD4 and indicating that the head HD4 has been vibrated, the first HDC write protect determination unit 412G negates (deasserts) the write gate to prohibit (or stop) the write (or write operation) of the head HD4.

For example, when receiving a write protect signal for prohibiting (or stopping) write (or write operation) of the head HD5 corresponding to the HDC 60H, the first HDC write protect determination unit 412G negates (deasserts) the write gate to prohibit (or stop) write (or write operation) of the head HD4. In other words, when receiving vibration detection information including a write protect signal for prohibiting (or stopping) write (or write operation) of the head HD5 corresponding to the HDC 60H and indicating that the head HD5 has been vibrated, the first HDC write protect determination unit 412G negates (deasserts) the write gate to prohibit (or stop) write (or write operation) of the head HD4.

The second HDC write protect determination unit 413G prohibits (or stops) write (or write operation) of the head HD5 corresponding to the HDC 60H. For example, when receiving a write protect signal for prohibiting (or stopping) write (or write operation) of the head HD5 from the HDC 60G, the second HDC write protect determination unit 413G outputs the write protect signal to the second HDC write protect determination unit 413H of the R/W channel 40H via the HDC 60G and the transmission path WR0, negates (deasserts) a write gate via the second HDC write protect determination unit 413H, and prohibits (or stops) the write (or write operation) of the head HD5. In other words, when receiving, from the HDC 60G, vibration detection information including a write protect signal for prohibiting (or stopping) write (or write operation) of the head HD5 and indicating that the head HD5 has been vibrated, the second HDC write protect determination unit 413G outputs the vibration detection information to the second HDC write protect determination unit 413H of the R/W channel 40H via the HDC 60G and the transmission path WR0, negates (deasserts) the write gate via the second HDC write protect determination unit 413H, and prohibits (or stops) the write (or write operation) of the head HD5.

For example, when receiving a write protect signal for prohibiting (or stopping) write (or write operation) of the head HD5 from the HDC 60G, the second HDC write protect determination unit 413G outputs a signal for prohibiting the write (or write operation) of the head HD5 to the HDC 60G, outputs the write protect signal to the second HDC write protect determination unit 413H of the R/W channel 40H via the HDC 60G and the transmission path WR0, negates (deasserts) the write gate via the second HDC write protect determination unit 413H, and prohibits (or stops) the write (or write operation) of the head HD5. In other words, when receiving, from the HDC 60G, vibration detection information including a write protect signal for prohibiting (or stop) write (or write operation) of the head HD5 and indicating that the head HD5 has been vibrated, the second HDC write protect determination unit 413G outputs a signal for prohibiting the write (or write operation) of the head HD5 to the HDC 60G, outputs the vibration detection information to the second HDC write protect determination unit 413H of the R/W channel 40H via the HDC 60G and the transmission path WR0, negates (deasserts) the write gate via the second HDC write protect determination unit 413H, and prohibits (or stops) the write (or write operation) of the head HD5.

For example, when receiving a write protect signal for prohibiting (or stopping) write (or write operation) of the head HD5 from the HDC 60G, the second HDC write protect determination unit 413G outputs the write protect signal to the second HDC write protect determination unit 413H of the R/W channel 40H via the transmission path WR1 and the HDC 60H, negates (deasserts) the write gate via the second HDC write protect determination unit 413H, and prohibits (or stops) the write (or write operation) of the head HD5. In other words, when receiving, from the HDC 60G, vibration detection information including a write protect signal for prohibiting (or stopping) write (or write operation) of the head HD5 and indicating that the head HD5 has been vibrated, the second HDC write protect determination unit 413G outputs the vibration detection information to the second HDC write protect determination unit 413H of the R/W channel 40H via the transmission path WR1 and the HDC 60H, negates (deasserts) the write gate via the second HDC write protect determination unit 413H, and prohibits (or stops) the write (or write operation) of the head HD5.

For example, when receiving a write protect signal for prohibiting (or stop) write (or write operation) of the head HD5 from the HDC 60G, the second HDC write protect determination unit 413G outputs a signal for prohibiting the write (or write operation) of the head HD5 to the HDC 60H, outputs the write protect signal to the second HDC write protect determination unit 413H of the R/W channel 40H via the transmission path WR1 and the HDC 60H, negates (deasserts) the write gate via the second HDC write protect determination unit 413H, and prohibits (or stops) the write (or write operation) of the head HD5. In other words, when receiving, from the HDC 60G, vibration detection information including a write protect signal for prohibiting (or stop) write (or write operation) of the head HD5 and indicating that the head HD5 has been vibrated, the second HDC write protect determination unit 413G outputs a signal for prohibiting the write (or write operation) of the head HD5 to the HDC 60H, outputs the vibration detection information to the second HDC write protect determination unit 413H of the R/W channel 40H via the transmission path WR1 and the HDC 60H, negates (deasserts) the write gate via the second HDC write protect determination unit 413H, and prohibits (or stops) the write (or write operation) of the head HD5.

The MPU 50G controls the actuator AC4 via the driver IC 20G and executes servo control for positioning the head HD4. The MPU 50G controls a data write operation to the disk DK4 and selects a storage destination of write data. The MPU 50G also controls a data read operation from the disk DK4 and controls processing of read data. The MPU 50G is connected to each unit of the magnetic disk device 1. The MPU 50G is electrically connected to, for example, the driver IC 20G, the R/W channel 40G, and the HDC 60G.

The HDC 60G controls read/write processing and controls data transfer between the host 700 and the R/W channel 40G in response to an instruction from the MPU 50G. The HDC 60G is electrically connected to, for example, the R/W channel 40G, the MPU 50G, the volatile memory 70, the buffer memory 80, and the nonvolatile memory 90. The HDC 60G is connected to the R/W channel 40H via the transmission path WR0. Note that the HDC 60G may not be connected to the R/W channel 40H via the transmission path WR0.

The HDC 60G includes the servo controller 610G and the write operation determination unit 620G. The HDC 60G executes processing of those units, for example, the servo controller 610G and the write operation determination unit 620G on firmware. The HDC 60G may include those units as a circuit. A part of the configuration of the HDC 60G may be provided in the MPU 50G. For example, the servo controller 610G and the write operation determination unit 620G may be provided in the MPU 50G. The HDC 60G prohibits (or stops) a write operation of the head HD4. For example, when receiving a write protect signal, the HDC 60G prohibits (or stops) the write operation of the head HD4.

The servo controller 610G controls a position of the head HD4. In other words, the servo controller 610G controls access by the head HD4 to a particular region of the disk DK4. The servo controller 610G includes the tracking controller 611G and the seek controller 612G.

The tracking controller 611G controls tracking of the head HD4 to a particular track of the disk DK4. The tracking controller 611G includes the DPES demodulation unit 6111G. The tracking controller 611G may include an SPES demodulation unit.

The DPES demodulation unit 6111G reads the data sector DS of the disk DK4 and demodulates a DPES.

The seek controller 612G controls seek of the head HD4 from a particular track to a targeted track on the disk DK4.

The write operation determination unit 620G is connected to the R/W channel 40H via the transmission path WR0. Note that the write operation determination unit 620G may not be connected to the R/W channel 40H via the transmission path WR0. The write operation determination unit 620G includes the position write operation determination unit 621G and the speed write operation determination unit 622G. The position write operation determination unit 621G determines a write operation of the head HD4 based on the position of the head HD4. The speed write operation determination unit 622G determines the write operation of the head HD4 based on a speed of the head HD4.

The write operation determination unit 620G determines whether to prohibit (or stop) a write (or write operation) of the head HD4 corresponding to the HDC 60G.

When receiving a write protect determination signal (or write protect determination information) of write (or write operation) of the head HD4 corresponding to the HDC 60G, the write operation determination unit 620G determines whether to prohibit (or stop) the write (or write operation) of the head HD4 based on an SPES read and demodulated from the servo sector SS of the disk DK4 or a DPES read and demodulated from the data sector DS thereof by the head HD4.

When receiving a write protect determination signal (or write protect determination information) of write (or write operation) of the head HD4 corresponding to the HDC 60G, the write operation determination unit 620G determines whether or not the SPES or DPES corresponding to the head HD4 exceeds the threshold.

When determining that the SPES or DPES corresponding to the head HD4 exceeds the threshold, the write operation determination unit 620G determines prohibition (or stop) of the write (or write operation) of the head HD4 and outputs a write protect signal to the R/W channel 40G corresponding to the HDC 60G.

When receiving a signal for prohibiting write (or write operation) of the head HD5 corresponding to the HDC 60H from the second HDC write protect determination unit 413G, the write operation determination unit 620G may output a write protect signal to the R/W channel 40H. When receiving a signal for prohibiting write (or write operation) of the head HD5 corresponding to the HDC 60H from the second HDC write protect determination unit 413G, the write operation determination unit 620G may output a write protect signal to the R/W channel 40H via the transmission path WR0.

Note that, when receiving a signal for prohibiting write (or write operation) of the head HD5 corresponding to the HDC 60H from the second HDC write protect determination unit 413G, the write operation determination unit 620G may not output a write protect signal to the R/W channel 40H depending on a state of the system controller 130H, the head HD5, or the like.

For example, when determining that the SPES or DPES corresponding to the head HD4 exceeds the threshold, the write operation determination unit 620G may output a write protect signal to the R/W channel 40H.

For example, when determining that the SPES or DPES corresponding to the head HD4 is equal to or smaller than the threshold, the write operation determination unit 620G does not prohibit (or stop) the write (or write operation) using the head HD4 via the HDC 60G. In other words, when determining that the SPES or DPES corresponding to the head HD4 is equal to or smaller than the threshold, the write operation determination unit 620G continues (or carries on with) the write (or write operation) using the head HD4.

The system controller 130H includes the R/W channel 40H, the MPU 50H, and the HDC 60H. The system controller 130H is electrically connected to the driver IC 20H, the head amplifier IC 30H, the write protect detector 180, the controller communication unit 190, and the host system 700. The system controller 130H is electrically connected to the system controller 130A via the transmission paths WR0 and WR1. The system controller 130H may include the SPM controller 210H, the VCM controller 220H, and the MA controller 230H. The system controller 130H may include the driver IC 20H and the head amplifier IC 30H.

The R/W channel 40H executes signal processing of read data transferred from the disk DK4 to the host 700 and write data transferred from the host 700 in response to an instruction from the MPU 50H. The R/W channel 40H is electrically connected to, for example, the head amplifier IC 30H, the MPU 50H, the HDC 60H, and the write protect detector 180. The R/W channel 40H is connected to the write operation determination unit 620G (HDC 60G) via the transmission path WR0. Note that the R/W channel 40H may not be connected to the write operation determination unit 620G (HDC 60G) via the transmission path WR0. The R/W channel 40H may include a write protect unit 410H.

The write protect unit 410H prohibits (or stops) write (or write operation) using the head HD4 and the head HD5 via the HDC 60G and the HDC 60H. The write protect unit 410H is connected to the write operation determination unit 620G (HDC 60G) via the transmission path WR0. Note that the write protect unit 410H may not be connected to the write operation determination unit 620G (HDC 60G) via the transmission path WR0. The write protect unit 410H includes the shock sensor write protect determination unit 411H, the first HDC write protect determination unit 412H, and the second HDC write protect determination unit 413H.

In a case where the shock sensor 170 detects a vibration or shock, the shock sensor write protect determination unit 411H determines whether to prohibit (or stop) write (or write operation) using the head HD5 of the actuator AC5.

For example, when receiving a write protect determination execution signal, the shock sensor write protect determination unit 411H determines whether to prohibit (or stop) write (or write operation) using at least one head HD corresponding to the actuator AC5.

For example, when receiving a write protect determination execution signal, the shock sensor write protect determination unit 411H determines whether or not the vibration or shock is larger than a particular value based on the write protect determination execution signal. For example, when determining that the vibration or shock is larger than the particular value, the shock sensor write protect determination unit 411H determines prohibition (or stop) of the write (or write operation) of the at least one head HD5 of the actuator AC5. For example, when determining that the vibration or shock is larger than the particular value, the shock sensor write protect determination unit 411H outputs a write protect determination signal for determining prohibition (or stop) of the write (or write operation) of the at least one head HD5 of the actuator AC5. For example, when determining that the vibration or shock is equal to or smaller than the particular value, the shock sensor write protect determination unit 411H does not determine prohibition (or stop) of the write (or write operation) of the at least one head HD5 of the actuator AC5.

The first HDC write protect determination unit 412H prohibits (or stops) write (or write operation) of the head HD4 corresponding to the HDC 60G. For example, when receiving a write protect signal for prohibiting (or stopping) write (or write operation) of the head HD4 from the HDC 60H, the first HDC write protect determination unit 412H outputs the write protect signal to the first HDC write protect determination unit 412G of the R/W channel 40G via the HDC 60H and the transmission path WR1, negates (deasserts) a write gate via the first HDC write protect determination unit 412G, and prohibits (or stops) the write (or write operation) of the head HD4. In other words, when receiving, from the HDC 60H, vibration detection information including a write protect signal for prohibiting (or stopping) write (or write operation) of the head HD4 and indicating that the head HD4 has been vibrated, the first HDC write protect determination unit 412H outputs the vibration detection information to the first HDC write protect determination unit 412G of the R/W channel 40G via the HDC 60H and the transmission path WR1, negates (deasserts) the write gate via the first HDC write protect determination unit 412G, and prohibits (or stops) the write (or write operation) of the head HD4.

For example, when receiving a write protect signal for prohibiting (or stop) write (or write operation) of the head HD4 from the HDC 60H, the first HDC write protect determination unit 412H outputs a signal for prohibiting the write (or write operation) of the head HD4 to the HDC 60H, outputs the write protect signal to the first HDC write protect determination unit 412G of the R/W channel 40G via the HDC 60H and the transmission path WR1, negates (deasserts) the write gate via the first HDC write protect determination unit 412G, and prohibits (or stops) the write (or write operation) of the head HD4. In other words, when receiving, from the HDC 60H, vibration detection information including a write protect signal for prohibiting (or stop) write (or write operation) of the head HD4 and indicating that the head HD4 has been vibrated, the first HDC write protect determination unit 412H outputs a signal for prohibiting the write (or write operation) of the head HD4 to the HDC 60H, outputs the vibration detection information to the first HDC write protect determination unit 412G of the R/W channel 40G via the HDC 60H and the transmission path WR1, negates (deasserts) the write gate via the first HDC write protect determination unit 412G, and prohibits (or stops) the write (or write operation) of the head HD4.

For example, when receiving a write protect signal for prohibiting (or stopping) write (or write operation) of the head HD4 from the HDC 60H, the first HDC write protect determination unit 412H outputs the write protect signal to the first HDC write protect determination unit 412G of the R/W channel 40G via the transmission path WR0 and the HDC 60G, negates (deasserts) the write gate via the first HDC write protect determination unit 412G, and prohibits (or stops) the write (or write operation) of the head HD4. In other words, when receiving, from the HDC 60H, vibration detection information including a write protect signal for prohibiting (or stopping) write (or write operation) of the head HD4 and indicating that the head HD4 has been vibrated, the first HDC write protect determination unit 412H outputs the vibration detection information to the first HDC write protect determination unit 412G of the R/W channel 40G via the transmission path WR0 and the HDC 60G, negates (deasserts) the write gate via the first HDC write protect determination unit 412G, and prohibits (or stops) the write (or write operation) of the head HD4.

For example, when receiving a write protect signal for prohibiting (or stopping) write (or write operation) of the head HD4 from the HDC 60H, the first HDC write protect determination unit 412H outputs a signal for prohibiting the write (or write operation) of the head HD4 to the HDC 60G, outputs the write protect signal to the first HDC write protect determination unit 412G of the R/W channel 40G via the transmission path WR0 and the HDC 60G, negates (deasserts) the write gate via the first HDC write protect determination unit 412G, and prohibits (or stops) the write (or write operation) of the head HD4. In other words, when receiving, from the HDC 60H, vibration detection information including a write protect signal for prohibiting (or stop) write (or write operation) of the head HD4 and indicating that the head HD4 has been vibrated, the first HDC write protect determination unit 412H outputs a signal for prohibiting the write (or write operation) of the head HD4 to the HDC 60G, outputs the vibration detection information to the first HDC write protect determination unit 412G of the R/W channel 40G via the transmission path WR0 and the HDC 60G, negates (deasserts) the write gate via the first HDC write protect determination unit 412G, and prohibits (or stops) the write (or write operation) of the head HD4.

The second HDC write protect determination unit 413H prohibits (or stops) write (or write operation) of the head HD5 corresponding to the HDC 60H. For example, when receiving a write protect signal for prohibiting (or stopping) write (or write operation) of the head HD5 from the HDC 60H, the second HDC write protect determination unit 413H negates (deasserts) a write gate to prohibit (or stop) the write (or write operation) of the head HD5. In other words, when receiving, from the HDC 60H, vibration detection information including a write protect signal for prohibiting (or stopping) write (or write operation) of the head HD5 and indicating that the head HD5 has been vibrated, the second HDC write protect determination unit 413H negates (deasserts) the write gate to prohibit (or stop) the write (or write operation) of the head HD5.

For example, when receiving a write protect signal for prohibiting (or stopping) write (or write operation) of the head HD4 corresponding to the HDC 60G, the second HDC write protect determination unit 413H negates (deasserts) the write gate to prohibit (or stop) write (or write operation) of the head HD5. In other words, when receiving vibration detection information including a write protect signal for prohibiting (or stopping) write (or write operation) of the head HD4 corresponding to the HDC 60G and indicating that the head HD4 has been vibrated, the second HDC write protect determination unit 413H negates (deasserts) the write gate to prohibit (or stop) write (or write operation) of the head HD5.

The MPU 50H controls the actuator AC5 via the driver IC 20H and executes servo control for positioning the head HD5. The MPU 50H controls a data write operation to the disk DK5 and selects a storage destination of write data. The MPU 50H also controls a data read operation from the disk DK5 and controls processing of read data. The MPU 50H is connected to each unit of the magnetic disk device 1. The MPU 50H is electrically connected to, for example, the driver IC 20H, the R/W channel 40H, and the HDC 60H.

The HDC 60H controls read/write processing and controls data transfer between the host 700 and the R/W channel 40H in response to an instruction from the MPU 50H. The HDC 60H is electrically connected to, for example, the R/W channel 40H and the MPU 50H. The HDC 60H is connected to the R/W channel 40G via the transmission path WR1. Note that the HDC 60H may not be connected to the R/W channel 40G via the transmission path WR1.

The HDC 60H includes the servo controller 610H and the write operation determination unit 620H. The HDC 60H executes processing of those units, for example, the servo controller 610H and the write operation determination unit 620H on firmware. The HDC 60H may include those units as a circuit. A part of the configuration of the HDC 60H may be provided in the MPU 50H. For example, the servo controller 610H and the write operation determination unit 620H may be provided in the MPU 50H. The HDC 60H prohibits (or stops) a write operation of the head HD5. For example, when receiving a write protect signal, the HDC 60H prohibits (or stops) the write operation of the head HD5.

The servo controller 610H controls a position of the head HD5. In other words, the servo controller 610H controls access by the head HD5 to a particular region of the disk DK5. The servo controller 610H includes the tracking controller 611H and the seek controller 612H.

The tracking controller 611H controls tracking of the head HD5 to a particular track of the disk DK5. The tracking controller 611H includes a DPES demodulation unit 6111H. The tracking controller 611H may include an SPES demodulation unit.

The DPES demodulation unit 6111H reads the data sector DS of the disk DK5 and demodulates a DPES.

The seek controller 612H controls seek of the head HD5 from a particular track to a targeted track on the disk DK5.

The write operation determination unit 620H is connected to the R/W channel 40G via the transmission path WR1. Note that the write operation determination unit 620H may not be connected to the R/W channel 40G via the transmission path WR1. The write operation determination unit 620H includes the position write operation determination unit 621H and the speed write operation determination unit 622H. The position write operation determination unit 621H determines a write operation of the head HD5 based on the position of the head HD5. The speed write operation determination unit 622H determines the write operation of the head HD5 based on a speed of the head HD5.

The write operation determination unit 620H determines whether to prohibit (or stop) write (or write operation) of the head HD5 corresponding to the HDC 60H.

When receiving a write protect determination signal (or write protect determination information) of write (or write operation) of the head HD5 corresponding to the HDC 60H, the write operation determination unit 620H determines whether to prohibit (or stop) the write (or write operation) of the head HD5 based on an SPES read and demodulated from the servo sector SS of the disk DK4 or a DPES read and demodulated from the data sector DS thereof by the head HD5.

When receiving a write protect determination signal (or write protect determination information) of write (or write operation) of the head HD5 corresponding to the HDC 60H, the write operation determination unit 620H determines whether or not the SPES or DPES corresponding to the head HD5 exceeds the threshold.

When determining that the SPES or DPES corresponding to the head HD5 exceeds the threshold, the write operation determination unit 620H determines prohibition (or stop) of the write (or write operation) of the head HD5 and outputs a write protect signal to the R/W channel 40H corresponding to the HDC 60H.

When receiving a signal for prohibiting write (or write operation) of the head HD4 corresponding to the HDC 60G from the first HDC write protect determination unit 412H, the write operation determination unit 620H may output a write protect signal to the R/W channel 40G. When receiving a signal for prohibiting write (or write operation) of the head HD4 corresponding to the HDC 60G from the first HDC write protect determination unit 412H, the write operation determination unit 620H may output a write protect signal to the R/W channel 40G via the transmission path WR1.

Note that, when receiving a signal for prohibiting write (or write operation) of the head HD4 corresponding to the HDC 60G from the first HDC write protect determination unit 412H, the write operation determination unit 620H may not output a write protect signal to the R/W channel 40G depending on a state of the system controller 130G, the head HD4, or the like.

For example, when determining that the SPES or DPES corresponding to the head HD5 exceeds the threshold, the write operation determination unit 620H may output a write protect signal to the R/W channel 40G.

For example, when determining that the SPES or DPES corresponding to the head HD5 is equal to or smaller than the threshold, the write operation determination unit 620H does not prohibit (or stop) the write (or write operation) using the head HD5 via the HDC 60H. In other words, when determining that the SPES or DPES corresponding to the head HD5 is equal to or smaller than the threshold, the write operation determination unit 620H continues (or carries on with) the write (or write operation) using the head HD5.

According to the fourth embodiment, the magnetic disk device 1 includes a disk DK, a plurality of heads HD corresponding to the disk DK, a plurality of actuators AC corresponding to the plurality of heads HD, a plurality of actuator blocks BK corresponding to the plurality of actuators AC, and a plurality of bearings BR corresponding to the plurality of actuator blocks BK. The plurality of actuators AC are rotatably attached to the plurality of bearings BR, respectively. In a case where a current position error of a particular head HD exceeds a threshold for stopping (or prohibiting) a write operation of the particular head HD, a particular system controller 130 stops (or prohibits) a write operation using the particular head HD. When stopping (or prohibiting) the write operation using the particular head HD, the particular system controller 130 can also stop (or prohibit) a write operation using a head HD of another actuator AC corresponding to another system controller 130 different from the particular system controller 130 among a plurality of system controllers 130. For example, the particular system controller 130 outputs a write protect signal to the another system controller 130 via the transmission path (WR0 or WR1) such as wiring, thereby stopping (or prohibiting) the write operation using the head HD of the another actuator AC. The magnetic disk device 1 can acquire a position error of the head HD based on a DPES demodulated by reading the data sector, instead of acquiring a position error of the head HD based only on an SPES demodulated by reading the servo sector, and can therefore acquire a position error of the head HD at a short time interval. Therefore, the magnetic disk device 1 can improve the format efficiency.

Fourth Modification Example

A configuration of the magnetic disk device 1 according to the fourth modification example is different from the configurations of the magnetic disk devices 1 according to the embodiments and modification examples described above.

Figure 28:
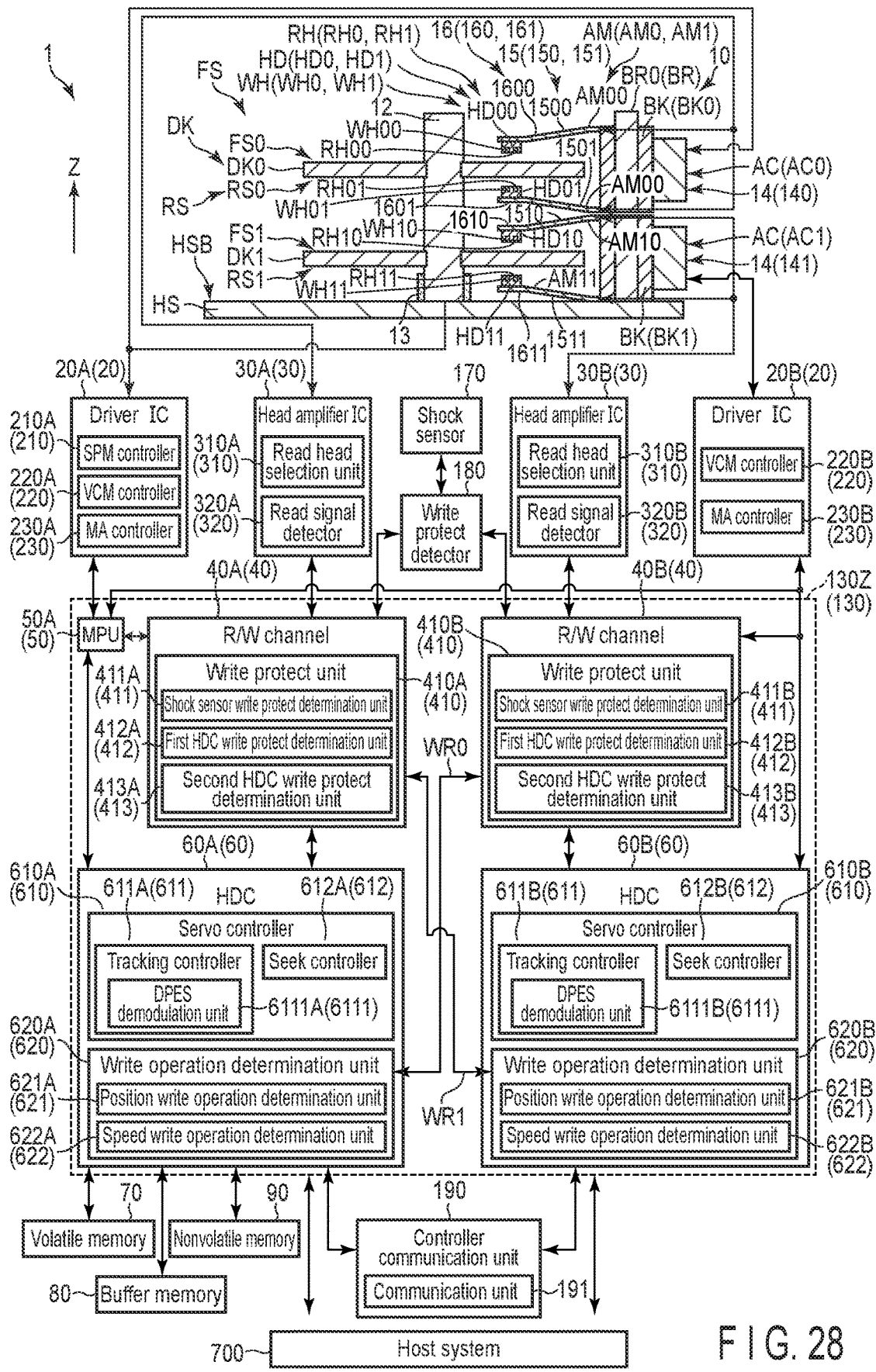
FIG. 28 is a schematic diagram illustrating an exemplary configuration of a magnetic disk device according to a fourth modification example.

FIG. 28 is a schematic diagram illustrating an exemplary configuration of the magnetic disk device 1 according to the fourth modification example. The magnetic disk device 1 according to the fourth modification example illustrated in FIG. 28 is substantially equivalent to the magnetic disk device 1 according to the first embodiment illustrated in FIG. 1, but includes a system controller 130Z in which the system controllers 130A and 130B illustrated in FIG. 1 are integrally formed.

In the example illustrated in FIG. 28, the system controller 130 includes the system controller 130Z. The system controller 130Z includes R/W channels 40A and 40B, MPUs 50A and 50B, and HDCs 60A and 60B.

According to the fourth modification example, when a vibration or shock is applied, the magnetic disk device 1 stops (or prohibit) a write operation based on a DPES or the like, instead of stopping (or prohibiting) a write operation based only on an SPES, and can therefore stop (prohibit) a write operation of the head HD in a short time. The magnetic disk device 1 can make a threshold used to stop (or prohibit) the write operation based on the DPES or the like smaller than a threshold used to stop (or prohibit) the write operation based only on the SPES. When stopping (or prohibiting) a write operation of a head HD of a particular actuator AC, the magnetic disk device 1 can also stop (or prohibit) a write operation of a head HD of another actuator AC different from the particular actuator AC. Therefore, the magnetic disk device 1 can improve the format efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a first disk including a first servo sector and a first data sector different from the first servo sector;
a second disk including a second servo sector and a second data sector different from the second servo sector;
a first head including a first write head that writes data to the first disk and a first read head that reads data from the first disk;
a second head including a second write head that writes data to the second disk and a second read head that reads data from the second disk;
a first actuator including the first head;
a second actuator including the second head;
a first controller that stops write operations of both the first head and the second head based on first data sector position error information obtained by reading and demodulating the first data sector by using the first read head; and
a second controller that stops the write operations of both the first head and the second head based on second data sector position error information obtained by reading and demodulating the second data sector by using the second read head.

2. The magnetic disk device according to claim 1, further comprising:
a housing having a bottom wall and a first bearing erected on the bottom wall, wherein:
the first actuator and the second actuator each are rotatably attached to the first bearing;
the first controller controls the first actuator; and
the second controller controls the second actuator.

3. The magnetic disk device according to claim 1, wherein:
the first data sector includes a first preamble having a first recording frequency different from a recording frequency of a preamble of another data sector arranged in a radial direction of the first disk; and
the second data sector includes a second preamble having a second recording frequency different from a recording frequency of a preamble of another data sector arranged in the radial direction of the second disk.

4. The magnetic disk device according to claim 3, wherein:
the first disk and the second disk overlap each other in plan view; and
the first preamble and the second preamble are shifted in a circumferential direction of the first disk and the second disk.

5. The magnetic disk device according to claim 3, wherein:
the first controller calculates a position of the first head based on an amplitude and a phase or a SIN component and a COS component of a fundamental frequency of the first recording frequency of the first preamble; and the second controller calculates a position of the second head based on an amplitude and a phase or a SIN component and a COS component of a fundamental frequency of the second recording frequency of the second preamble.

6. The magnetic disk device according to claim 1 or 2, wherein:

the first data sector includes a first burst having a first recording frequency different from a recording frequency of a burst of another data sector arranged in a radial direction of the first disk; and the second data sector includes a second burst having a second recording frequency different from a recording frequency of a preamble of another data sector arranged in the radial direction of the second disk.

7. The magnetic disk device according to claim 6, wherein:

the first disk and the second disk overlap each other in plan view; and the first burst and the second burst are shifted in a circumferential direction of the first disk and the second disk.

8. The magnetic disk device according to claim 6, wherein:

the first controller calculates a position of the first head based on an amplitude and a phase or a SIN component and a COS component of a fundamental frequency of the first recording frequency of the first burst; and the second controller calculates a position of the second head based on an amplitude and a phase or a SIN component and a COS component of a fundamental frequency of the second recording frequency of the second burst.

9. The magnetic disk device according to claim 1, wherein:

the first data sector includes a first Null burst having a recording frequency different from a recording frequency of a Null burst of another data sector arranged in a radial direction of the first disk; and the second data sector includes a second Null burst having a recording frequency different from a recording frequency of a Null burst of another data sector arranged in the radial direction of the second disk.

10. The magnetic disk device according to claim 1, wherein:

the first controller performs self-servo write of the first servo sector on the first disk; and the second controller performs self-servo write of the second servo sector on the second disk such that the second data sector is shifted from the first data sector in a circumferential direction of the first disk and the second disk.

11. The magnetic disk device according to claim 1, further comprising:

a housing having a bottom wall, a first bearing erected on the bottom wall, and a second bearing different from the first bearing, wherein:

the first actuator is rotatably attached to the first bearing;

the second actuator is rotatably attached to the second bearing;

the first controller controls the first actuator; and the second controller controls the second actuator.

12. The magnetic disk device according to claim 1, wherein:

the first controller stops write operations of both the first head and the second head based on at least one of a current first position of the first head or a first estimated position of the first head; and the second controller stops the write operations of both the second head and the second head based on at least one of a current second position of the second head or a second estimated position of the second head.

13. The magnetic disk device according to claim 12, wherein:

the first controller calculates the first estimated position based on the first position and a first speed of the first head at the first position; and the second controller calculates the second estimated position based on the second position and a second speed of the second head at the second position.

14. The magnetic disk device according to claim 1, wherein:

the first controller includes a first read/write channel and a first hard disk controller;

the second controller includes a second read/write channel and a second hard disk controller;

the first read/write channel is connected to the second hard disk controller via a first line;

the second read/write channel is connected to the first hard disk controller via a second line.

15. The magnetic disk device according to claim 1, further comprising:

an information transmission unit that is connected to the first controller and the second controller and transmits, to the first controller or the second controller, vibration information including the first data sector position error information or the second data sector position error information and indicating that the first head and the second head have been vibrated;

the first controller transmits the vibration information to the second controller via the information transmission unit; and the second controller transmits the vibration information to the first controller via the information transmission unit.

16. The magnetic disk device according to claim 1, wherein:

the first controller sets different data sector formats on an upper surface and a lower surface of the first disk; and the second controller sets different data sector formats on an upper surface and a lower surface of the second disk.

17. The magnetic disk device according to claim 1, wherein:

in a case where one of the first head and the second head is in an idle state, the first controller and the second controller cause the both of the first head and the second head to perform servo tracking on the first disk and the second disk.

18. A magnetic disk device comprising:

a disk having a first surface including a first servo sector and a first data sector different from the first servo sector, and a second surface including a second servo sector and a second data sector different from the second servo sector;

a first head including a first write head that writes data to the first surface and a first read head that reads data from the first surface;

a second head including a second write head that writes data to the second surface and a second read head that reads data from the second surface;

an actuator including the first head and the second head;

a first controller that stops write operations of both the first head and the second head based on first data sector position error information obtained by reading and demodulating the first data sector by using the first read head; and a second controller that stops the write operations of both the first head and the second head based on second data sector position error information obtained by reading and demodulating the second data sector by using the second read head.

19. The magnetic disk device according to claim 18, wherein the actuator includes a first suspension, a first microactuator that is attached to the first suspension and independently drives the first head, a second suspension, and a second microactuator that is attached to the second suspension and independently drives the second head.

20. The magnetic disk device according to claim 19, wherein:

the first head includes a third read head that reads data from the first surface and is different from the first read head; and the second head includes a fourth read head that reads data from the second surface and is different from the second read head.

21. A method of stopping a write operation, the method being applied to a magnetic disk device including a first disk including a first servo sector and a first data sector different from the first servo sector, a second disk including a second servo sector and a second data sector different from the second servo sector, a first head including a first write head that writes data to the first disk and a first read head that reads data from the first disk, a second head including a second write head that writes data to the second disk and a second read head that reads data from the second disk, a first actuator including the first head, and a second actuator including the second head, the method comprising:

stopping write operations of both the first head and the second head based on first data sector position error information obtained by reading and demodulating the first data sector by using the first read head; and stopping the write operations of both the first head and the second head based on second data sector position error information obtained by reading and demodulating the second data sector by using the second read head.

22. The method of stopping a write operation according to claim 21, wherein:

the magnetic disk device includes a housing having a bottom wall and a first bearing erected on the bottom wall;

the first actuator and the second actuator each are rotatably attached to the first bearing; and the method further includes controlling the first actuator, and controlling the second actuator.

23. The method of stopping a write operation according to claim 21, wherein:

the first data sector includes a first preamble having a first recording frequency different from a recording frequency of a preamble of another data sector arranged in a radial direction of the first disk; and the second data sector includes a second preamble having a second recording frequency different from a recording frequency of a preamble of another data sector arranged in the radial direction of the second disk.

24. The method of stopping a write operation according to claim 23, wherein:

the first disk and the second disk overlap each other in plan view; and the first preamble and the second preamble are shifted in a circumferential direction of the first disk and the second disk.

25. The method of stopping a write operation according to claim 23, further comprising:

calculating a position of the first head based on an amplitude and a phase or a SIN component and a COS component of a fundamental frequency of the first recording frequency of the first preamble; and calculating a position of the second head based on an amplitude and a phase or a SIN component and a COS component of a fundamental frequency of the second recording frequency of the second preamble.

26. The method of stopping a write operation according to claim 21, wherein:

the first data sector includes a first burst having a first recording frequency different from a recording frequency of a burst of another data sector arranged in a radial direction of the first disk; and the second data sector includes a second burst having a second recording frequency different from a recording frequency of a preamble of another data sector arranged in the radial direction of the second disk.

27. The method of stopping a write operation according to claim 26, wherein:

the first disk and the second disk overlap each other in plan view; and the first burst and the second burst are shifted in a circumferential direction of the first disk and the second disk.

28. The method of stopping a write operation according to claim 26, further comprising:

calculating a position of the first head based on an amplitude and a phase or a SIN component and a COS component of a fundamental frequency of the first recording frequency of the first burst; and calculating a position of the second head based on an amplitude and a phase or a SIN component and a COS component of a fundamental frequency of the second recording frequency of the second burst.

* * * * *